United States Patent
Fisher et al.

(10) Patent No.: US 7,436,876 B2
(45) Date of Patent: Oct. 14, 2008

(54) SYSTEM AND METHOD FOR FAST ACQUISITION OF ULTRA WIDEBAND SIGNALS

(75) Inventors: Teresa E. Fisher, Huntsville, AL (US); Jennifer P. Rolin, Elkmont, AL (US); Irina Dodoukh, Huntsville, AL (US); Vernon R. Brethour, Owens Cross Roads, AL (US); Mark Roberts, Huntsville, AL (US); James Richards, Fayetteville, TN (US)

(73) Assignee: Time Domain Corporation, Hunstville, AL (US)

(*) Notice: Subject to any disclaimer, the term of this patent is extended or adjusted under 35 U.S.C. 154(b) by 725 days.

(21) Appl. No.: 10/955,118

(22) Filed: Sep. 30, 2004

(65) Prior Publication Data
US 2005/0089083 A1    Apr. 28, 2005

Related U.S. Application Data

(63) Continuation-in-part of application No. 10/713,615, filed on Nov. 14, 2003, now abandoned, and a continuation-in-part of application No. 10/712,269, filed on Nov. 14, 2003, now abandoned.

(60) Provisional application No. 60/506,761, filed on Sep. 30, 2003, provisional application No. 60/426,949, filed on Nov. 15, 2002, provisional application No. 60/426,857, filed on Nov. 15, 2002.

(51) Int. Cl.
*H04B 1/00* (2006.01)
(52) U.S. Cl. ........................ 375/130; 375/144
(58) Field of Classification Search .................. 375/130, 375/144
See application file for complete search history.

(56) References Cited

U.S. PATENT DOCUMENTS

| | | | |
|---|---|---|---|
| 4,641,317 A | 2/1987 | Fullerton | |
| 4,813,057 A | 3/1989 | Fullerton | |
| 4,979,186 A | 12/1990 | Fullerton | |
| 5,363,108 A | 11/1994 | Fullerton | |
| 5,677,927 A | 10/1997 | Fullerton et al. | |
| 5,687,169 A | 11/1997 | Fullerton | |
| 5,754,764 A * | 5/1998 | Davis et al. | 709/200 |

(Continued)

FOREIGN PATENT DOCUMENTS

| WO | WO01/93442 A1 | 12/2001 |
|---|---|---|
| WO | WO01/93446 A2 | 12/2001 |

*Primary Examiner*—David C. Payne
*Assistant Examiner*—Nader Bolourchi
(74) *Attorney, Agent, or Firm*—James Richards

(57) ABSTRACT

An ultra wideband system employing a threshold to detect signal quality during acquisition wherein the threshold is adjusted based on signal characteristics such as packet traffic rate, packet loss rate, and packet loss fraction. In one embodiment, the threshold is adjusted by adjusting the gain of a variable gain stage ahead of the threshold. In another embodiment, gain and threshold are adjusted in a coordinated manner wherein gain is adjusted for low signal levels and threshold is adjusted for high signal levels. In one embodiment, packet traffic rate is evaluated over an interval based on maximum packet length, number of monitor packets, and inter-packet delay. In a further embodiment, multiple ramp builders are operated in parallel at multiple code offset values to generate signal statistics to compare with the threshold. Embodiments are disclosed wherein the thresholds are adaptively adjusted based on signal performance characteristics or the multipath environment.

23 Claims, 44 Drawing Sheets

U.S. PATENT DOCUMENTS

| | | |
|---|---|---|
| 5,764,696 A | 6/1998 | Barnes et al. |
| 5,812,081 A | 9/1998 | Fullerton |
| 5,832,035 A | 11/1998 | Fullerton |
| 5,901,172 A * | 5/1999 | Fontana et al. ............... 375/130 |
| 5,952,956 A | 9/1999 | Fullerton |
| 5,969,663 A | 10/1999 | Fullerton et al. |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,421,389 B1 | 7/2002 | Jett et al. |
| 6,539,213 B1 | 3/2003 | Richards et al. |
| 6,556,621 B1 | 4/2003 | Richards et al. |
| 6,571,089 B1 | 5/2003 | Richards et al. |
| 2001/0053175 A1* | 12/2001 | Hoctor et al. ............... 375/130 |
| 2002/0124096 A1* | 9/2002 | Loguinov et al. ............ 709/230 |
| 2002/0173341 A1* | 11/2002 | Abdelmonem et al. ...... 455/561 |
| 2003/0198308 A1* | 10/2003 | Hoctor et al. ............... 375/354 |

* cited by examiner

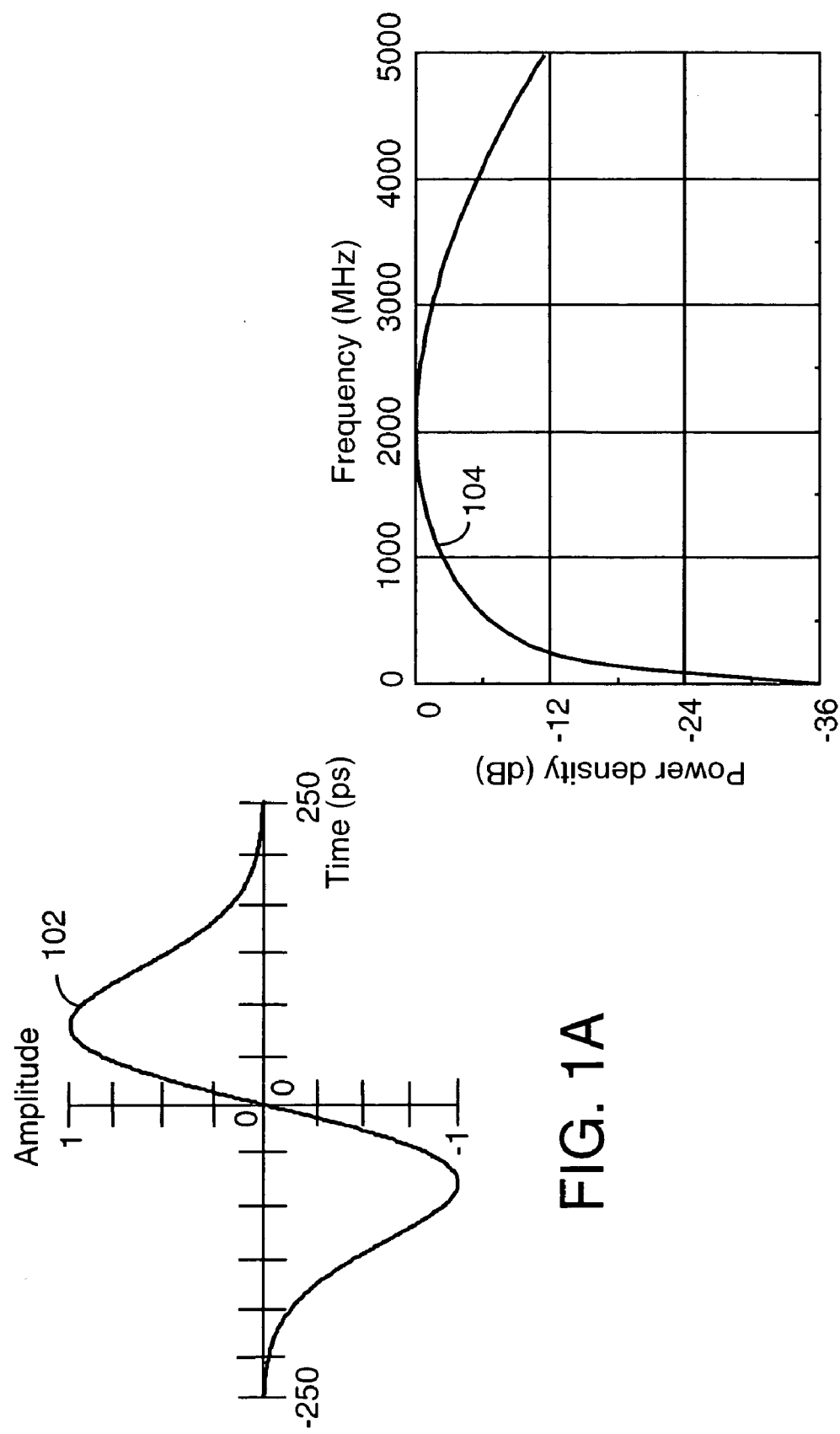

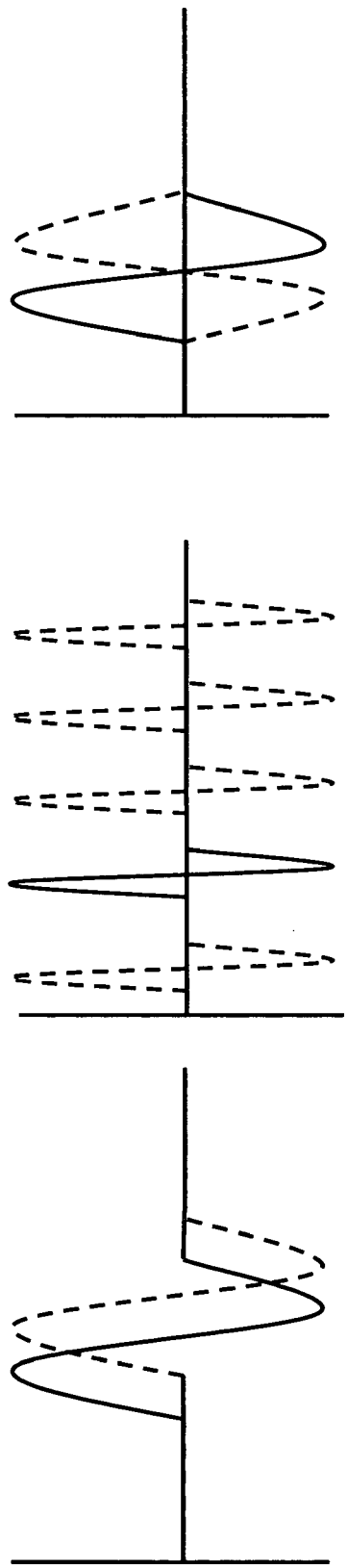
FIG. 4A Early-Late Modulation
FIG. 4B One of Many Modulation
FIG. 4C Flip Modulation
FIG. 4D Quad Flip Modulation
FIG. 4E Vector Modulation

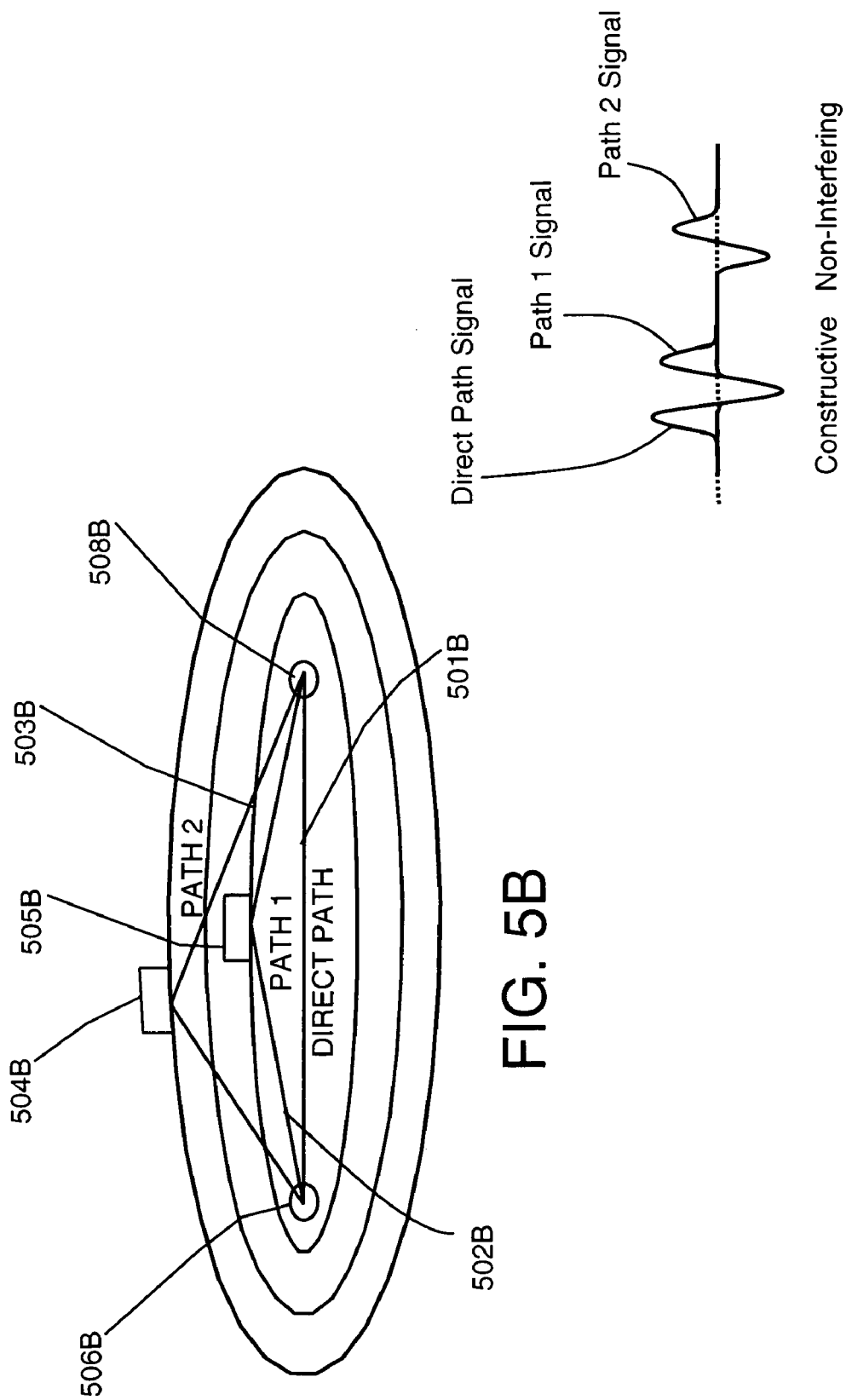

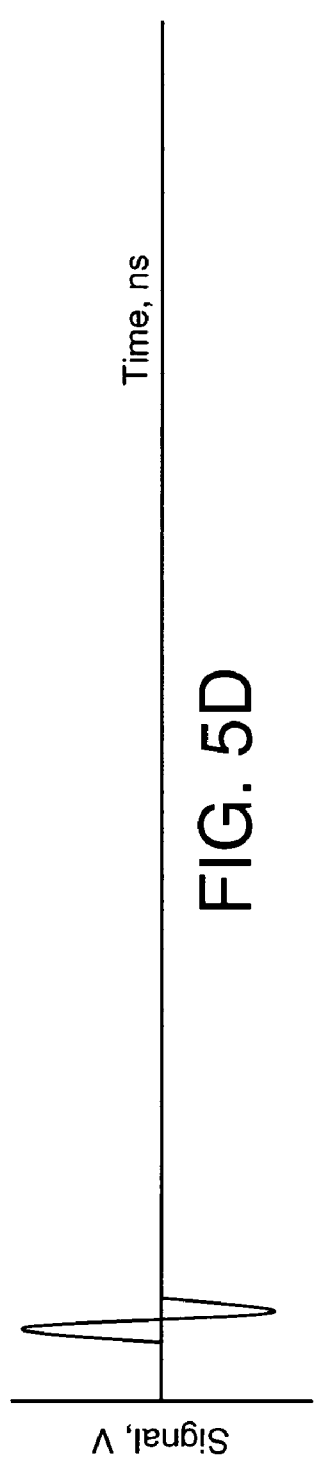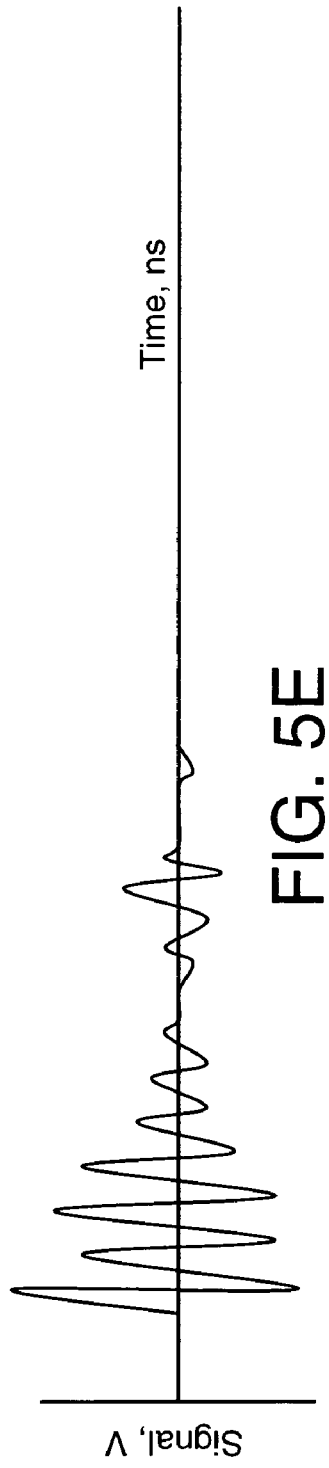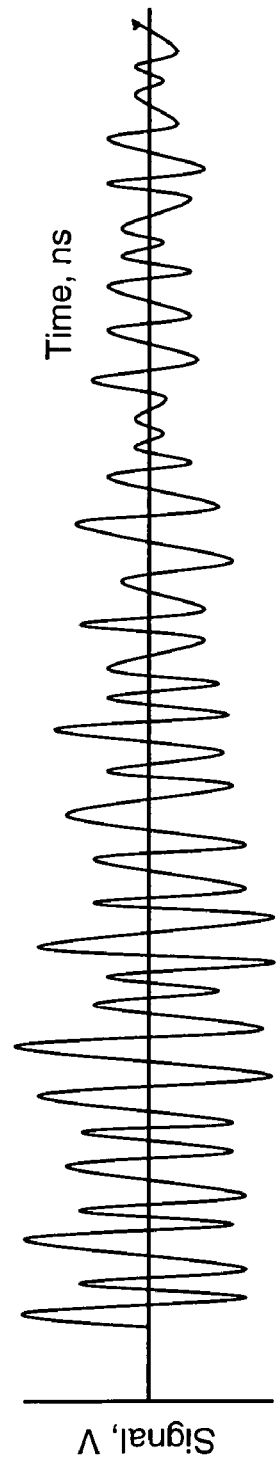

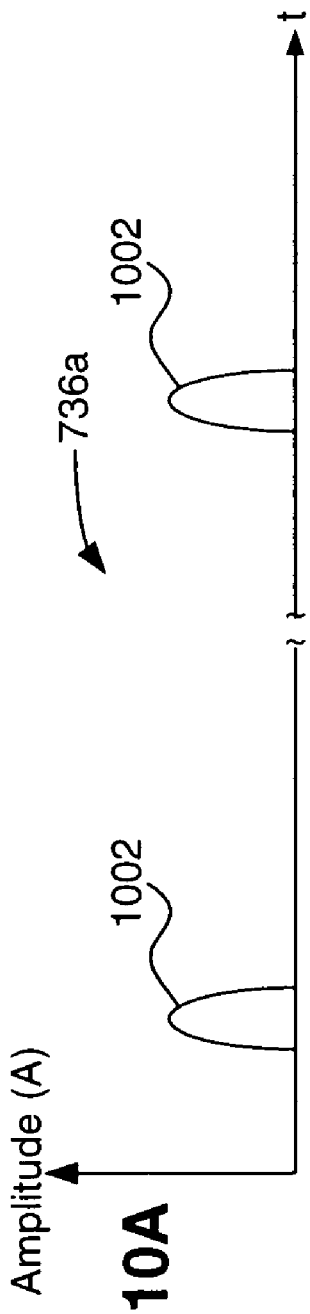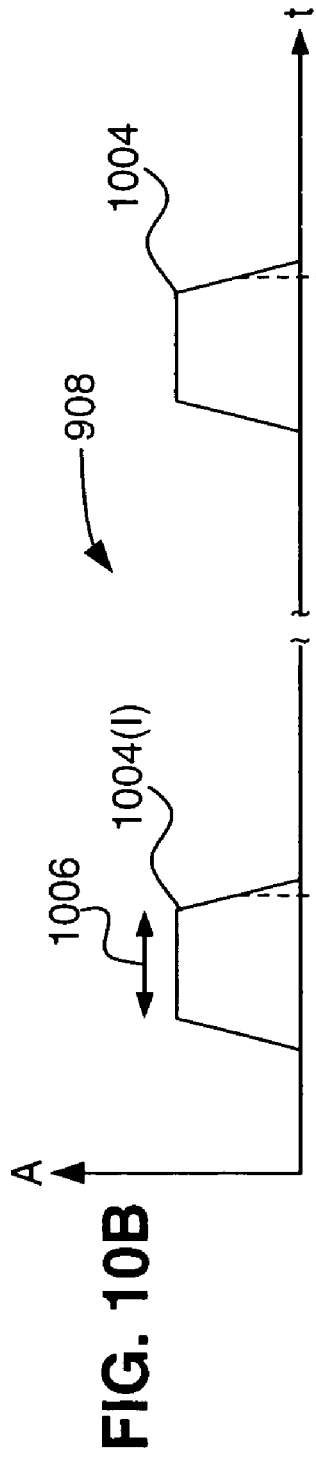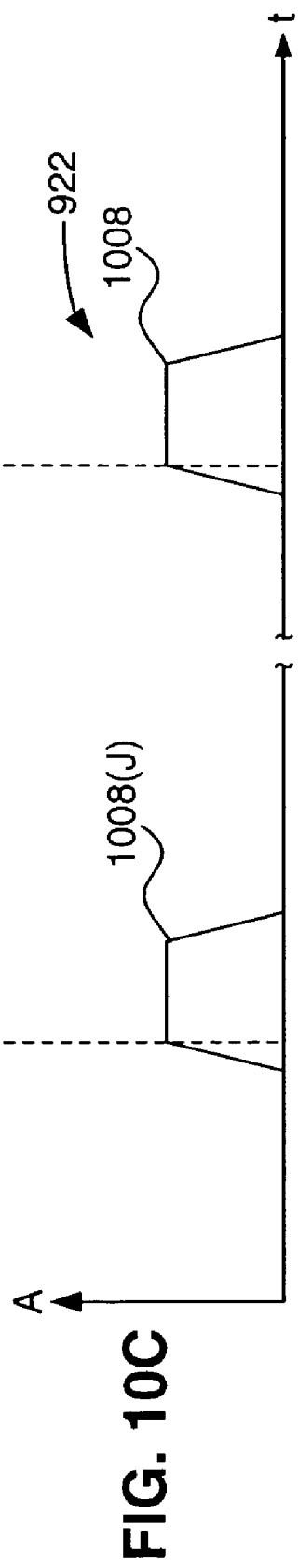

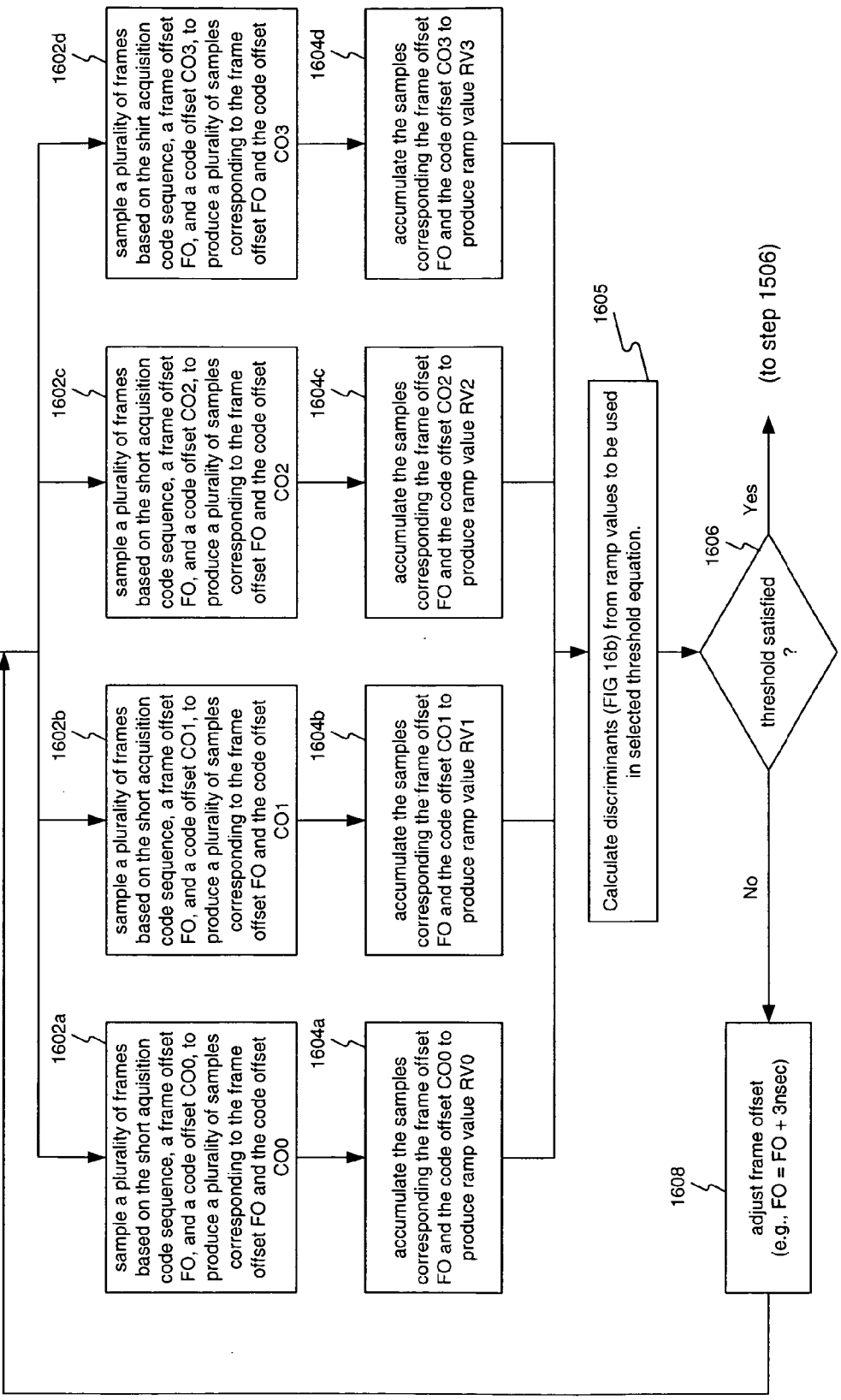

FIG. 16b

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator variance |
| MA_MinV | Moving (historical) average of the minimum correlator variance |
| Logic_1 | Constant value 1 |
| Logic_0 | Constant value 0 |

SYSTEM AND METHOD FOR FAST ACQUISITION OF ULTRA WIDEBAND SIGNALS

CROSS REFERENCE TO RELATED APPLICATIONS

The present application is a continuation in part of application titled: "Methods and Systems Acquiring Impulse Signals," Ser. No. 10/713,615, filed Nov. 14, 2003 by Brethour et al., which claims the benefit of provisional application titled: "Methods and Systems for Acquiring Impulse Signals," Ser. No. 60/426,949 filed Nov. 15, 2002 by Brethour et al., and provisional application titled "Method And Apparatus For Ultra Wideband Signaling And Modulation," Ser. No. 60/426,857 filed Nov. 15, 2002 by Brethour et al.; the present application is also a continuation in part of application titled: , "System And Method For Processing Signals In UWB Communications", Ser. No. 10/712,269, filed on 14 Nov. 2003 by Brethour et al., which claims the benefit of provisional application titled: "Method And Apparatus For Ultra Wideband Signaling And Modulation," Ser. No. 60/426,857 filed Nov. 15, 2002 by Brethour et al.; the present application further claims benefit of provisional application titled: "Selective Auto Gain Control with Auto Threshold," Ser. No. 60/506, 761 filed Sep. 30, 2003 by Fisher et al.; all of which are incorporated herein by reference.

GOVERNMENT RIGHTS

The US Government has a paid-up license in this invention and the right in limited circumstances to require the patent owner to license others on reasonable terms as provided for by the terms of contract DAAB07-03-D-213 awarded by the U.S. Army CECOM Night Visions Lab, Fort Belvoir, Va.

BACKGROUND OF THE INVENTION

1. Field of the Invention

The present invention relates to the field of communications, and more particularly, the present invention relates to a mechanism for acquiring an ultra wideband signal.

2. Background Art

An impulse radio system typically includes an impulse radio transmitter for transmitting an impulse signal and an impulse radio receiver for receiving the impulse signal. An exemplary impulse signal includes a train of impulse signal frames each including one or more impulses. The transmitter can pulse position modulate the impulses within the impulse signal frames based on a modulating signal, and then transmit the impulse signal frames to the receiver.

The impulse radio receiver receives the impulse signal frames and associated received impulses transmitted by the impulse radio transmitter. In one known application, the impulse receiver coherently samples the received impulses to produce impulse samples. The receiver can use such impulse samples for subsequent signal processing relating to radar, position-locating, and communication applications, for example. However, before the impulse receiver can coherently sample the received impulses, it is necessary for the impulse receiver to determine a frame timing associated with the received impulses. That is, the impulse radio receiver must achieve frame synchronization (also referred to as proper frame alignment). For example, it is useful for the impulse receiver to determine when each received impulse signal frame begins and/or ends. Therefore, in an impulse radio capable of receiving an impulse signal including a train of impulse signal frames, there is a need to determine received impulse signal frame timing, such as a time when each impulse signal frame begins and/or ends.

Additionally, if the received impulse signal is coded (e.g., pulse position modulated based on a pseudo-random (PN) code), then the impulse radio receive must achieve code synchronization before it can coherently sample the received signal. Thus, there is also a need to provide code synchronization in an impulse radio capable of receiving an impulse signal including a train of code modulated impulse signals.

The impulse radio transmitter can transmit source information (i.e., digital data) to the impulse radio receiver. For example, the impulse transmitter uses the source information to pulse position modulate the impulses within the impulse signal frames, thereby producing information bearing symbols. The transmitter transmits the symbols (i.e., the impulse signal frames including the pulse position modulated impulses) to the impulse receiver. It is likely that the transmitter also codes the symbols as mentioned above prior to transmitting the impulse signal frames.

The impulse radio receiver receives the symbols transmitted by the impulse transmitter. Before the impulse receiver can demodulate the received symbols to recover the source information therein, the impulse receiver needs to recover a symbol timing associated with the received symbols. For example, the receiver needs to determine when each received symbol begins and/or ends. Once the receiver recovers such symbol timing, then the receiver can demodulate the received symbols to recover the data therein. Therefore, in an impulse radio capable of receiving symbols, there is a need to determine (or recover) received symbol timing, thereby enabling the impulse radio receiver to demodulate the symbols.

The impulse radio transmitter can pulse position modulate the impulses within the impulse signal frames based on different types of code sequences (codes), to produce a coded impulse signal. One type of code is a PN code used to channelize the impulse signal and/or combat relatively narrowband interference signals. These codes are relatively long (e.g., a code length of 1024, 2048 or 4096) for at least two reasons: first, so energy is spread across the frequency spectrum; and second, so a relatively large number of independent communication channels are provided.

In order to demodulate the coded impulse signal, the impulse radio receiver must be code synchronized with the impulse signal transmitter. Accordingly, there is a need to code synchronize the impulse radio receiver with the impulse radio transmitter.

It is typically beneficial to accomplish necessary requirements in fast and efficient manners that utilize reduced amounts of hardware to thereby increase throughput and/or reduce hardware costs. More specifically, it would be beneficial to satisfy each of the above discussed needs in fast and efficient manners that utilize reduced amounts of hardware. For example, it would be beneficial to achieve proper frame alignment in a fast and an efficient manner that utilizes reduced amounts of hardware. Further, it would be beneficial to recover received symbol timing in a fast and efficient manner that utilizes reduced amounts of hardware. Additionally, it would be beneficial to code synchronize an impulse radio receiver with the code of an impulse radio transmitter in a fast and efficient manner that utilizes reduced amounts of hardware. Still further, it would be beneficial if the same hardware could be used (or reused) to satisfy as many of the above needs as possible.

BRIEF SUMMARY OF THE INVENTION

Briefly, the present invention is an ultra wideband system employing a threshold to detect signal quality during acquisition wherein the threshold is adjusted based on signal characteristics such as packet traffic rate. In one embodiment, the threshold is adjusted by adjusting the gain of a variable gain stage ahead of the threshold. In another embodiment, gain and threshold are adjusted in a coordinated manner wherein gain is adjusted for low signal levels and threshold is adjusted for high signal levels.

In one embodiment, packet traffic rate is evaluated over an interval based on maximum packet length, number of monitor packets, and inter-packet delay.

In a further embodiment, multiple ramp builders are operated in parallel at multiple code offset values to generate signal statistics to compare with the threshold. The signal statistics may include:

| Number | Threshold Equation |
|---|---|
| 1 | N * MaxR / MA_meanV > C |
| 2 | MaxR / NextR > C |
| 3 | Logic AND or OR of equation 1 and 2 (via the Master Sequencer) |
| 4 | N * MaxR / MaxV > C |
| 5 | N * (MaxR / MA_meanV) * (MinV / MaxV) > C |
| 6 | N * (MaxR / MA_meanV) * [FORCE_ZERO(MinV − MA_MinV) / FORCE_ONE(MaxV − MA_MinV)] > C |
| 7 | N * (MaxR − NextR) / MA_meanV > C |
| 8 | N * [(MaxR − NextR) / MA_meanV] * (MinV / MaxV) > C |

In a further embodiment, frame offset space is scanned to determine the maximum signal strength and thresholds are set below the maximum signal strength.

In a further embodiment, frame offset space is scanned to determine a noise floor and a maximum signal strength wherein the threshold value is established between the noise floor and the maximum signal strength.

In a further embodiment having multiple stages of acquisition, the thresholds for each stage are adaptively adjusted according to performance criteria wherein the multiple stages include at least one of the following:

Initial Detection—First detection of a possible signal.
Initial Tracking—Initial closed loop tacking of the signal
Sig-Opt—Signal Optimization, refinement of tracking loop lock point
Quick Check—Verification of the first detection.
Lock Check—verification of tracking loop lock
Long Code (Ratchet Code) Detection—Detection of long length code
Detect Delimiter—Detect end of acquisition header In a further embodiment having multiple stages of acquisition, the thresholds for each stage are adaptively adjusted according to performance criteria, the performance criteria include at least one of the following:

false alarm rate,
packet acquire rate, or
packet loss rate

In a further embodiment, packet sent information is encoded in transmitted packets and the packet sent information is used to derive the packet loss rate for use in setting threshold levels.

In a further embodiment, wherein a system may receive a given transmitter multiple times on a known schedule, the threshold parameters associated with a given transmitter may be stored in memory to be retrieved from memory to search for the given transmitter.

In a further embodiment, thresholds may be optimized by a first transceiver and the optimization information sent to a second transceiver to aid in the reception of the first transceiver by the second transceiver.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A illustrates a representative Gaussian Monocycle waveform in the time domain, which is the first derivative of a Gaussian pulse;

FIG. 1B illustrates the frequency domain amplitude of the Gaussian Monocycle of FIG. 1A;

FIGS. 4A-4E illustrate five modulation techniques to include: Early-Late Modulation; One of Many Modulation; Flip Modulation; Quad Flip Modulation; and Vector Modulation;

FIG. 5B depicts a typical geometrical configuration giving rise to multipath received signals;

FIG. 5C illustrates exemplary multipath signals in the time domain;

FIG. 5D represents a signal plot of an idealized UWB received pulse with no multipath;

FIG. 5E represents a signal plot of an idealized UWB received pulse in moderate multipath;

FIG. 5F represents a signal plot of an idealized UWB received pulse in severe multipath;

FIG. 10A is an example timing waveform representing a correlator sampling control signal in the impulse radio of FIG. 7, and in the (IJ) correlator pair arrangement of FIG. 9;

FIG. 10B is an example timing waveform representing a first sampling signal derived by a sampling pulse generator of FIG. 9;

FIG. 10C is an example timing waveform representing a second sampling signal produced by a delay of FIG. 9;

FIG. 16a illustrates additional details of one of the steps shown in FIG. 15, according to an embodiment of the present invention;

FIG. 16b depicts discriminants;

DETAILED DESCRIPTION OF THE INVENTION

Table of Contents

Figures 1C, 1D:
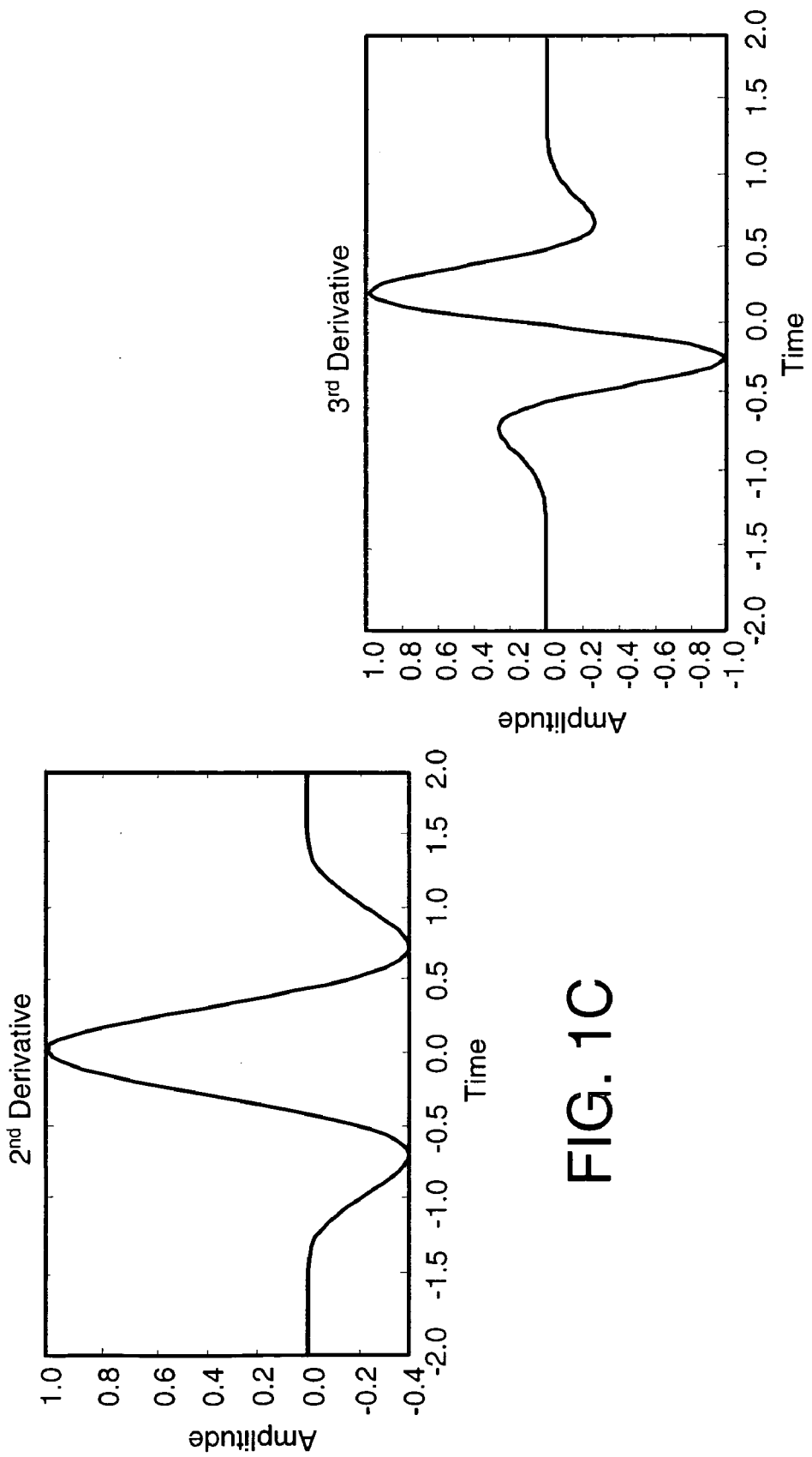
FIG. 1C represents the second derivative of a Gaussian pulse.
FIG. 1D represents the third derivative of the Gaussian pulse.

I. Impulse Radio Basics
   A. Overview
   B. Waveforms
   C. Pulse Trains
   D. Coding
   E. Modulation
   F. Reception and Demodulation
   G. Interference Resistance
   H. Processing Gain
   I. Capacity
   J. Multipath and Propagation
   K. Distance Measurement and Positioning
   L. Power Control II. Exemplary General Purpose Architectural Embodiment for an Impulse Radio Transceiver
   A. Overview
   B. RF Sampling Subsystem
   C. Timing Subsystem
   D. Control Subsystem
   E. Baseband Processor
   F. Paired Correlators
   G. Lock Loop III. Preferred Embodiments
   A. Terminology
   B. Exemplary Packets
   C. Problem Description
   D. Overview of Solution to Problem
   E. Packet Protocol
   F. Frame Alignment (First Stage Acquisition)
   G. Threshold Determination
   H. Tracking
   I. Back Ramps
   J. Detect Beginning of Data Payload (Second Stage Acquisition)
   K. Ratchet Codes
   L. Generating Ratchet Codes
   M. Exemplary Impulse Radio Receiver Subsystem
      1. Operation During First Stage Acquisition
      2. Tracking and Back Ramps
      3. Operation During Second Stage Acquisition 4. Frame Format and Additional Receiver Embodiments for Use with Longer Short Acquisition Codes and Ratchet Codes
5. IJ or IQ Correlator Pairs and Ramp Builder Pairs
N. Radio Command Channel
O. Jittering Impulse Positions
P. Acquisition Times
1. First Stage Acquisition Time
2. Tracking Time
3. Second Stage Acquisition Time
4. Time Required for Complete Acquisition
5. Time Required in a Typical Conventional System
6. Comparison
Q. Hardware and Software Implementations
R. Automatic Acquisition Threshold
S. Gain Control
T. Automatic Multi-Stage Threshold Adjustment
IV. Conclusion I. Impulse Radio Basics The present invention builds upon existing impulse radio techniques. Accordingly, an overview of impulse radio basics is provided prior to a discussion of the specific embodiments of the present invention. This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

A. Overview

Ultra Wideband is an emerging RF technology with significant benefits in communications, radar, positioning and sensing applications. In 2002, the Federal Communications Commission (FCC) recognized these potential benefits to the consumer and issued the first rulemaking enabling the commercial sale and use of products based on Ultra Wideband technology in the United States of America. The FCC adopted a definition of Ultra Wideband to be a signal that occupies a fractional bandwidth of at least 0.25, or 1.5 GHz bandwidth at any center frequency. The 0.25 fractional bandwidth is more precisely defined as:

$$FBW = \frac{2(f_h - f_l)}{f_h + f_l},$$

where FBW is the fractional bandwidth, fh is the upper band edge and fl is the lower band edge, the band edges being defined as the 10 dB down point in spectral density.

There are many approaches to UWB including impulse radio, direct sequence CDMA, ultra wideband noise radio, direct modulation of ultra high-speed data, and other methods. The present invention has its origin in ultra wideband impulse radio and will have significant application there as well, but it has potential benefit and application beyond impulse radio to other forms of ultra wideband and beyond ultra wideband to conventional radio systems as well. Nonetheless, it is useful to describe the invention in relation to impulse radio to understand the basics and then expand the description to the extensions of the technology.

The following is an overview of impulse radio as an aid in understanding the benefits of the present invention.

Impulse radio has been described in a series of patents, including U.S. Pat. Nos. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al., and U.S. Pat. No. 5,812,081 (issued Sep. 22, 1998), and U.S. Pat. No. 5,952,956 (issued Sep. 14, 1999) to Fullerton, which are incorporated herein by reference.

Uses of impulse radio systems are described in U.S. Pat. No. 6,177,903 (issued Jan. 23, 2001) titled, "System and Method for Intrusion Detection using a Time Domain Radar Array" and U.S. Pat. No. 6,218,979 (issued Apr. 17, 2001) titled "Wide Area Time Domain Radar Array", which are incorporated herein by reference.

Acquisition approaches involving acquisition thresholds are described in U.S. Pat. No. 5,832,035, titled "Fast Locking Mechanism for Channelized Ultrawide-Band Communications," issued Nov. 3, 1998 to Fullerton, which was incorporated by reference above, and in U.S. Pat. No. 6,556,621, titled "System and Method for Fast Acquisition of Ultra Wideband Signals," issued Apr. 29, 2003 to Richards et al., which is incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, wide bandwidth pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation (including frequency shape and wave shape modulation), time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

B. Waveforms

Figure 1E:
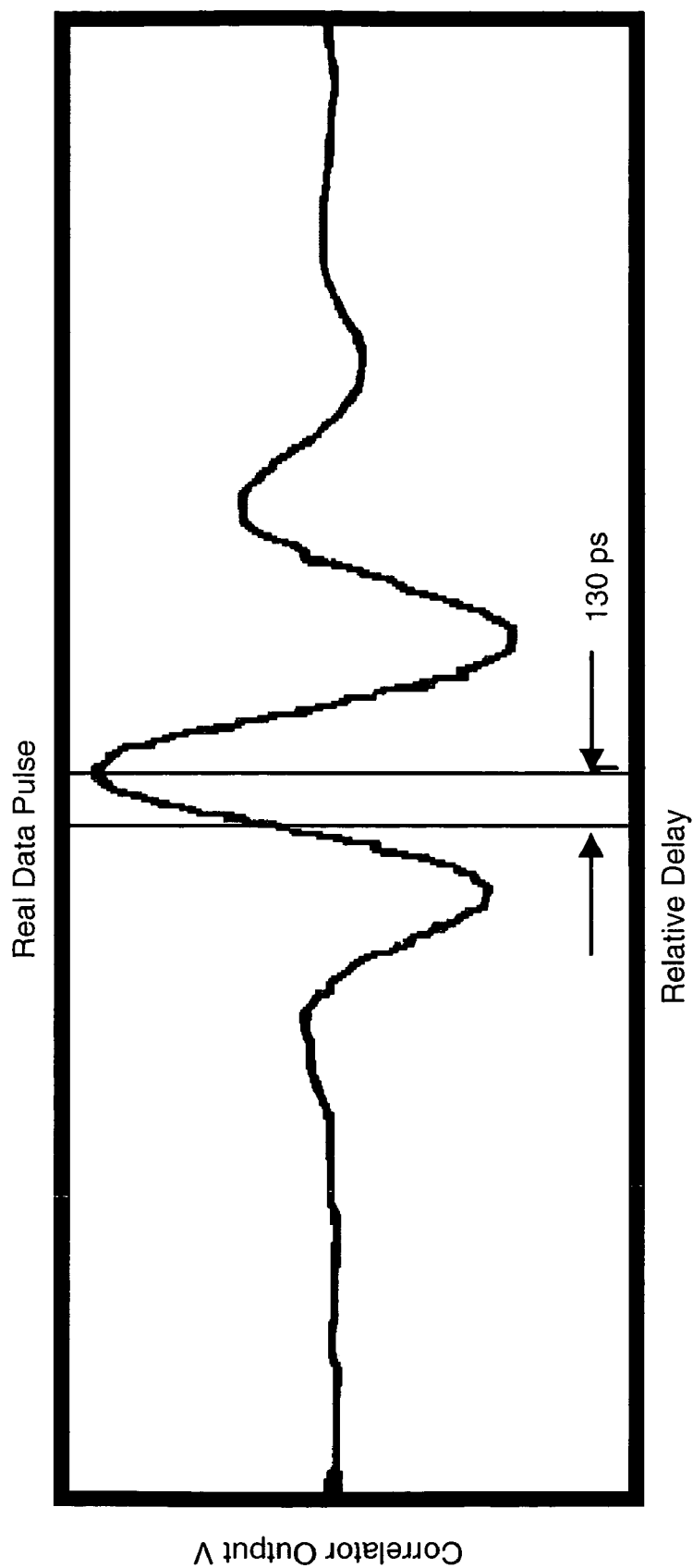
FIG. 1E represents the Correlator Output vs. the Relative Delay of a measured pulse signal.

Impulse transmission systems are based on short, wide band pulses. Different pulse waveforms, or pulse types, may be employed to accommodate requirements of various applications. Typical ideal pulse types used in analysis include a Gaussian pulse doublet (also referred to as a Gaussian monocycle), pulse triplet, and pulse quadlet as depicted in FIGS. 1A through 1D. An actual received waveform that closely resembles the theoretical pulse quadlet is shown in FIG. 1E. A pulse type may also be a wavelet set produced by combining two or more pulse waveforms (e.g., a doublet/triplet wavelet set), or families of orthogonal wavelets. Additional pulse designs include chirped pulses and pulses with multiple zero crossings, or bursts of cycles. These different pulse types may be produced by methods described in the patent documents referenced above or by other methods understood by one skilled in the art.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
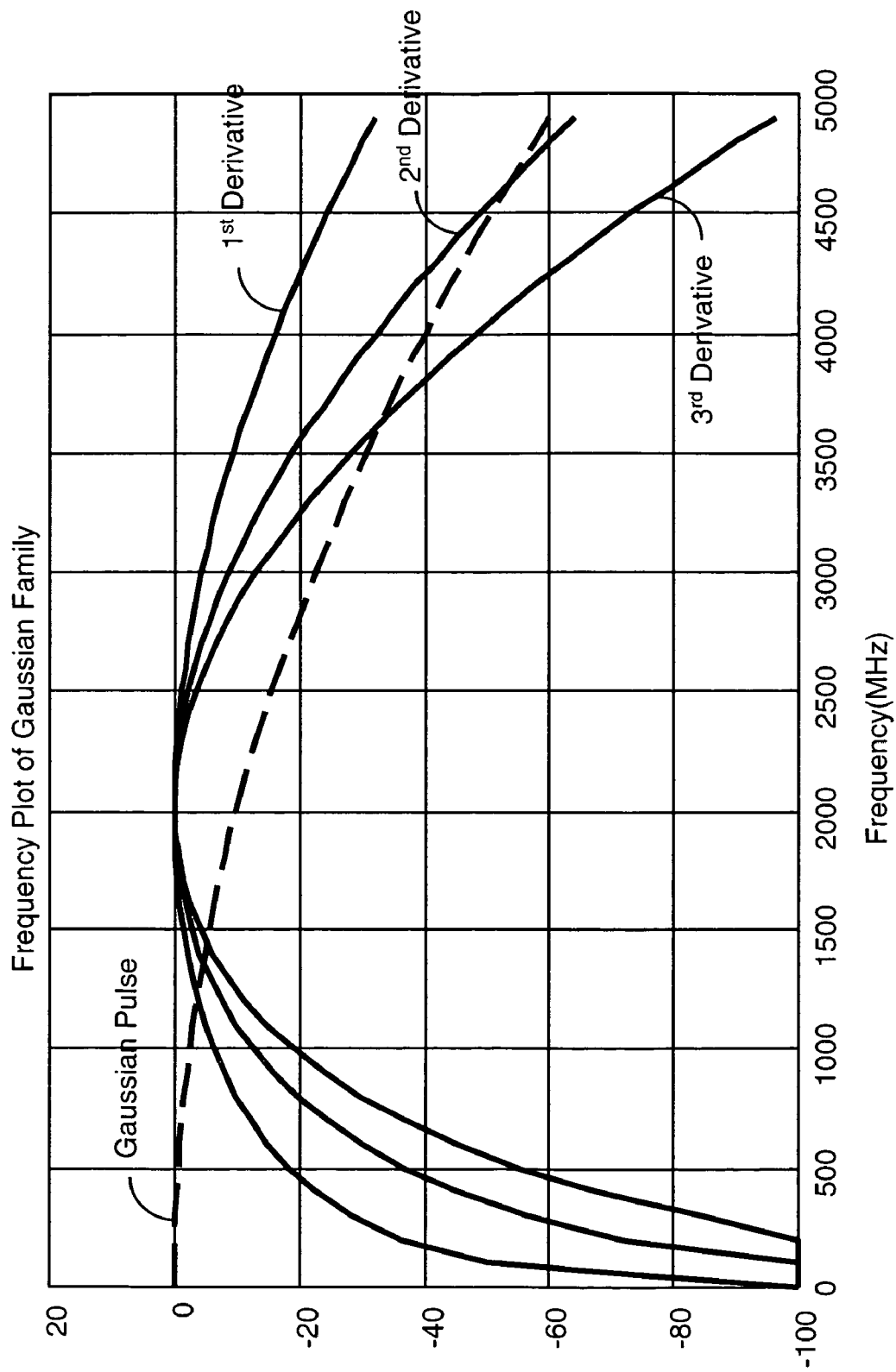
FIG. 1F depicts the frequency domain amplitude of the Gaussian family of the Gaussian Pulse and the first, second, and third derivative.

FIG. 1F shows the power spectral density of the Gaussian pulse, doublet, triplet, and quadlet normalized to a peak density of 1. The normalized doublet (monocycle) is as follows:

$$F_{mono}(f) = j(2\pi)\sqrt{e}\sigma f e^{-2(\pi\sigma f)^2}$$

Where $F_{mono}(\,)$ is the Fourier transform of $f_{mono}(\,)$, f is frequency, and j is the imaginary unit. The center frequency ($f_c$), or frequency of peak spectral density, of the Gaussian monocycle is:

$$f_c = \frac{1}{2\pi\sigma}$$

C. Pulse Trains

Figure 2A:
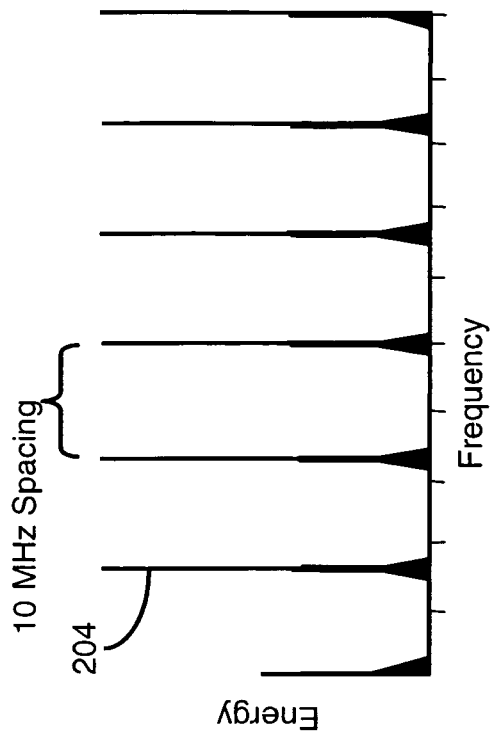
FIG. 2A illustrates a pulse train comprising pulses as in FIG. 1A.
Figure 2B:
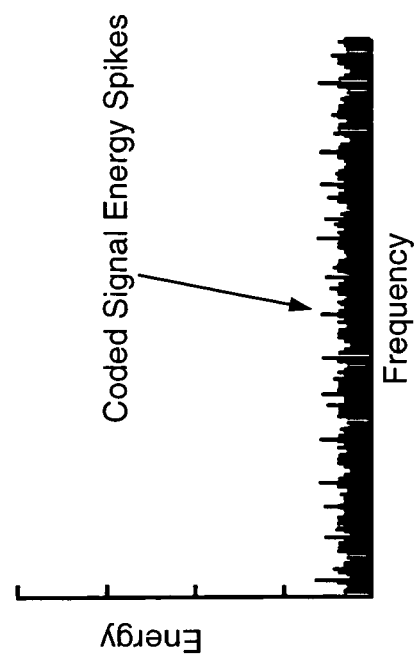
FIG. 2B illustrates the frequency domain amplitude of the waveform of FIG. 2A.
Figure 2C:
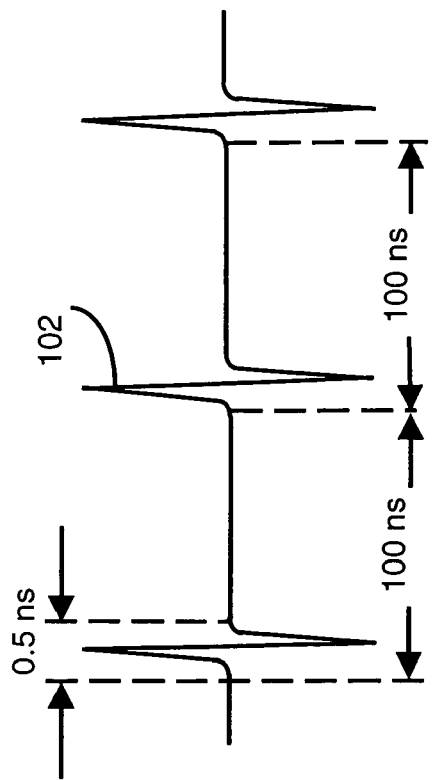
FIG. 2C illustrates the pulse train spectrum.

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems may have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = a\sum_{i=1}^{n} w(c(t - iT_f), b)$$

where i is the index of a pulse within a pulse train of n pulses, a is pulse amplitude, b is pulse type, c is a pulse width scaling parameter, w(t, b) is the normalized pulse waveform, and $T_f$ is pulse repetition time, also referred to as frame time.

The Fourier transform of a pulse train signal over a frequency bandwidth of interest may be determined by summing the phasors of the pulses for each code time shift, and multiplying by the Fourier transform of the pulse function:

$$S(f) = a \left| \sum_{i=1}^{n} e^{-j2\pi f i T_f} \right| W(f)$$

where S(f) is the amplitude of the spectral response at a given frequency, f is the frequency being analyzed, $T_f$ is the relative time delay of each pulse from the start of time period, W(f) is the Fourier transform of the pulse, w(t,b), and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-peak-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

D. Coding

Figure 2D:
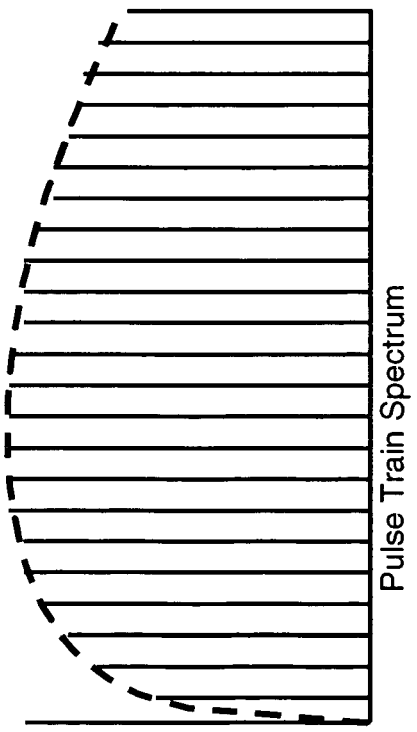
FIG. 2D is a plot of the Frequency vs. Energy.

Specialized coding techniques can be employed to specify temporal and/or non-temporal pulse characteristics to produce a pulse train having certain spectral and/or correlation properties. For example, by employing a Pseudo-Noise (PN) code to vary inter-pulse spacing, the energy in the uncoded comb lines presented in FIGS. 2B and 2C can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
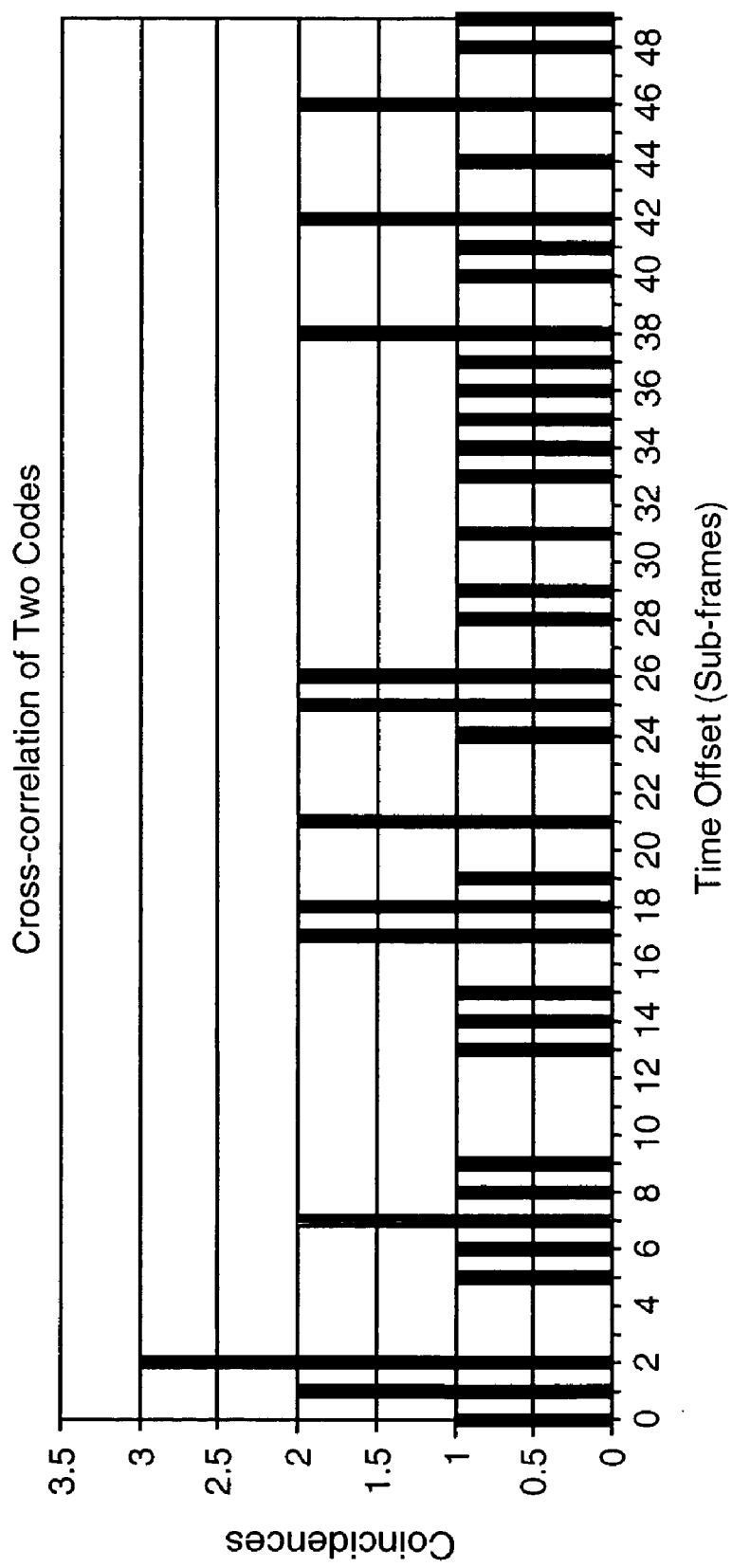
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned U.S. Pat. No. 6,636,567 (issued Oct. 21, 2003). titled "A Method for Specifying Non-Allowable Pulse Characteristics," and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}(t) = \sum_{i} (-1)^{f_i} a_i w(c_i(t - T_i), b_i)$$

where str(t) is the coded pulse train signal, i is the index of a pulse within the pulse train, $(-1)^{f_i}$, ai, bi, ci, and ω(t,bi) are the coded polarity, pulse amplitude, pulse type, pulse width, and normalized pulse waveform of the i'th pulse, and Ti is the coded time shift of the ith pulse Various numerical code generation methods can be employed to produce codes having certain correlation and spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned U.S. Pat. No. 6,636,566 (issued Oct. 21, 2003), titled "A Method and Apparatus for Specifying Pulse Characteristics using a Code that Satisfies Predefined Criteria," and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

E. Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A generalized expression for a pulse train with 'early-late' time-shift modulation over a data symbol time is:

$$s_{tr}(t) = \sum_{i=1}^{N_s} (-1)^{f_i} a_i w(c_i(t - T_i - \delta d_k), b_i)$$

where k is the index of a data symbol (e.g., bit), i is the index of a pulse within the data symbol, Ns is the number of pulses per symbol, $(-1)^{f_i}$ is a coded polarity (flipping) pattern (sequence), ai is a coded amplitude pattern, bi is a coded pulse type (shape) pattern, ci is a coded pulse width pattern, and w(t,bi) is a normalized pulse waveform of the ith pulse, Tj) is the coded time shift of the i'th pulse, δ is the time shift added when the transmitted symbol is 1 (instead of 0), dk is the data (i.e., 0 or 1) transmitted by the transmitter. In this example, the data value is held constant over the symbol interval. Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," Attorney Docket No. 1659.0860000, filed Jun. 7, 2000, which is incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, which is incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, which is incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they typically do not depend on receiving every transmitted pulse. Except for single pulse per bit systems, impulse radio receivers perform a correlating, synchronous receiving function (at the RF level) that uses sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

G. Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
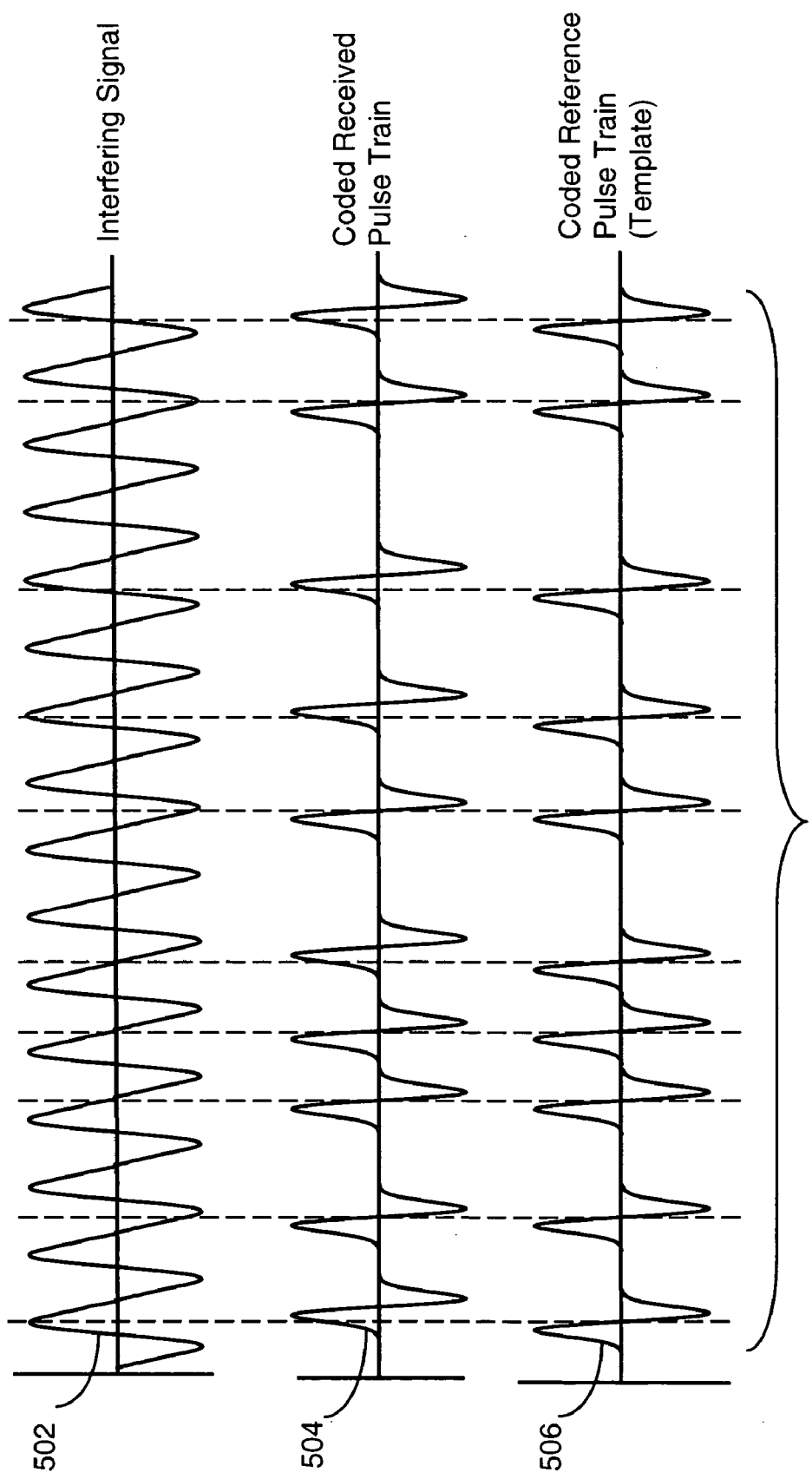
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

H. Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a conventional narrow band direct sequence spread spectrum system with a 10 kbps data rate and a 10 MHz spread bandwidth yields a processing gain of 1000, or 30 dB. However, far greater processing gains are achieved by impulse radio systems, where the same 10 kbps data rate is spread across a much greater 2 GHz spread bandwidth, resulting in a theoretical processing gain of 200,000, or 53 dB.

I. Capacity

It can be shown theoretically, using signal-to-noise arguments, that for an impulse radio system with an information rate of a few tens of kbps, thousands of simultaneous channels could be available as a result of its exceptional processing gain.

The average output signal-to-noise ratio of a reference impulse radio receiver may be calculated for randomly selected time-hopping codes as a function of the number of active users, Nu, as:

$$S_{out}(N_u) = \frac{1}{\frac{1}{S_{out}(1)} + \frac{1}{N_s}\frac{\sigma_a^2}{m_p^2}\sum_{k=2}^{N_u}\left(\frac{A_k}{A_1}\right)}$$

where Ns is the number of pulses integrated per bit of information, A1 is the received amplitude of the desired transmitter, Ak is the received amplitude of interfering transmitter k's signal at the reference receiver, and $\sigma_{rec}^2$ is the variance of the receiver noise component at the pulse train integrator output in the absence of an interfering transmitter. The waveform-dependent parameters mp and $\sigma_a^2$ are given by $$m_p = \int_{-\infty}^{\infty} w(t)[w(t) - w(t-\delta)]dt$$

and $$\sigma_a^2 = T_f^{-1}\int_{-\infty}^{\infty}\left[\int_{-\infty}^{\infty} w(t-s)v(t)\,dt\right]^2 ds,$$

where w(t) is the transmitted waveform, v(t)=w(t)−w(t−δ) is the template signal waveform, δ is the modulation time shift between a digital one and a zero value data bit, Tf is the pulse repetition time, or frame time, and s is an integration parameter. The output signal to noise ratio that one might observe in the absence of interference is given by:

$$S_{Out}(1) = \frac{(A_1 N_s m_p)^2}{\sigma_{rec}^2}$$

where, $\sigma_{rec}^2$ is the variance of the receiver noise component at the pulse train integrator output in the absence of an interfering transmitter. Further details of this analysis can be found in R. A. Scholtz, "Multiple Access with Time-Hopping Impulse Modulation," Proc. MILCOM, Boston, Mass., Oct. 11-14, 1993.

J. Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents a substantial portion of the potential coverage area of a typical radio system. In a mobile system, received signal strength fluctuates due to the changing mix of multipath signals that vary as the mobile units position varies relative to fixed transmitters, other mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Figure 5G:
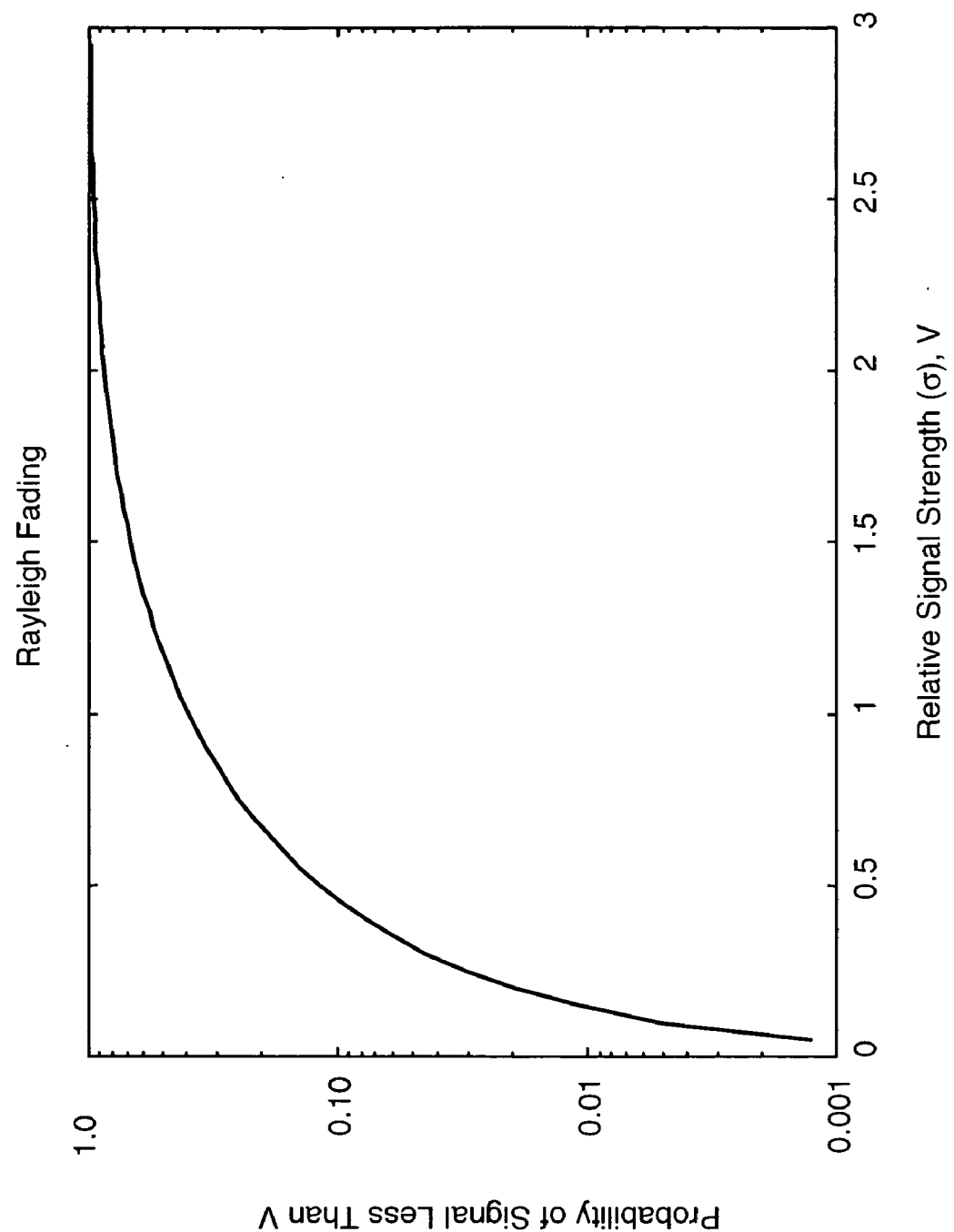
FIG. 5G illustrates the Rayleigh fading curve associated with non-impulse radio transmissions in a multipath environment.

In a narrow band system subject to a large number of multipath reflections within a symbol (bit) time, the received signal is essentially a sum of a large number of sine waves of random amplitude and phase. In the idealized limit, the resulting envelope amplitude has been shown to follow a Rayleigh probability density as follows:

$$p(r) = \frac{r}{\sigma^2} \exp\left(\frac{-r^2}{2\sigma^2}\right)$$

where r is the envelope amplitude of the combined multipath signals, and 2σ2 is the expected value of the envelope power of the combined multipath signals. The Rayleigh distribution curve in FIG. 5G shows that 10% of the time, the signal is more than 10 dB attenuated. This suggests that a 10 dB fade margin is needed to provide 90% link reliability. Values of fade margin from 10 dB to 40 dB have been suggested for various narrow band systems, depending on the required reliability. Although multipath fading can be partially improved by such techniques as antenna and frequency diversity, these techniques result in additional complexity and cost.

Figure 5H:
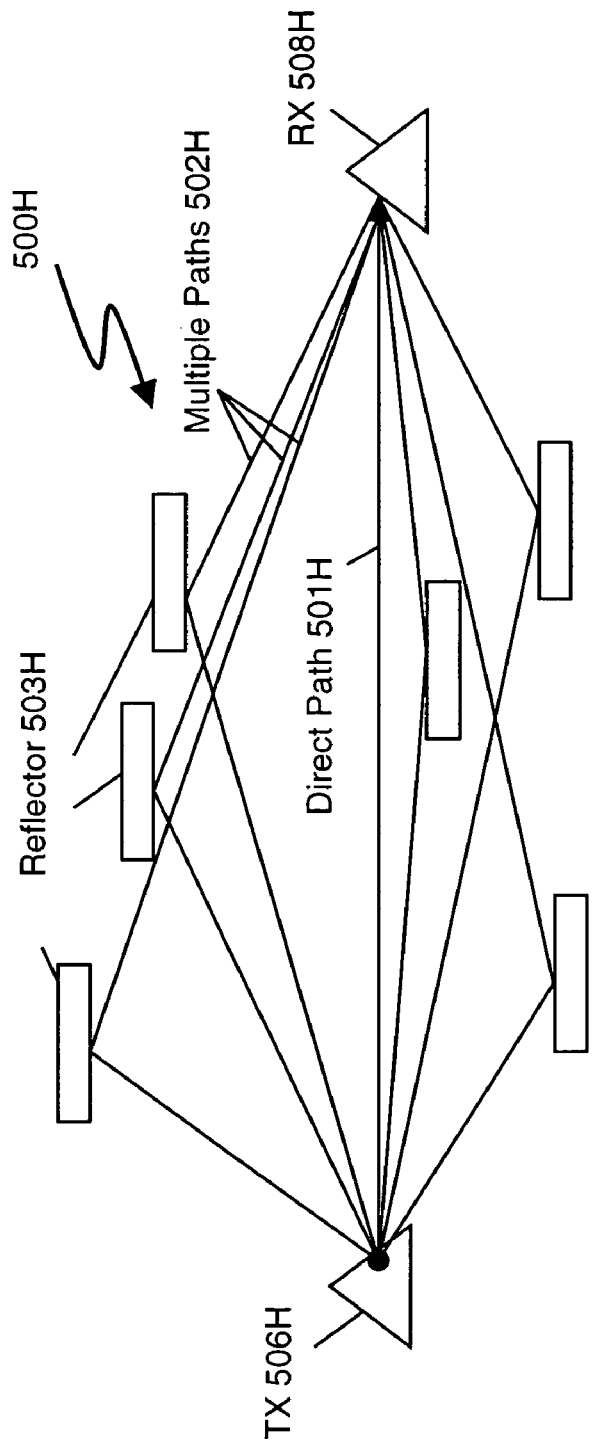
FIG. 5H illustrates a plurality of multipaths with a plurality of reflectors from a transmitter to a receiver.
Figure 5I:
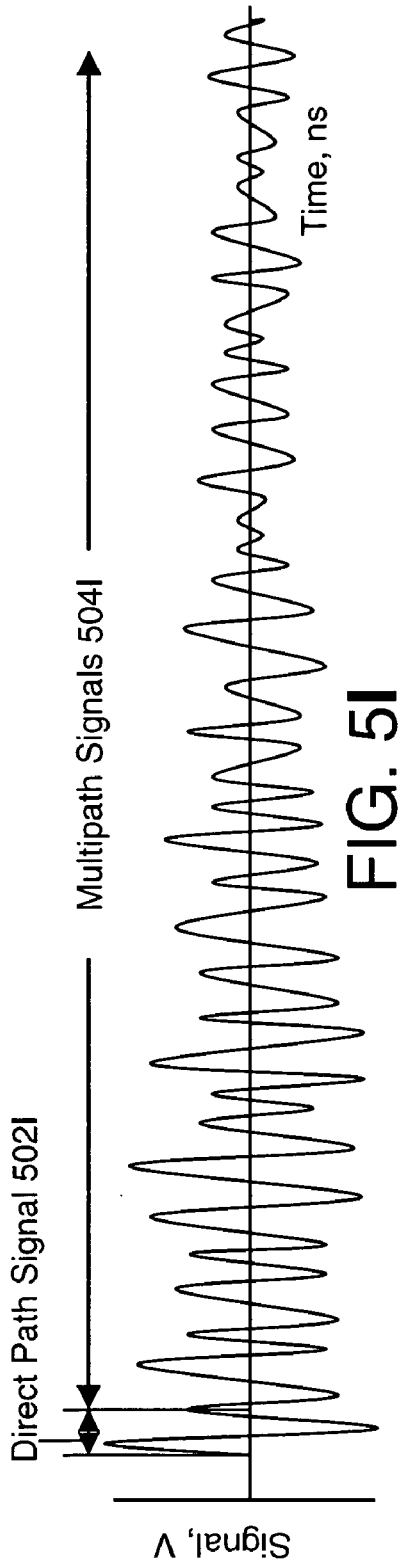
FIG. 5I graphically represents signal strength as volts vs. time in a direct path and multipath environment.

In a high multipath environment such as inside homes, offices, warehouses, automobiles, trailers, shipping containers, or outside in an urban canyon or in other situations where the propagation is such that the received signal is primarily scattered energy, impulse radio systems can avoid the Rayleigh fading mechanism that limits performance of narrow band systems, as illustrated in FIG. 5H and 5I. FIG. 5H depicts an impulse radio system in a high multipath environment 500H consisting of a transmitter 506H and a receiver 508H. A transmitted signal follows a direct path 501H and reflects off of reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. UWB system can thus resolve the reflections into separate time intervals which can be received separately. Thus, the UWB system can select the strongest or otherwise most desirable reflection from among the numerous reflections. This yields a multipath diversity mechanism with numerous paths making it highly resistant to Rayleigh fading. Whereas, in a narrow band systems, the reflections arrive within the minimum time resolution of one bit or symbol time which results in a single vector summation of the delayed signals with no inherent diversity.

K. Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has minimal multi-cycle ambiguity, it is feasible to determine waveform position to less than a wavelength in the presence of noise. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology in a Time Division Multiple Access (TDMA) radio system can achieve geo-positioning capabilities to high accuracy and fine resolution. This geo-positioning method is described in U.S. Pat. No. 6,300,903, issued Oct. 9, 2001, titled "System and Method for Person or Object Position Location Utilizing Impulse Radio," which is incorporated herein by reference.

J. Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without mutial interference. Reducing transmitter power can also increase transceiver efficiency.

For greater elaboration of impulse radio power control, see U.S. Pat. No. 6,539,213, issued Mar. 25, 2003, titled "System and Method for Impulse Radio Power Control," which is incorporated herein by reference.

II. Example Transceiver Implementation

A. Overview

Figure 6:
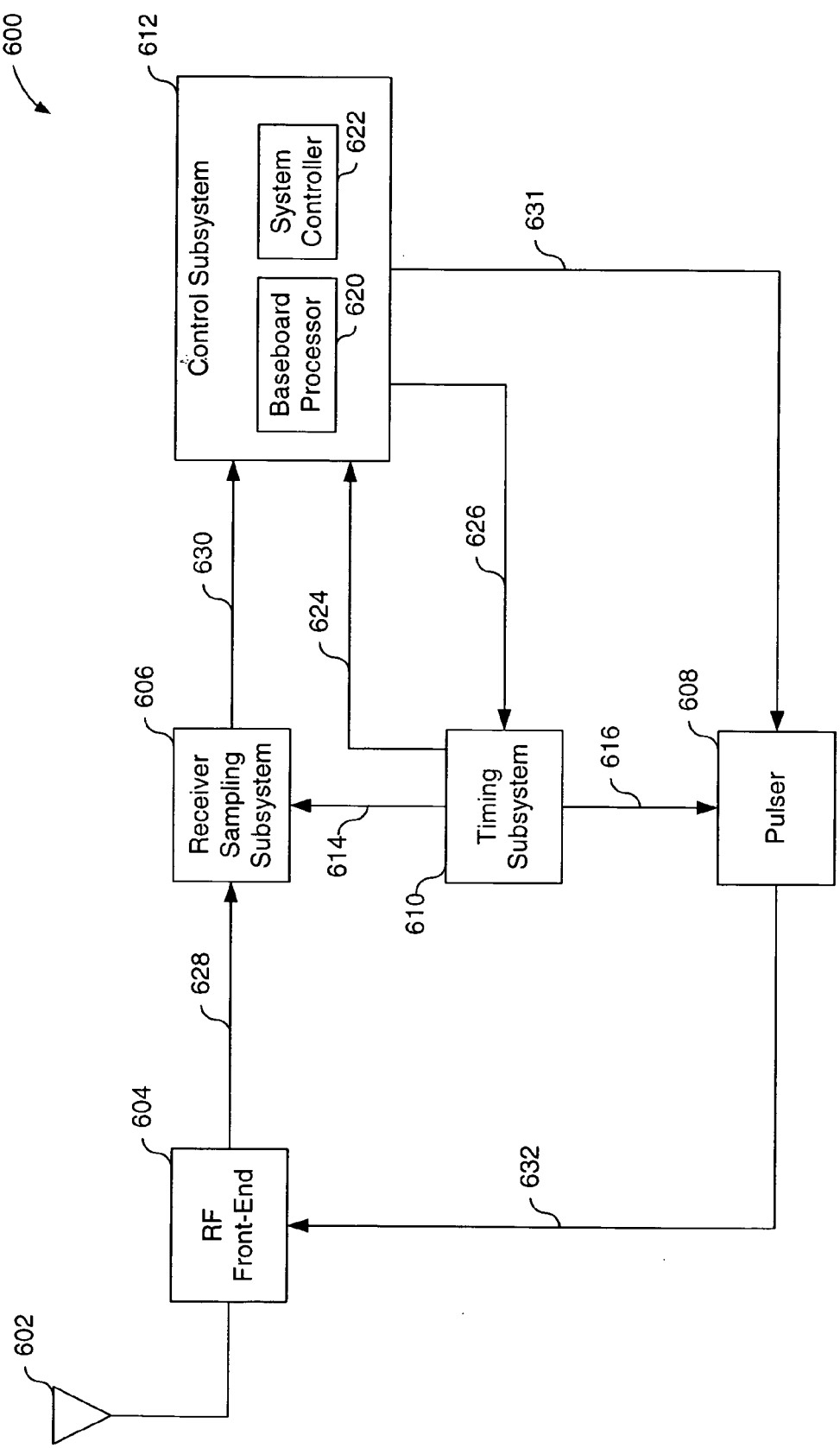
FIG. 6 is an illustration of an example general purpose architecture for an impulse radio.

FIG. 6 is an illustration of an example architecture for an impulse radio transceiver 600. Impulse radio 600 includes an antenna 602 coupled to an RF front-end 604. RF front-end 604 is coupled to a receiver RF sampling subsystem 606 for sampling RF receive signals and a transmitter pulser 608 for generating RF transmit impulses. Receiver RF sampling subsystem 606 and pulser 608 are coupled to a timing subsystem 610 and a control subsystem 612. Timing subsystem 610 provides a sampling control signal 614 to receiver RF sampling subsystem 606 and a transmit timing control signal 616 to pulser 608. Control subsystem 612 includes a baseband processor 620 and an impulse radio system controller 622 for controlling receive and transmit operations in impulse radio 600. Control subsystem 612 receives a timing signal 624 from timing subsystem 610 and provides timing control commands 626 to the timing subsystem.

In transmit operation, baseband processor 620 provides a modulated data signal 631 to pulser 608. In response to modulated data signal 631 and transmit timing control signal 616 received from timing subsystem 610 pulser 608 generates an RF transmit impulse signal 632 and provides the same to RF front-end 604. RF front-end 604 provides the transmit impulse signal to antenna 602.

In receive operation, antenna 602 receives signals, for example, an impulse signal, and provides a received impulse signal to RF front-end 604. RF front-end 604 in turn provides a conditioned, received impulse signal 628 to receiver RF sampling subsystem 606. Receiver RF sampling subsystem 606 samples conditioned, received impulse signal 628 in accordance with sampling signal 614 received from timing subsystem 610 and provides a sampled impulse signal 630 to baseband processor 620 of control subsystem 612.

Figure 7:
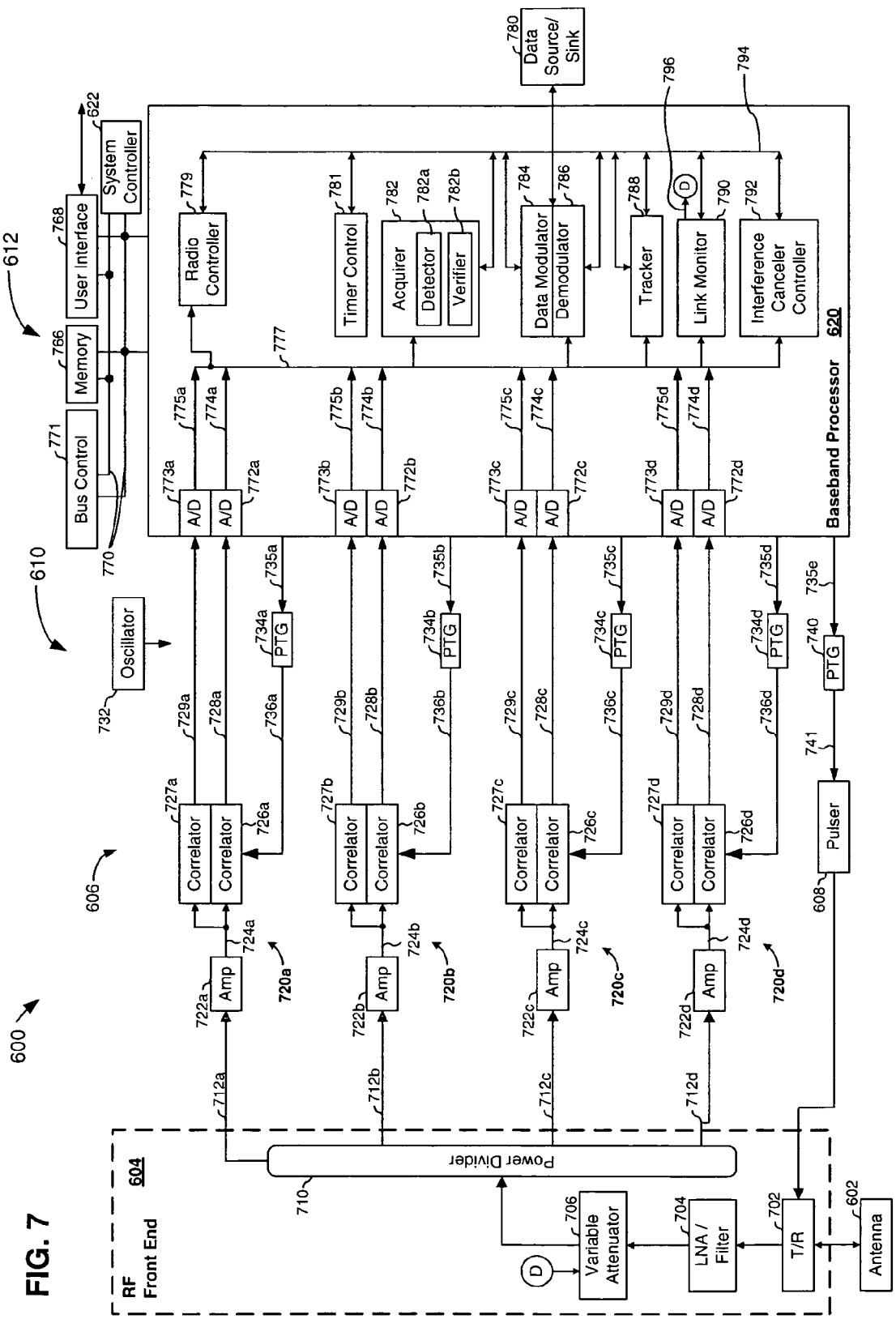
FIG. 7 is a more detailed block diagram of the impulse radio of FIG. 6.

FIG. 7 is a more detailed block diagram of impulse radio transceiver 600. RF front-end 604 includes a Transmit/Receive (T/R) switch 702 coupled to antenna 602 and pulser 608 for isolating a transmit path from a receive path in impulse radio 600. T/R switch 702 provides a received signal from antenna 602 to a Low Noise Amplifier (LNA)/RF filter 704. LNA/RF filter 704 provides an amplified and filtered received signal to an RF power-splitter 710 (also known as RF power divider 710) via a variable attenuator 706. RF power-splitter 710 divides the received signal from variable attenuator 706 into a plurality of parallel RF paths or channels. In one embodiment, RF splitter 710 divides the received signal four-ways to provide four RF receive channels 712*a*, 712*b*, 712*c*, and 712*d* (collectively and generally referred to as receive channels 712) to receiver RF sampling subsystem 606. The received RF signal from variable attenuator 706 is present in each of the receive channels 712.

B. RF Sampling Subsystem

Receiver RF sampling subsystem 606 includes four substantially identical, parallel RF sampling channels 720*a*, 720*b*, 720*c*, and 720*d* (also referred to as "RF samplers" or just "samplers" 720*a*-720*d*). Each of receive channels 712*a*-712*d* output from power-splitter 710 is provided to a respective one of parallel RF samplers 720*a*-720*d*. Since each RF sampler is substantially identical to each of the other RF samplers, the following description of RF sampler 720*a* suffices for the other RF samplers. RF sampler 720*a* includes an input amplifier 722*a* for amplifying an RF received signal received from associated receive channel 712*a*. Amplifier 722*a* provides an amplified RF received signal 724*a* to a pair of RF sampling correlators, including a first sampling correlator 726*a* and a second sampling correlator 727*a* associated with the first sampling correlator. First sampling correlator 726*a* correlates RF received signal 724*a* with sampling pulses derived from a sampling control signal (736*a*, discussed below), and provides a resulting first Sample/Hold (S/H) signal 728*a*, representing correlation results, to baseband processor 620.

Similarly, second sampling correlator 727*a* correlates RF received signal 724*a* with sampling pulses time synchronized with but slightly time offset from the sampling pulses derived from the sampling control signal (736*a*) provided to associated correlator 726*a*, and provides a resulting second Sample/Hold (S/H) signal 729*a*, representing correlation results, to baseband processor 620. Thus, sampling correlators 726*a* and 727*a* respectively produce first and second received signal samples slightly offset in time from one another.

Similarly, the other RF samplers 720*b*, 720*c*, and 720*d* respectively provide S/H baseband signal pairs (728*b*, 729*b*), (728*c*, 729*c*), and (728*d*, 729*d*) to baseband processor 620. Correlators 726*a*-726*d*, and respectively associated correlators 727*a*-727*d* operate as a plurality of single-stage down-converters for directly down-converting the received RF signal (in RF channels 712) to sampled baseband. Therefore, S/H signals 728*a*-728*d* and S/H signals 729*a*-729*d* are also referred to as received, sampled baseband signals 728*a*-728*d* and 729*a*-729*d*. For convenience, correlators 726*a*-726*d* and 727*a*-727*d* are also collectively and generally referred to as correlators 726 and 727, respectively. Also, S/H signals 728*a*-728*d* and 729*a*-729*d* are collectively and generally referred to as S/H signals 728 and 729, respectively.

C. Timing Subsystem

Timing subsystem 610 includes a master oscillator 732 and a plurality, such as four, Precision Timing Generators (PTGS) (also referred to as adjustable timers) 734*a*, 734*b*, 734*c*, and 734*d*, each associated with a respective one of RF samplers 720*a*, 720*b*, 720*c*, and 720*d*. For convenience, adjustable timers 734*a*-734*d* are collectively and generally referred to as adjustable timers 734. Master oscillator 732 provides a common reference clock signal to receiver RF sampling subsystem 606 timing subsystem 610 and controller subsystem 612.

Adjustable timer 734*a* receives a timing control signal 735*a* (also referred to as a timing control command 735*a*) from baseband processor 620, and derives sampling control signal 736*a* (mentioned above) based on the timing control command. Adjustable timer 734*a* provides sampling control signal 736*a* to RF sampler 720*a* to control when RF sampler 720*a* samples the received signal, as described above. Adjustable timers 734*b*-734*d* (collectively and generally referred to as adjustable timers 734) are arranged and operate in a similar manner with respect to associated RF samplers 720*b*-720*d* and baseband processor 620. In addition, baseband controller 620 can control each of adjustable timers 734 independently. In this manner, baseband processor 620 controls when RF samplers 720 sample the received signal in receiver 600.

In the depicted embodiment, a fifth adjustable timer 740 (also referred to as transmit timer 740) receives a transmit timing control signal 735e (also referred to as a transmit timing control command 735e) from baseband processor 620, and derives a transmit trigger signal 741 based on the transmit timing control command. Transmit time 740 provides transmit timing control signal 741 to transmitter pulser 608 to control when the pulser generates a transmit impulse. In another embodiment, the transmit trigger signal (for example, signal 741) can be provided by one of the PTGs (for example, PTG 734d), whereby transmit timer 740 can be eliminated to reduce a radio part count.

PTGs 734a-734d can be controlled (in a manner described below) such that respective sampling control signals 736a-736d can be time synchronized and coincident with each other, time synchronized but offset with respect to each other, or asynchronous with respect to each other. Correspondingly, PTGs 734a-734d can trigger respective correlators 726a-726d (and associated correlators 727a-727d) to respectively sample receive channels 712a-712d synchronously and coincidentally, synchronously but offset in time with respect to one another, or asynchronously with respect to each other. Correlators (such as correlators 726a-726d) and adjustable timers (such as timers 734a-734d) associated with the correlators can be added or removed as necessary to meet the requirements of any particular impulse radio based receive and/or transmit application. Also, PTG 740 (the transmit timer) can be controlled such that transmit trigger signal 741 can be time synchronized and coincident with one or more of sampling control signals 736a-736d, time synchronized but offset with respect to the sampling control signals, or asynchronous with respect to the sampling control signals.

D. Control Subsystem

Control subsystem 612 includes baseband processor 620 for implementing various transmit and receive signal processing functions, and for performing various receive and transmit control functions in impulse radio 600, as described above, and as will be further described below. Control subsystem 612 also includes system controller or processor 622 coupled to a memory 766 and a user interface 768. Baseband processor 620, system controller 622, memory 766 and user interface 768 are coupled together, and intercommunicate with one another, over a processor bus 770 including an address bus and a data bus. A bus controller 771 coupled to processor bus 770 assists in controlling transfers of data, information, and commands between the abovementioned elements coupled to the processor bus. For example, bus controller 771 arbitrates between various users of processor bus 770 based on data transfer priorities, and the like.

System controller 622 provides high level control over impulse radio 600. System controller 622 can receive inputs, such as user commands and data, via an input/output device (not shown) connected to user interface 768. Also, system controller 622 can send data to the input/output device via user interface 768. System controller 622 can send commands and data to baseband processor 620, and can receive data from the baseband processor. Information received through user interface 768 can be provided to memory 766.

E. Baseband Processor

Over processor bus 770, baseband processor 620 can request and receive information and commands, used for the baseband signal processing and control functions, from both memory 766 and system controller 622. Baseband processor 620 provides dedicated timing control commands 735a-735d (collectively and generally referred to as timing control commands 735) to each of PTGs 734 to respectively control the timing of sampling control signals 736, as described above. In this manner, baseband processor 620 can independently control when each of RF samplers 720 samples the received signal. In an alternative embodiment, baseband processor 620 can provide the timing control commands to PTGs 736 over an extended processor bus, similar to processor bus 770, coupled between baseband processor 620 and timing subsystem 610. In addition, baseband processor 620 provides demodulated data to and receives information (for example, to be modulated) from a data source/sink 780.

Baseband processor 620 includes a plurality of Analog-to-Digital converters (A/Ds) to digitize baseband signals 728 and 729 received from receiver RF sampling subsystem 606. For example, a pair of such A/Ds associated with RF sampler 720a includes first and second A/Ds 772a and 773a to respectively digitize S/H baseband signals 728a and 729a, to produce respective digitized baseband signals 774a and 775a. A/Ds 772a and 773a provide respective digital baseband signals 774a and 775a to a digital baseband signal bus 777 coupled to the various signal processing functions of baseband processor 620. Further baseband processor A/D pairs (772b, 773b), (772c, 773c) and (772d, 773d) are arranged and operate in a similar manner with respect to associated RF samplers 720b-720d and digital baseband signal bus 777. For convenience, A/Ds 772a-772d and 773a-773d are collectively and generally referred to as A/Ds 772 and 773, respectively. Similarly, digital baseband signals 774a-774d and 775a-775d are collectively and generally referred to as digital baseband signals 774 and 775, respectively.

Digital baseband signals 774 and 775 can include trains of digital data samples. Therefore, baseband processor 620 includes a data memory, such as a register buffer, Random Access Memory, or the like, to store the digital data samples, whereby the digital data samples are available to the baseband signal processing and control functions of the baseband processor.

Baseband processor 620 includes a plurality of signal processing functional blocks, such as, but not limited to:
1) radio controller 779;
2) a timer control 781;
3) a signal acquirer 782, including a signal detector 782a and a signal verifier 782b;
4) a data modulator 784 and a data demodulator 786;
5) a received signal tracker 788;
6) a link monitor 790; and
7) an interference canceler controller 792.

The various signal processing functional blocks mentioned above can exchange information/signals with one another, as necessary, using known techniques. For example, such an exchange of information/signals can occur over a signal processor communication bus 794, coupled between the signal processing functional blocks, within baseband processor 620.

Radio controller 779 performs various control functions within baseband processor 620. Radio controller 779 can receive data from and pass data to processor bus 770 and data source/sink 780. Radio controller 779 performs low level protocol handling. For example, radio controller 779 can function as an intermediate protocol handler between modulator 784 (or demodulator 786) and either of system controller 622 and data source/sink 780. For example, radio controller 779 can receive data packets from system controller 622, and then partition the data packets, encode the partitioned data packets, and dispatch the partitioned, encoded data packets to the modulator. Radio controller 779 can also calibrate A/Ds 772 and 773, and control variable attenuator 706 in RF front end 604.

Data modulator 784 modulates information data received from data source/sink 780, and communicates modulated data to pulser 608 for subsequent RF transmission from antenna 602. In one embodiment, data modulator 784 derives transmit timing control command 735*e* based on the modulated data. In response to transmit timing control command 735*e*, transmit timer 740 derives transmit trigger 741. In this manner, data modulator 784 controls triggering of pulser 608 in accordance with the modulated data derived by the data modulator.

Data demodulator 786 demodulates digitized baseband signals 774 and 775 produced by respective A/Ds 772 and 773 to recover information transmitted, for example, from a remote impulse radio transmitter. For example, data demodulator 786 demodulates received symbols in baseband signals 774 and 775. The recovered information can be provided to data source/sink 780. Data demodulator 786 can implement all of the signal processing functions necessary to support any given application. For example, data demodulator 786 can include an impulse amplitude accumulator for accumulating impulse amplitudes, logic to effect demodulation decisions, logic to measure an impulse amplitude and a received impulse Time-of-Arrival (TOA), and so on, as needed to support any now known or future communication and/or radar applications, as well as to determine a separation distance between impulse radios based on amplitude, and so on. Data demodulator 786 also provides information to the other signal processing functions of baseband processor 620.

Signal Tracker 788 locks onto and tracks the timing of a received impulse signal represented by digitized baseband signals 774 and 775 produced by A/Ds 772 and 773. In one embodiment, signal tracker 788 cooperates with an RF sampler (for example, RF sampler 720*a*), an adjustable timer associated with the RF sampler (for example, timer 734*a* and/or oscillator 732), and timer control 781, to form a Lock Loop for deriving a system timing signal (such as a sampling control signal), indicative of impulse TOAs in the received impulse signal, and used to sample impulses in the impulse signal. The system timing signal derived by the above mentioned Lock Loop can be made available to all of the signal processing functional blocks in baseband processor 620. Based on this system timing signal, baseband processor 620 can provide timing control commands to each of PTGs 734 to control when each of the associated correlators 726 and 727 samples the received signal, in relation to, for example, a received impulse signal.

Timer control 781 receives timing information from the other signal processing functional blocks in baseband processor 620 and translates the timing information into timing control commands compatible with PTGs 734. Timer control 781 also manages the delivery of the timing control commands to the PTGs 734. Timer control can also include Lock Loop elements, such as a PN code generator, and the like, to assist signal tracker 788 in deriving system timing.

Link Monitor 790 monitors a received impulse signal, as represented by digitized baseband signals from A/Ds 772 and 773, and demodulated information provided by demodulator 786, to determine, inter alia, transmitter-receiver propagation link performance and impulse signal propagation characteristics. Link monitor 790 determines such link performance and propagation characteristics based on received signal quality measurements, such as received impulse signal-to-noise level, symbol error rate, and so on. Based on such determined link performance, link monitor 790 provides an attenuator control command 796 to variable attenuator 706 in RF front-end 604, thereby commanding the variable attenuator to a desirable attenuation setting.

Interference canceler controller 792 implements interference canceler algorithms and controls interference canceling in impulse radio 600, to effect interference canceling in accordance with the various embodiments disclosed in the applications entitled "Method and System for Reducing Potential Interference in an Impulse Radio" and "Method and System for Canceling Interference in an Impulse Radio", which have been incorporated by reference above.

F. Paired Correlators

The paired correlators in each of RF samplers 720 can be arranged to sample a received signal in such a way as to support, inter alia, various types of modulation and demodulation techniques, such as those described in U.S. patent application Ser. No. 09/538,519, filed Mar. 29, 2000, entitled "Vector Modulation System and Method for Wideband Impulse Radio Communications," and U.S. patent application Ser. No. 09/537,692, filed Mar. 29, 2000, entitled "Apparatus, System and Method for Flip Modulation in an Impulse Radio Communication System." Accordingly, the first and second correlators in each RF sampler are respectively triggered to sample the received signal at first and second sampling times that are synchronized and slightly time offset from one another, as is now more fully described.

Figure 8A:
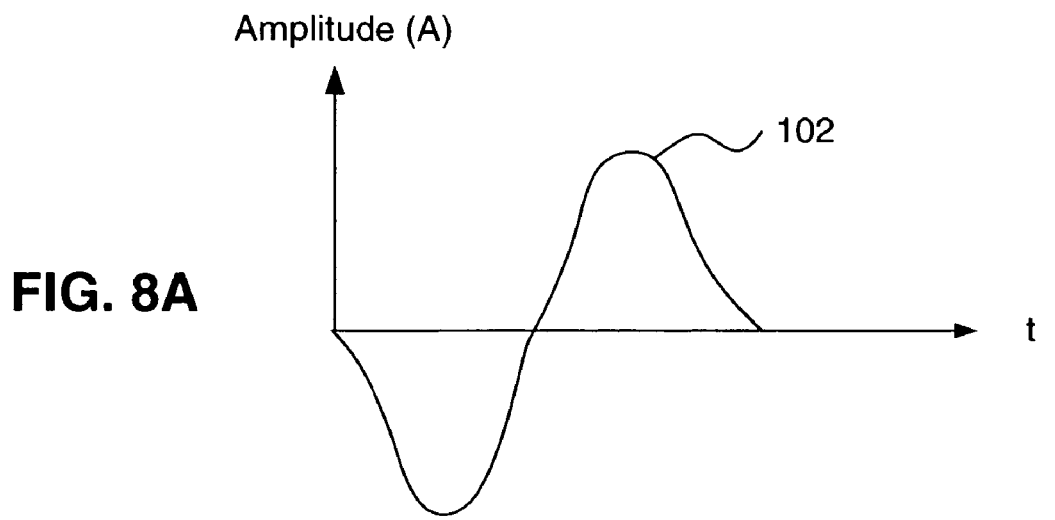
FIG. 8A is an illustration of a transmitted impulse transmitted by a remote impulse radio and received by an impulse radio antenna.
Figure 8B:
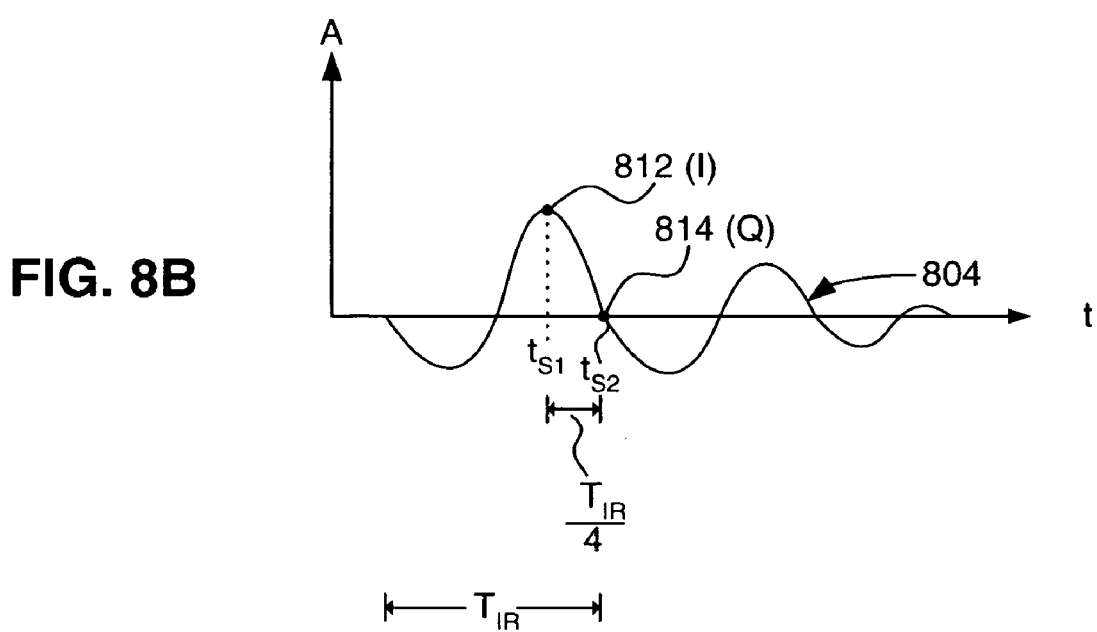
FIG. 8B is an illustration of an example impulse response of an impulse radio receiver front-end.

FIG. 8A is an illustration of impulse 102 transmitted by a remote impulse radio and received by antenna 602. Impulse 102 passes through a series of receiver components (such as RF front end 604, amplifier 722*a*, and so on, as described above) in a receive path of impulse radio 700 before the signal arrives at an input to any one of sampling correlators 726 and 727. Such a receive path, leading into any one of correlators 726 and 727, has a receive response (that is, a time-domain receive path response) to applied impulse 102. The receive path response is based on the individual responses of each of the receive path components to the impulse 102. FIG. 8B is an illustration of an example receive path response 804. Receive path response 804 has a cycle period TIR approximately equal to, but not necessarily the same as, a cycle period of transmitted impulse 102.

To take advantage of the above mentioned modulation and demodulation techniques, such as vector modulation and demodulation, the first and second correlators (for example, correlators 726*a* and 727*a*) in each pair of correlators in impulse radio 700 can be arranged to sample the received signal in the following manner: the first correlator samples the received signal at a first sample time tS1 to produce a first received signal sample 812 (for example, as depicted in FIG. 8B); and the second correlator samples the received signal at a second sample time tS2, spaced in time from the first sample time tS1 by a time interval that is a fraction of receive path response cycle period TIR, to produce a second (delayed) received signal sample 814. In one embodiment, first sample 812 and second sample 814 are spaced in time from one another by a time interval TIR/4 (that is, by a quarter of receive path response cycle period TIR). When first and second samples 812 and 814 are spaced from each other by a quarter of a cycle of receive path response 804, first and second samples 812 and 814 are "in-quadrature" (that is, the first and second samples have a quadrature relationship to one another, with respect to receive path response 804), and thus can be referred to as an In-phase (I) and Quadrature (Q) sample pair (also referred to as a sample pair), where first sample 812 is the I sample, and delayed sample 814 is the Q sample.

In other embodiments, and more generally, second sample 814 can be delayed from first sample 812 by a time delay different from a quarter of a cycle of receive path response 804, whereby the first and second samples are no longer in-quadrature. Since first sample 812 and second, delayed sample 814 can be separated by other than a quarter of a cycle of receive path response 804, first sample 812 and second sample 814 are more generally referred to as a reference "I" sample and a delayed "J" sample, respectively. This generalized first I sample and second J sample (I-J sample pair) naming convention is introduced and further described in U.S. patent application Ser. No. 09/538,519, filed Mar. 29, 2000, entitled "Vector Modulation System and Method for Wideband Impulse Radio Communications," mentioned and incorporated by reference above. The generalized I-J sample pair naming convention is used in the description below, with the understanding that the delayed J sample (for example, sample 814) can be delayed relative to the reference I sample (for example, sample 812) by a time delay less than, equal to, or more than a quarter of a cycle of receive path response 804. Moreover, it is to be understood the time delay between the I and J samples can be controlled in a receiver of the present invention to support proper operation of the receiver in any impulse radio application requiring the time delay, such as vector demodulation, for example. A mechanism by which the time delay can be controlled is not the subject of the present invention, and therefore, is discussed no further.

Figure 9:
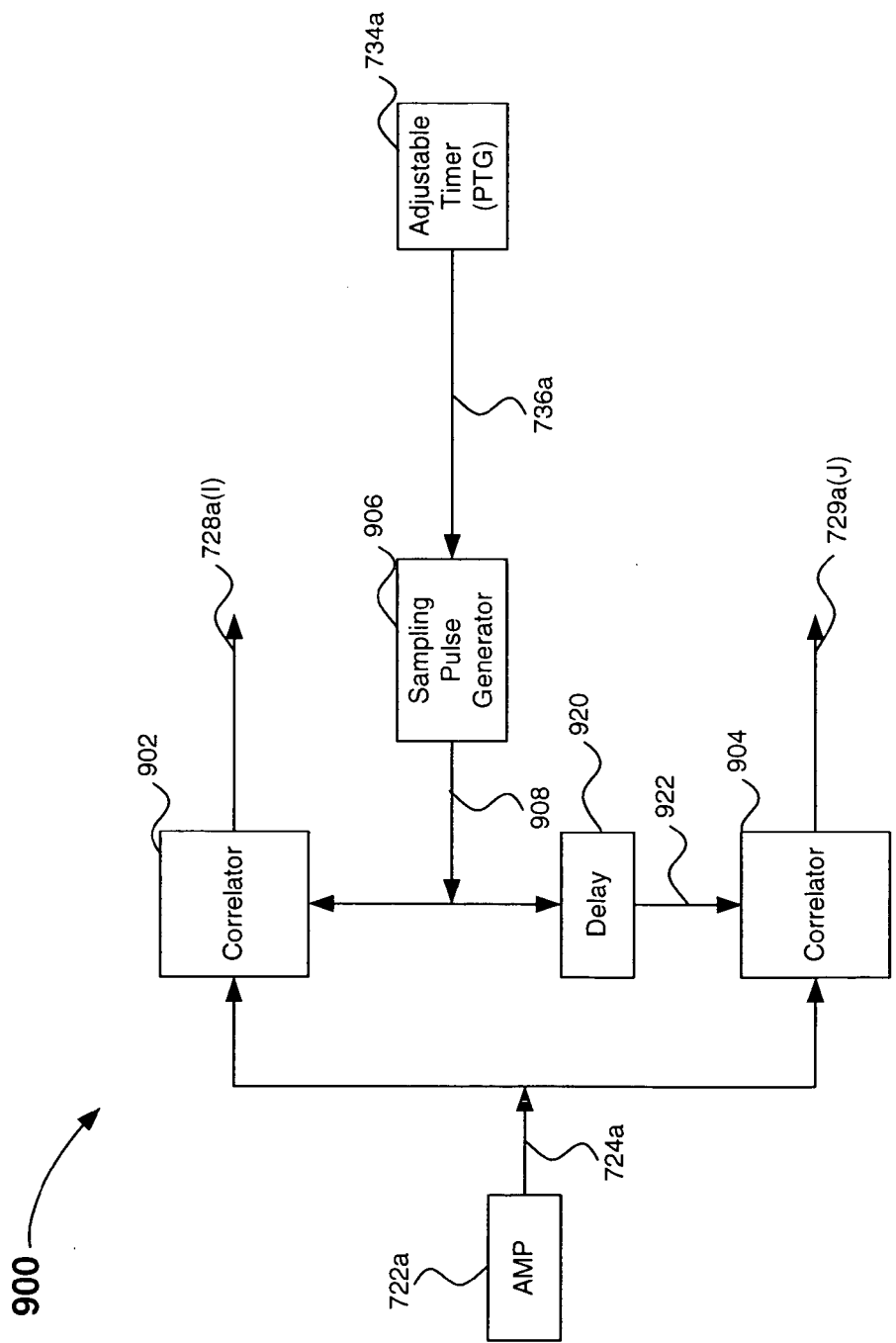
FIG. 9 is a block diagram of an example (IJ) correlator pair arrangement corresponding to a sampling channel in the impulse radio of FIG. 7.

FIG. 9 is a block diagram of an example correlator pair arrangement 900, corresponding to RF sampler 720a, for example. Correlator pair arrangement 900 includes a first correlator 902 (I correlator) and a second correlator 904 (J correlator) (respectively corresponding to first and second correlators 726a and 727a, for example). Adjustable timer 734a provides sampling control signal 736a to a sampling pulse generator 906.

In response to sampling control signal 736a, sampling pulse generator (also referred to as a pulse shaping circuit) 906 derives a first sampling signal 908 having an amplitude characteristic (that is, pulse shape) determined by the sampling pulse generator. Pulse shaping circuit 906 provides first sampling signal 908 to first correlator 902 and to a delay 920. First correlator 902 preferably comprises a multiplier followed by a short term integrator to sum the multiplied product between received signal 724a and first sampling signal 908. First correlator 902 preferably includes a sample-and-hold circuit at an output of the integrator for storing a correlation result, so as to produce S/H signal 728a. In this manner, first correlator 902 samples received signal 724a in accordance with first sampling signal 902 to produce S/H signal 728a (which includes I samples).

Delay 920 delays first sampling signal 908 by a fraction of cycle period TIR (such as quarter cycle period TIR/4) as described above, to produce a delayed sampling signal 922 (also referred to as a second sampling signal 922). Delay 920 provides delayed sampling signal 922 to second correlator 904. Second correlator 904 samples received signal 724a in accordance with delayed sampling signal 922 to produce S/H signal 729a (which includes J samples).

In an alternative embodiment, sampling pulse generator 906 is incorporated into adjustable timer 734a, whereby adjustable timer 734a provides a sampling signal directly to both correlator 902 and delay 920. In another embodiment, either or both of sampling pulse generator 906 and delay 920 can be incorporated into correlator 902, whereby adjustable timer 734a provides sampling control signal 736a directly to correlator 902.

FIG. 10A is an example timing waveform representing sampling control signal 736a. Sampling control signal 736a includes a train of pulses 1002.

FIG. 10B is an example timing waveform representing first sampling signal 908, derived by sampling pulse generator 906. First sampling signal 908 includes a train of sampling pulses 1004, each corresponding to an associated one of pulses 1002. Each of the sampling pulses 1004 is approximately square shaped for practical reasons, however, sampling pulse generator 906 can derive sampling pulses having other shapes. For example, each of the sampling pulses can have a pulse shape substantially equivalent to received impulses in a received impulse signal. For example, if the impulse radio antenna differentiates transmitted impulses (received at the antenna), then sampling signal 908 can consist of pulses that are substantially equivalent to the first derivative of the transmitted impulses. From a practical standpoint, sampling signal 908 consists of square pulses since square pulses can be generated with less complex receiver logic.

Each of sampling pulses 1004 directly controls receive signal sampling by correlator 902. That is, correlator 902 correlates received signal 724a with each of sampling pulses 1004 during a time interval corresponding to a width 1006 (also referred to as a sampling window 1006) of the sampling pulses 1004. The width of each of sampling pulses 1004 is preferably less than ½ the pulse width of a received impulse and centered about a center amplitude peak of the received impulse. For example, where received impulses are approximately 0.5 ns wide, the square pulses are preferably approximately 0.125 ns wide.

FIG. 10C is an example timing waveform representing second sampling signal 922, produced by delay 920. Second sampling signal 922 includes a train of sampling pulses 1008, each delayed with respect to an associated one of pulses 1004. Pulses 1008 control receive signal sampling by correlator 904 in the same manner pulses 1004 control receive signal sampling by correlator 902.

Impulse radio 600, described above in detail in connection with FIGS. 6 and 7, and the further impulse radio functionality described above in detail in connection with FIGS. 8-9, and 10A-10C, together represent an interrelated collection of impulse radio functional blocks (or functional building blocks) from which different impulse radio embodiments (including, for example, receiver architectures and methods) can be constructed, in accordance with the principles of present invention. Accordingly, the impulse radio receivers (or receiver subsystems) described below, which operate in accordance with the example methods of the present invention, also described below, include many of the impulse radio functional blocks described above.

For convenience, any impulse radio functional block and/or signal originally described above (for example in connection with FIG. 7 and FIG. 9), shall retain its original reference designator (as designated, for example, in FIG. 7 and FIG. 9) when it is included in a subsequent impulse radio embodiment, such as those described below. The original reference designator shall be retained even when the function or characteristics of the originally described functional block and/or signal is slightly modified by or slightly different in the subsequent embodiment. However, any difference between the original and subsequent functionality shall be described.

G. Lock Loop

A description of an exemplary lock loop used for tracking an impulse signal (e.g., 1102) is now explained with reference to FIG. 11, which shows a portion of impulse radio transceiver 600. In the present invention, such tracking occurs after frame first stage acquisition of the present invention, where course frame alignment is achieved and code synchronization is achieved to the extent of an acquisition short code of the present invention. First stage acquisition of the present invention is described in more detail below.

While transceiver 600 is tracking, correlator 726a (also referred to as sampler 726a) samples received signal 724a at sample times coinciding with expected impulses in received signal 724a. More specifically, precision timing generator (PTG) 734a receives a periodic timing signal 1156 from a time base 1150 (e.g., oscillator 732 in FIG. 7). Time base 1150 is adjustable and controllable in time, frequency, or phase, as required by the lock loop in order to lock on received signal 724a. A code source 1152 receives a timing signal 1154 from time base 1150 (and/or a synchronization signal 1158 from PTG 734a). PTG 734a also receives a code control signal 735a (also referred to as a timing control command 735a) from code source 1152 of baseband processor 620. PTG 734a utilizes the periodic timing signal 1156 and code control signal 735a to produce coded timing signal 736a. Sampling correlator 726a samples received signal 724a, based on coded timing signal 736a, and outputs S/H baseband signal 728a. A/D 772a converts baseband signal 728a to a digitized baseband signal 774a. Digitized baseband signal 774a can be, for example, used for further stages of signal acquisition or demodulation, depending on the situation. Further examples and details of correlation and sampling processes can be found in the above-referenced patents and U.S. Pat. No. 6,421,389, issued Jul. 16, 2002, entitled "Baseband Signal Converter Device for a Wideband Impulse Radio Receiver," which is incorporated herein in its entirety by reference.

Digitized baseband signal 774a is also provided to a lock loop filter 1148 (e.g., a low pass filter). The output of filter 1148 is a filtered error signal 1168, which provides adjustments to adjustable time base 1150 to time position the periodic timing signal 1156 in relation to received signal 724a. In other words, a lock loop including filter 1148, time base 1150, PTG 734a, correlator 726a, and A/D 772a is used to generate a filtered error signal 1168, which adjusts time base 1150.

As explained throughout this application, multiple samples are often accumulated (i.e., integrated) for integration gain. For example, as shown in FIG. 11, an accumulator 1114 (which can be a ramp builder of the present invention) accumulates a plurality of digitized baseband signal values of digitized baseband signal 774a to produce an accumulated digitized baseband signal 1116. Accordingly, Lock Loop filter 1148 can derive timing error signal 1168 based on accumulated signal 1116, rather than signal 774a. This accumulated signal 1116 preferably consists of ramp values produced by a ramp builder of the present invention.

The above description is just one example of a lock loop that can be used to track a received impulse signal. Those of ordinary skill in the relevant art will appreciate that tracking can be accomplished in various other manners while still being within the spirit and scope of the present invention.

III. Preferred Embodiments of the Present Invention

A. Terminology

To more clearly explain the present invention, an effort is made throughout the specification to adhere to the following term definitions as consistently as possible.

The term "packet" refers to a plurality of frames, including header frames followed by data payload frames. One or more trailer frames can follow the data payload frames. A packet can include a delimiter that separates the header and the data payload. A packet can also include one or more ratchet codes of the present invention. A packet can also include command bits prior to the data payload. Packets are discussed in more detail with reference to FIGS. 12A and 12B.

The term "frame" refers to a fixed interval of time (e.g., 100 nsec) within which one or more impulses can be positioned. Each frame has a start time and an end time, each defining a frame boundary. A frame of an impulse signal received by an impulse radio receiver is often referred to as a "received frame".

The term "sample frame" refers to a fixed interval of time within which a receiver attempts to sample one or more impulses of a received signal. Each sample frame has a initial frame time and an end time, each defining a sample frame boundary. A received frame and a sample frame are not the same entity. A sample frame is a receivers guess as to when a received frame occurs.

The term "frame offset" refers to the time separating a boundary (i.e., the start or end boundary) of a received frame and one of the two closest boundaries of a sample frame. If a boundary of a sample frame is roughly aligned (in time) with a boundary of a received frame, there is no frame offset (i.e., FO≈0). When a boundary of a sample frame is not aligned with a boundary of a received frame, there is a frame offset defined by the time separating the boundaries (i.e., FO>0; e.g., FO=32 nsec).

The term "frame alignment" refers to the extent to which sample frames (i.e., of receiving equipment) are time aliged (i.e., synchronized) with respect to receive frames of a received signal. When the frames are properly aligned (i.e., frame alignment has been achieved) there is no frame offset (i.e., FO≈0), and it can be said that the frames have been synchronized.

The term "code" refers to a rule defining a time ordered series of frames and one or more positions of impulses within each of the frames. The position of an impulse within a frame (also referred to as an impulse position) refers to the time offset between the start of a frame and the start of the impulse.

The term "short acquisition code" refers to a relatively short code (as compared to a code used to encode data) that is defined by a packet protocol. The short acquisition code defines where impulses are positioned within specific frames of a packet header. A short acquisition code is also referred to as a "repeating short acquisition code".

The term "acquisition code sequence" refers to a time ordered series of frames that are defined by the short acquisition code. More specifically, the short acquisition code defines where one or more impulses are positioned within each frame of the time ordered series of frames. An acquisition code sequence is also referred to as a "repeating acquisition code sequence" because a plurality of identical acquisition code sequences are included in a packet header. An acquisition code sequence is used by an impulse radio receiver to acquire both proper frame alignment and short code synchronization in accordance with embodiments of the present invention.

The term "long code" refers to a relatively long code (as compared to the short code) that it used to encode information (i.e., data) in a data payload portion of a packet.

The term "code offset" refers to where in a code sequence a received signal is as compared to a given time. For example, a code offset can refer to where in a received signal a code sequence actually is as compared to where a receiver thinks the code is. This will be further explained in connection with FIGS. 13, 18, and 19.

The term "delimiter" refers to one or more frames in a packet that is used to indicate the end of the header and the beginning of the data payload in the packet.

The term "ratchet code" refers to one or more frames in a packet header, following the last repeating acquisition code sequence, that enables a receiver to resolve the ambiguity that results from an integration length (see below) being greater than the number of ramp builders. The one or more ratchet codes in a packet is/are located prior to the delimeter (i.e., between the last acquisition code sequence and the delimiter).

The term "integration length" refers to the number of samples of a received signal that are accumulated (e.g., by an integrator or ramp builder) prior to the receiver making a decision. Typically, a greater integration length provides increased integration gain, and thus, an improved signal to noise (S/N) ratio. The integration length is also referred to as the "ramp integral length," which is often designated "N".

The term "ramp builder" refers to a portion of hardware and/or receiver functionality that is used to accumulate (i.e., integrate) samples of a received signal.

The term "accumulated ramp value" refers to a sum of a plurality of samples of a received signal. Within this specification, the term "accumulated ramp value" typically refers to the output of a ramp builder. If a receiver includes a plurality of ramp builders, then the receiver can produce a plurality of accumulated ramp values in parallel. For example, if a receiver includes four (4) ramp builders, the receiver can produce four (4) accumulated ramp values in parallel (that is, concurrently).

The term "protocol" refers to a specific set of rules, procedures or conventions relating to format and timing of transmissions between two devices.

The term "packet protocol" refers to the format of an impulse signal packet, which is known by impulse radios in communications with one another. A packet protocol according to an embodiment of the present invention defines: the integration length (also referred to as the ramp interval length N); the length of a repeating short acquisition code; the actual short acquisition code sequence; the number of short acquisition code sequences per packet; the length of each ratchet code sequence; each actual ratchet code sequence; the number of different unique ratchet code sequences per packet; the number of each different unique ratchet code sequence per packet; the actual delimeter sequence; the long code used to encode the data payload; and the length of the data payload.

The term "receiver sample timeline" (also referred to as sample timeline) refers to a timeline established by a receiver to define when the receiver samples a received signal. The timeline has a start time that indicates when the receiver begins to sample the received signal. The receiver sample timeline includes a series of sample frames, wherein the start time of the receiver sample timeline identifies the start boundary of an initial sample frame (of the series of sample frames).

B. Exemplary Packets

It is useful to describe an exemplary packet of a received impulse signal prior to explaining the present invention in detail.

Figure 12A:
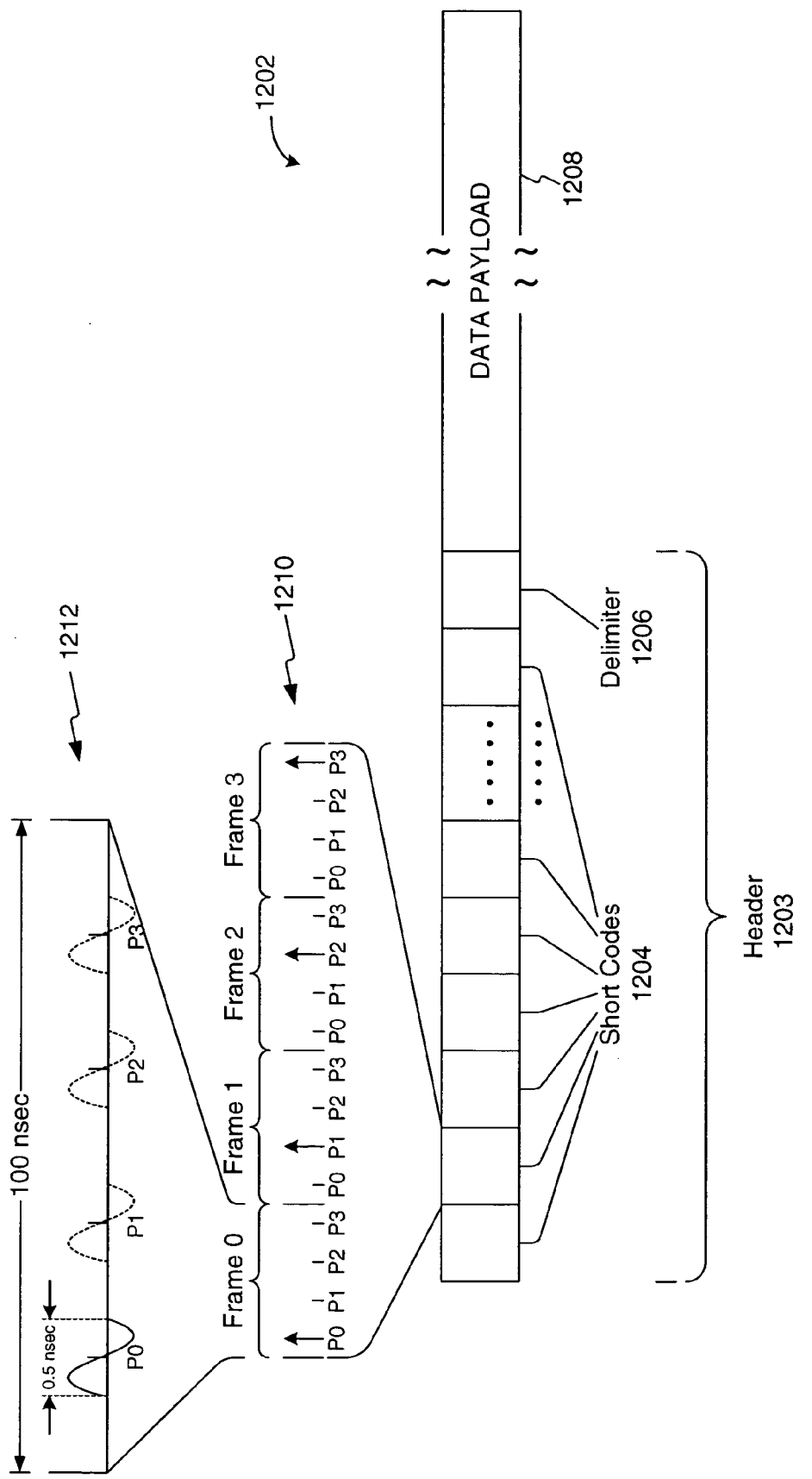
FIGS. 12A and 12B illustrate exemplary packets 1202 transmitted by an impulse radio transmitter, according to embodiment of the present invention.

FIG. 12A illustrates an exemplary packet 1202 transmitted by an impulse radio transmitter. Packet 1202 includes a header portion 1203 (also referred to as a header 1203) followed by a data payload portion 1208 (also referred to as a data payload 1208). Header 1203 includes a plurality of acquisition short code sequences 1204 (referred to as a plurality of short codes 1204) followed by a delimeter 1206. The plurality of acquisition short code sequences 1204 are referred to as a repeating short code when each of the plurality of short codes are identical to one another, as depicted in FIG. 12A. Such repeating short code sequences are used by an impulse radio receiver to quickly and efficiently acquire both frame and code synchronization, in a manner described below. Delimeter 1206 indicates an end of header 1203 and a beginning of data payload 1208.

Exemplary details of an acquisition code sequence 1204 are depicted as an exploded view 1210 in FIG. 12A. As depicted in exploded view 1210, the exemplary acquisition code sequence includes four consecutive frames Frame 0 (F0), Frame 1 (F1), Frame 2 (F2) and Frame 3 (F3), and therefore, has a length of four frames. The exemplary short acquisition code sequence repeats every four frames, and thus is referred to as a modulo-4 (i.e., length 4) short acquisition code sequence. In this example, each frame (e.g., F0, F1, F2, or F3) includes an impulse that is located at a predefined one of four different positions as defined by the code, where P0 represents a zeroth position, P1 represents a first position, P2 represents a second position, and P3 represents a third position. In the example shown, the exemplary acquisition code is P0, P1, P2, P3. That is, the exemplary acquisition code sequence consists of an impulse in position P0 in zeroth frame F0, an impulse in position P1 in first frame F1, an impulse in position P2 in second frame F2, and an impulse in position P3 in third frame F3. Stated another way, the hop sequence of the acquisition short codes is P0, P1, P2, P3. The length of the short acquisition code is preferably equal to the number of ramp builders (in the receiver) that are used by the receiver to acquire an impulse signal so that the ramp builders may operate concurrently to quickly and efficiently achieve initial frame alignment. Thus, in the above example, it is assumed that the receiver includes four ramp builders (a portion of hardware and/or receiver functionality, discussed in more detail below) that can be used to acquire a received impulse signal.

Exemplary details of frame F0 are depicted in exploded view 1212 of FIG. 12A, wherein the width of frame F0 (and of each of the other frames F1-F3) is 100 nsec, and the width of each impulse within the frame is approximately 0.5 nsec. As shown in view 1212, the impulse is in position P0 in zeroth frame F0. Impulses at positions P1, P2 and P3 are shown in dotted line to illustrate alternative pulse position possibilities that impulses could occupy in accordance with alternative codes of the present invention. It is noted that exploded view 1212, and the rest of FIG. 12A, are not necessarily drawn to scale.

The acquisition code sequence P0, P1, P2, P3 is just one example of a module-4 acquisition code. Another example of a modulo-4 acquisition code is P1, P3, P0, P2. Two further examples of modulo-4 acquisition codes include: 1) P0, P2, P3, P1; and 2) P0, P1, P3, P2. As will be explained in more detail, alternative code lengths can be used (e.g., a modulo-8 acquisition code, a modulo-16 acquisition code, etc.).

Following the plurality of repeating acquisition code sequences 1204 is a delimeter 1206. Delimeter 1206 separates header 1203 from data payload 1208 and indicates that the frames following the delimeter are frames of data payload 1208 (e.g., that include symbols to be demodulated). In one embodiment, delimeter 1206 includes the same number of frames as short acquisition code sequence 1204. Thus, according to this embodiment and the example shown in FIG. 12A, delimeter 1206 is four (4) frames in length. In another embodiment, described below in reference to FIG. 12B, delimeter 1206 includes an integer multiple of the number of frames included in the acquisition code sequence 1204. Following delimeter 1206 is data payload 1208, which, for example, includes information to be demodulated by an impulse radio receiver.

Figure 14:
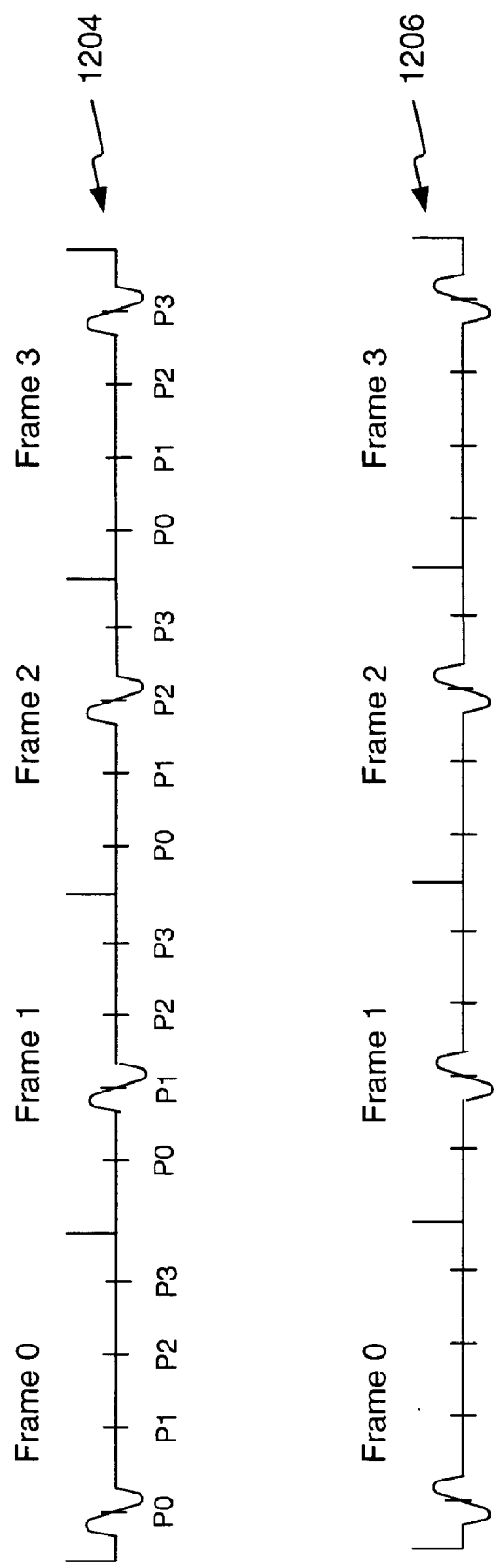
FIG. 14 shows an exemplary acquisition code sequence and its corresponding delimiter.

According to an embodiment of the present invention, the delimiter is identical to the acquisition code sequence except that each impulse is flipped. Thus, based on the example shown in FIG. 12A, the delimiter would include four frames, with a flipped impulse in position P0 in the frame F0, a flipped impulse in position P1 in frame F1, a flipped impulse in position P2 in frame F2, and a flipped impulse in position P3 in frame F3. This is illustrated in FIG. 14, which shows an exemplary acquisition code sequence 1204 and its corresponding delimiter 1206. Systems and methods for producing flipped impulses are disclosed in commonly assigned copending U.S. patent application Ser. No. 09/537,692, filed Mar. 29, 2000, entitled, "Apparatus, System and Method for Flip Modulation in an Impulse Radio Communication System," which is incorporated herein by reference in its entirety.

Returning to the discussion of FIG. 12A, according to one exemplary embodiment, packet 1202 includes forty (40) short acquisition code sequences 1204, followed by one (1) delimiter 1206, followed by one thousand (1000) bits worth of frames (e.g., 1000·N frames, where N is the data integration length) of payload data 1208. One of ordinary skill in the art will appreciate that packets including other numbers of short code sequences, delimiters, and frames of data payload are within the spirit and scope of the present invention.

Figure 12B:
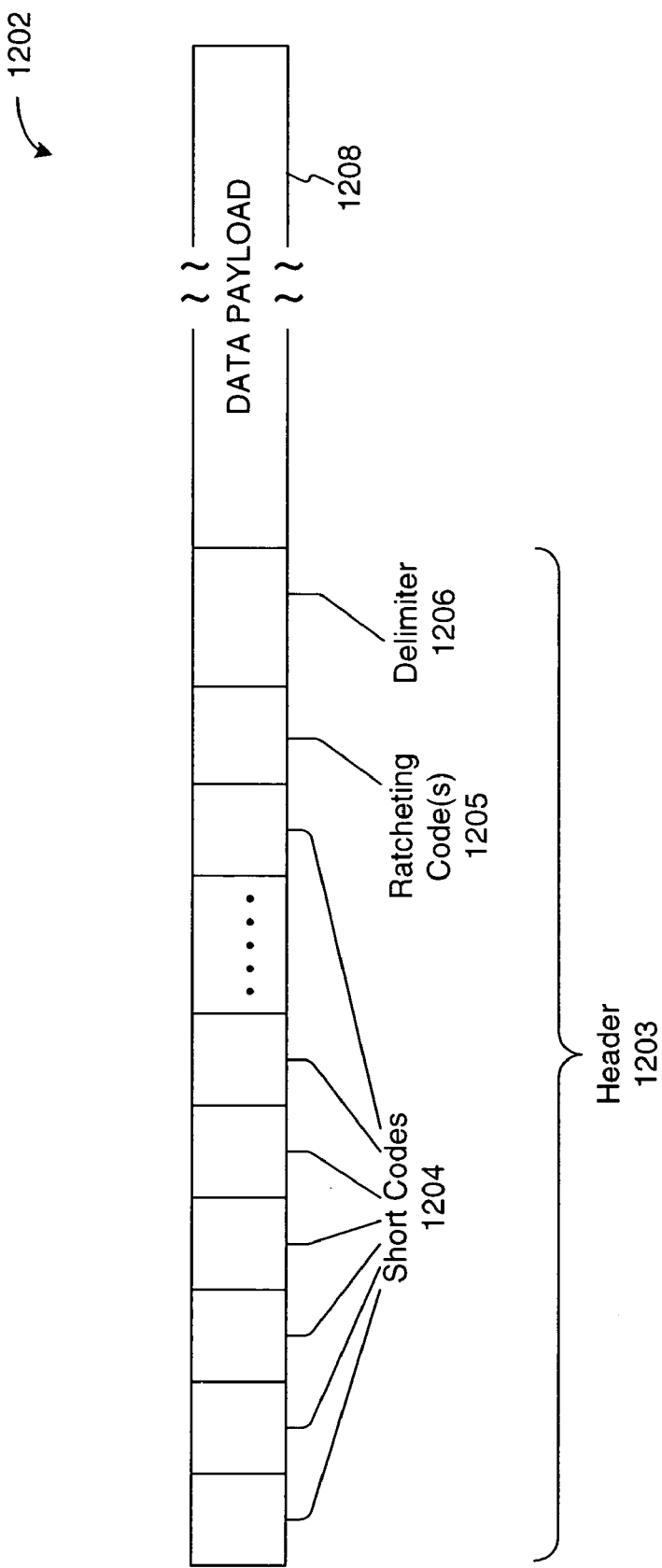

Referring now to FIG. 12B, according to another embodiment of the present invention, header 1203 (of packet 1202) includes one or more "ratchet" codes 1205, prior to delimiter 1206. Ratchet codes 1205, which are used when samples are integrated to improve a signal to noise ratio, enables a receiver to resolve the ambiguity resulting from the integration length being greater than the number of ramp builders, as will be described later. The length of a ratchet code 1205 is typically an integer multiple of the length of short acquisition code 1204. When packet 1202 includes one ratchet code 1205, the length of delimiter 1206 is the same as the length of the ratchet code. If more than one ratchet code 1205 is included in packet 1203, and at least two of the ratchet codes 1205 are of different length, then the length of the delimiter is the same as the length of the longest ratchet code 1205. The above mentioned ambiguity resulting from the integration length being greater than the number of ramp builders, along with additional details of ratchet codes 1205 and delimeter 1206, are discussed in more detail below.

C. Problem Description

When an impulse radio receiver begins receiving a packet (such as packet 1202 described above), the impulse radio receiver initially establishes a receiver sample timeline based on an apriori knowledge of the frame width and code associated with the received impulse signal. The impulse radio receiver uses the receiver sample timeline to sample the received packet of the receive impulse signal. Initially, the receiver sample timeline established by the impulse radio receiver is most likely neither frame synchronized nor code synchronized with the received impulse signal. This initial situation is illustrated by way of example with reference to FIG. 13.

Figure 13:
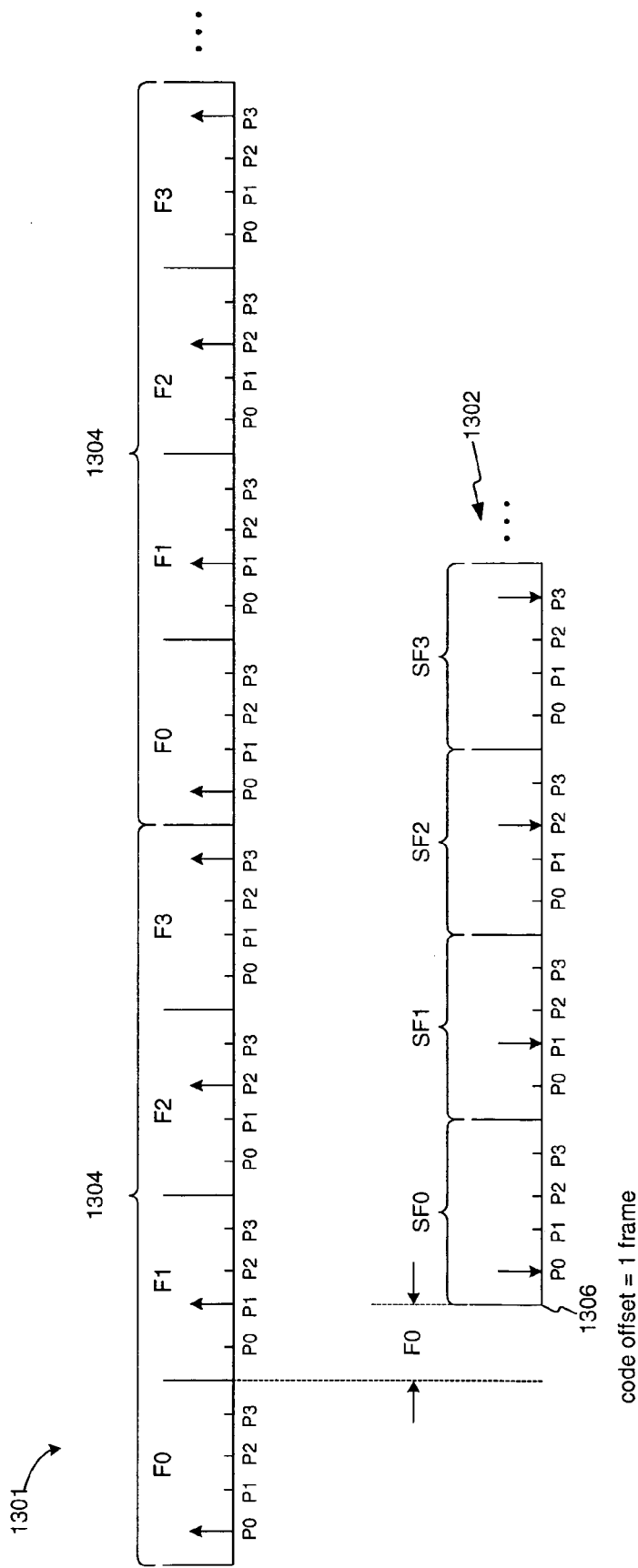
FIG. 13 illustrates an example timing relationship between a portion of a received impulse signal including received header frames and a receiver sample timeline initially established by the impulse radio to sample the received impulse signal.

FIG. 13 is an illustration of an example timing relationship between a portion of a received impulse signal 1301 including received header frames 1304 and a receiver sample timeline 1302 (depicted below impulse signal 1301 in FIG. 13) initially established by the impulse radio to sample the received header frames. As mentioned above, and as shown in FIG. 13, initially, the receiver sample timeline 1302 established by the impulse radio receiver is neither frame synchronized nor code synchronized with the received impulse signal 1301.

Therefore, because the impulse radio receiver is neither frame synchronized (i.e., frame aligned) nor short code synchronized it enters a timing acquisition mode to time synchronize sample timeline 1302 of the impulse radio receiver with the received impulse signal frames and the short acquisition code of the received signal. The inventive process of achieving initial frame and short code synchronization is often referred to as "first stage acquisition."

As shown, exemplary received impulse signal 1301 includes consecutively received modulo-4 acquisition code sequences 1304. The exemplary short acquisition code associated with signal 1301 is P0, P1, P2 and P3, is the same as the exemplary short acquisition code discussed above in connection with FIG. 12A. Each upward pointed arrow within a received frame of received signal 1301 represents an impulse within the received frame. The impulse is positioned with each frame according to the short acquisition code used by the transmitter.

Initial receiver sample timeline 1302 includes four sample frames, including a zeroth sample frame SF0, a first sample frame SF1, a second sample frame SF2 and a third sample frame SF3. The impulse radio receiver initially samples the received signal 1301 in accordance with sample times (indicated by down arrows in timeline 1302) associated with each of sample frames SF0-SF3. The impulse radio determines such sample times based on an apriori knowledge of the frame width and the acquisition code associated with the received impulse signal. As will be explained below, when the receiver is both frame and code synchronized with the received signal, the sample times (indicated by the down arrows in sample timeline 1302) will be aligned with the impulses (indicated by the up arrows) in the received signal 1301. In other words, first stage acquisition achieves short code and frame synchronization.

According to exemplary initial receiver sample timeline 1302, the impulse radio "attempts" to sample an impulse at a position P0 in zeroth sample frame SF0, an impulse at a position P1 in first sample frame SF1, an impulse at a position P2 in second sample frame SF2, and an impulse at a position P3 in third sample frame SF3. As mentioned above, the impulse radio receiver establishes these sample times based on the apriori knowledge of the frame width and the short acquisition code associated with the received impulse signal. The impulse radio receiver "attempts" to sample impulses because the sample times, at least initially, are merely guesses as to where impulses in received signal 1301 are positioned. Therefore, it is likely the impulse radio receiver will not successfully sample the impulses of a short code sequence 1204.

There are at least two reasons for the impulse radio receiver will not successfully sample the impulses of a short code sequence 1204. First, the impulse radio receiver initially has not determined when in time the start and end boundaries of the frames of received signal 1301 occur. Thus, it is likely there is a frame offset FO between the actual boundary of a received frame, and the frame boundary of initial sample frame SF0 assumed by the impulse radio receiver, as shown in FIG. 13. Additionally, the impulse radio receiver initially does not have knowledge of which frame of the short acquisition code sequence it is receiving at a specific time. Thus, as shown in FIG. 13, the impulse radio receiver may be sampling position P0 (within SF0), when the impulse in the received frame (i.e., the frame F1 concurrently being received) is actually at position P1. This is due to what shall be referred to as a code offset CO (and more specifically, in this case, a short code offset CO).

As mentioned above, in the example of FIG. 13, each short acquisition code sequence includes four frames, wherein, as far as the receiver is concerned, a pulse can be in one of four positions in each frame. If the beginning 1306 of receiver sample timeline 1302 coincides with the beginning of the zeroth frame F0 of acquisition code sequence 1304, then the code offset CO equals zero (using the terminology set forth herein). If the beginning 1306 of receiver sample timeline 1302 coincides with the first frame F1 of acquisition code sequence 1304, then the code offset CO equals one (i.e., CO=1). If the beginning 1306 of receiver sample timeline 1302 coincides with the second frame F2 of acquisition code sequence 1304, then the code offset CO equals two (i.e., CO=2). If the beginning 1306 of receiver sample timeline 1302 coincides with the third frame F3 of acquisition code sequence 1304, then the code offset CO equals three (i.e., CO=3). If the beginning 1306 of receiver sample timeline 1302 coincides with the zeroth frame F0, there is no code offset (i.e., CO=0). Of course, if the short acquisition code had a length greater than 4, then additional possible code offsets would exist.

Put in other words, if the impulse radio is sampling the zeroth frame of received signal 1301 when it should be sampling the third frame of the short code (because that is where the impulse is located in the frame being received), then the code offset equals three. If the impulse radio is sampling the zeroth frame when it should be sampling the second frame of the short code, then the code offset equals two. If the impulse radio is sampling the zeroth frame when it should be sampling the first frame, then the code offset equals one. If the impulse radio is correctly sampling the zeroth frame, then the code offset equals zero.

Even if there is a zero code offset, there can still be a frame offset FO that causes the impulse radio receiver to fail to correctly sample the impulses in the received frames. Thus, there is a need for the impulse radio receiver to align itself (i.e., its timing) with both the receive frames of received signal 1301 and the short acquisition code sequence 1304 of receive signal 1301. Stated another way, there is a need to achieve proper frame alignment (i.e., frame synchronization) and code synchronization. It is noted that first stage acquisition does not require that the frame offset be precisely zero. Rather, course frame alignment is satisfactory for first stage acquisition. Thus, proper frame alignment, as mentioned above, refers to such course frame alignment. A tracking process that occurs following first stage acquisition will cause the frame offset to approach zero.

D. Overview of Solution to Problem

Acquisition in the present invention is divided into two phases, referred to as first stage acquisition and second stage acquisition. During the first stage an impulse radio receiver uses ramp builders (discussed in more detail below) to search for short acquisition code sequences of a packet header. When a specific threshold is satisfied, the transmitting impulse radio and receiving impulse radio are code aligned, to the extent of the short acquisition code, and coursely frame aligned. An initial tracking process (i.e., "tracking") can then be initiated. Second stage acquisition is then used to locate the delimeter, and thus, the end of the packet header, which is the same as the beginning of the data payload. Demodulation of payload data begins after second stage acquisition. This method shall now be described with reference to FIG. 15.

Figure 15:
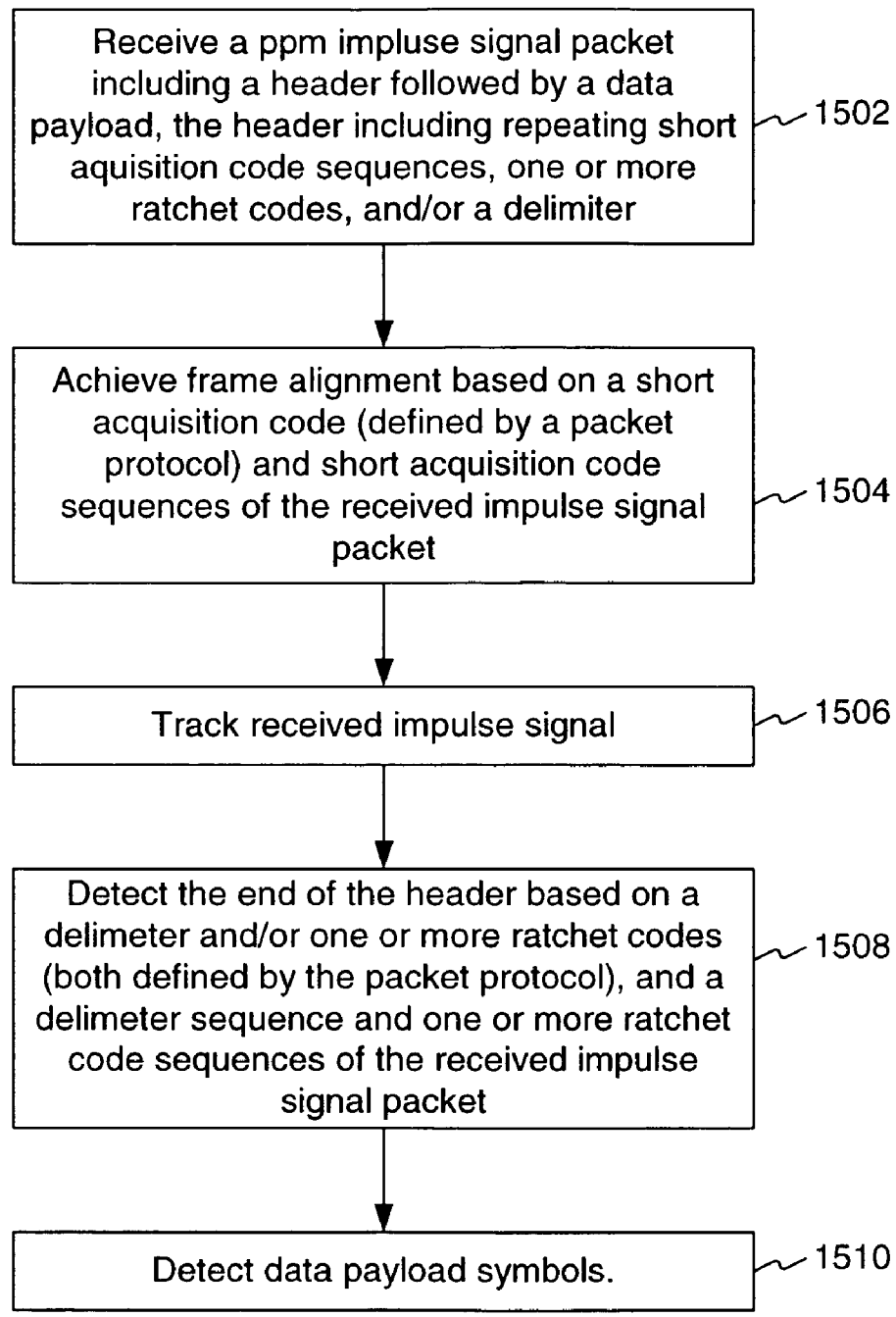
FIG. 15 shows a high level flow diagram illustrating a method for acquiring a pulse position modulated (ppm) impulse signal, according to an embodiment of the present invention.

FIG. 15 is a high level flow diagram illustrating a method 1500 for acquiring a pulse position modulated (ppm) impulse signal, according an embodiment of the present invention.

Method 1500 begins at a step 1502 when the impulse radio receiver receives (i.e., at least begins to receive) a ppm impulse signal packet that includes a header followed by a data payload. The header includes repeating short acquisition code sequences, which have been discussed above. An exemplary header is discussed above in connection with FIG. 12A. A delimiter of the header separates the header from the data payload, as discussed in connection with FIG. 12A. The packet can also include one or more ratchet codes between the short acquisition code sequences and the delimiter, as discussed above in connection with FIG. 12B, and described in more detail below.

At a next step 1504, course frame alignment is achieved based on a short acquisition code (defined by a packet protocol) and short acquisition code sequences of the received impulse signal packet. Step 1504 is discussed in additional detail below in connection with FIG. 16. As will be appreciated to one of ordinary skill in the art reading this specification, when frame alignment is achieved in accordance with the present invention using the short acquisition code, code alignment will also be achieved to the extent of the short acquisition code. Step 1504, which is described in more detail below, represents first stage acquisition of the present invention.

Once frame aligned (and code aligned to the extent of the short acquisition code) with the frames of the received signal, the impulse radio receiver can initiate tracking of the received impulse signal timing at a step 1506. As will be explained in more detail below, the time required to achieve frame alignment using the short acquisition codes in the present invention is significantly less than the time required using conventional longer acquisition codes. Thus, a significant advantage of the present invention is that tracking can be initiated very early during acquisition, thereby greatly improving the probability for fast acquisition. Tracking of the received signal can be accomplished, for example, using the tracking loop discussed in connection with FIG. 11. The specific system and method of tracking the received signal is not important to the present invention. Rather, what is significant to the present invention is that tracking can be initiated very soon after the receiver receives the beginning of a packet, thereby providing for a better signal to noise ratio during the remainder of the acquisition process, thus improving the probability for fast acquisition. One of ordinary skill in the art will appreciate that there are various ways to track to the received signal. Even though it is preferable to initiate tracking once first stage acquisition is achieved, it is noted that many aspects of the present invention do not rely on beginning tracking at this instance. Accordingly, in alternative embodiments of the present invention tracking can be initiated later in the acquisition process.

Figure 21:
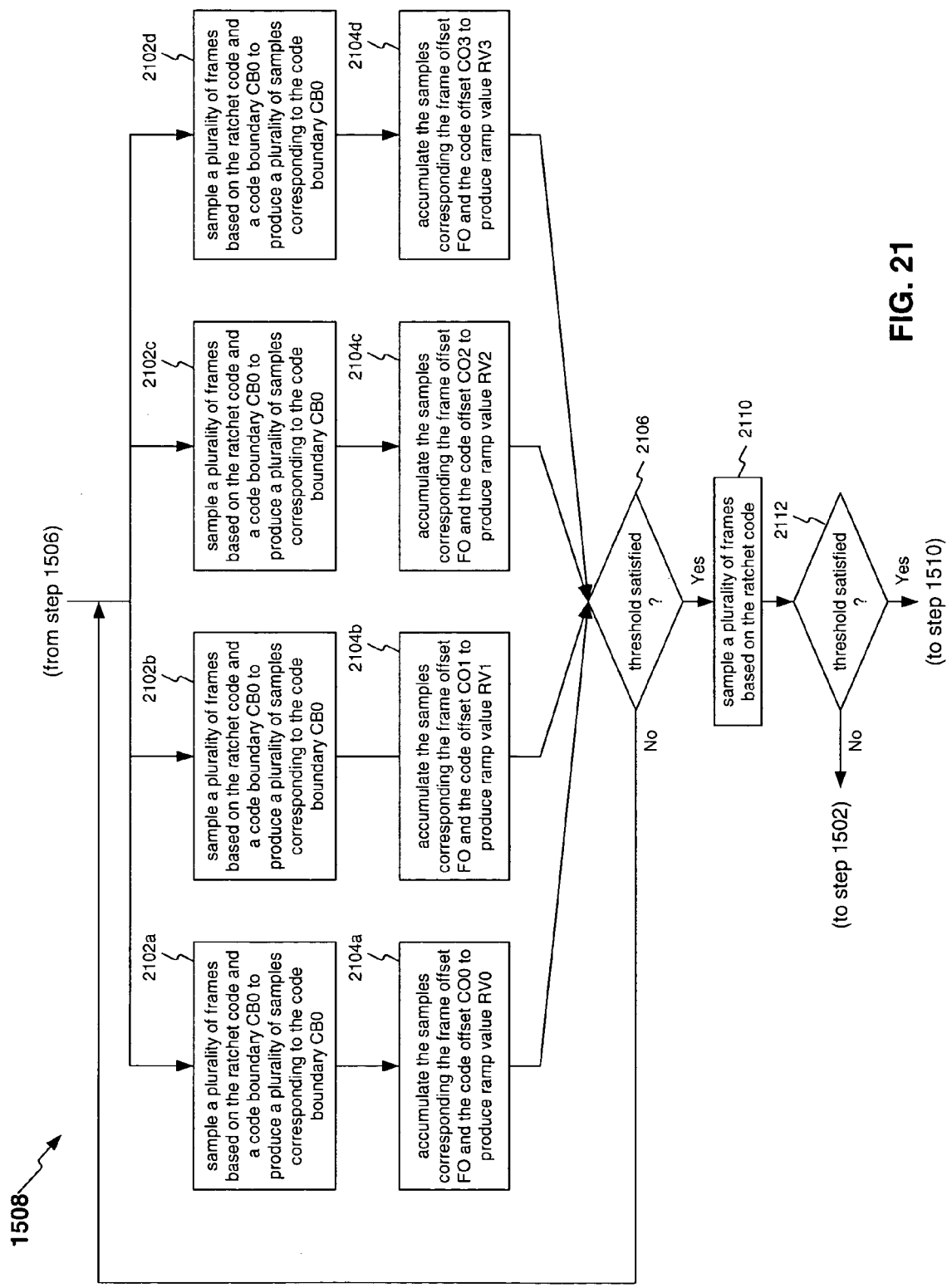
FIGS. 21 and 22 illustrate additional details of one of the steps of the method shown in FIG. 15, according to an embodiment of the present invention.
Figure 22:
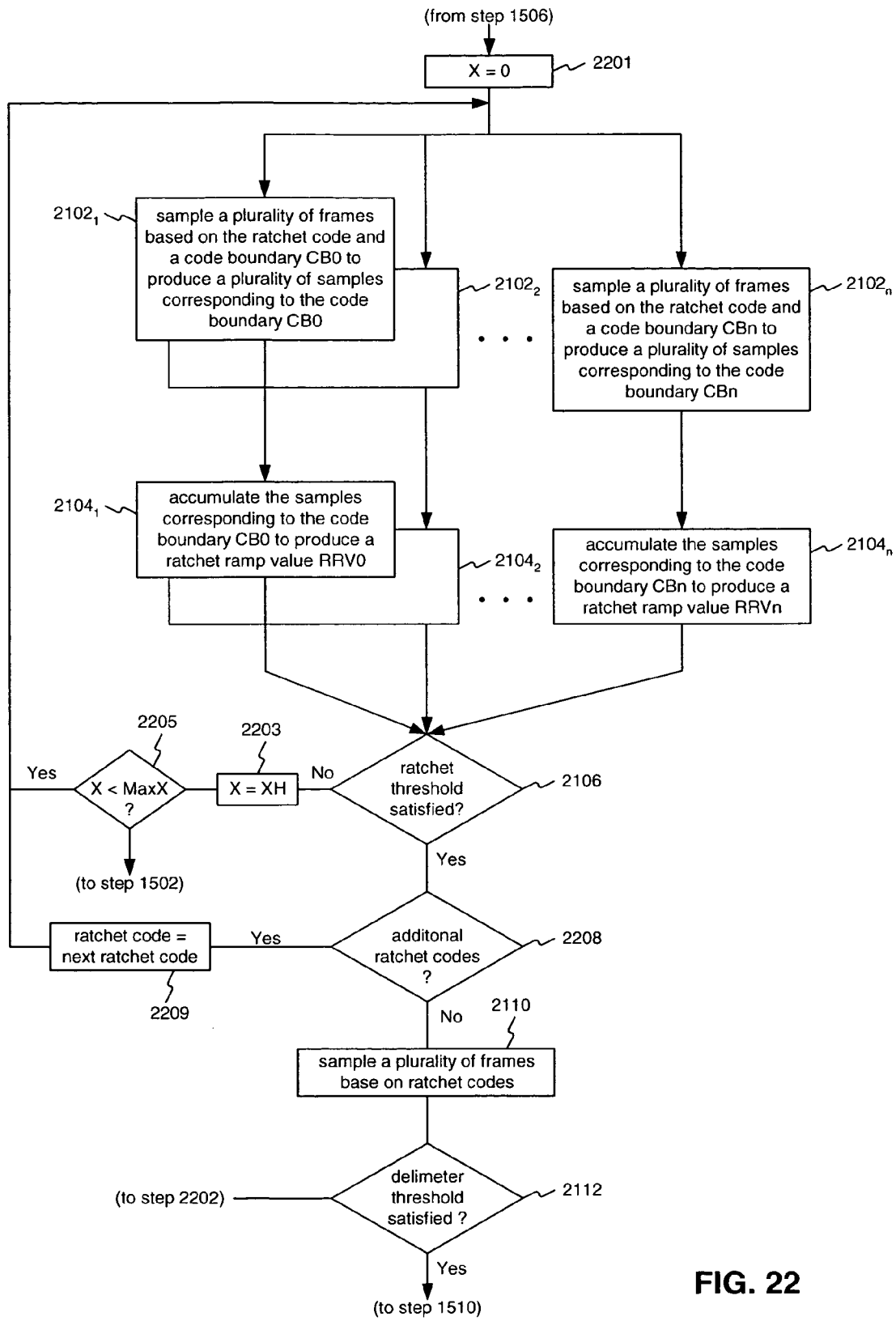

At a next step 1508, the end of the header (which is the same as the beginning of the data payload) is detected based on a delimeter and/or one or more ratchet codes (both defined by the packet protocol), and a delimeter sequence and/or one or more ratchet code sequences of the received impulse signal packet. This step can also achieve proper symbol timing, thus enabling subsequent data symbol demodulation. Step 1508, which is discussed in additional detail below in connection with FIGS. 21 and 22, represents second stage acquisition of the present invention.

Finally, after the impulse radio receiver has achieved frame and short code synchronization (at step 1504), proper tracking (at step 1506), and recovered symbol timing (at step 1508), the impulse radio receiver detects data payload symbols at a step 1510. For example, the impulse radio receiver can demodulate (including decode) the ppm impulses of the data payload at step 1510.

Additional details of demodulating ppm impulse signals are disclosed in commonly owned U.S. Pat. Nos. 4,641,317, 4,743,906, 4,813,057, and 4,979,186; and U.S. Pat. No. 6,421,389, issued Jul. 16, 2002, entitled "Baseband Signal Converter Device for a Wideband Impulse Radio Receiver"; and copending U.S. patent application Ser. No. 09/537,264, entitled "System and Method Utilizing Multiple Correlator Receivers in an Impulse Radio System"; and copending U.S. patent application Ser. No. 09/538,519, filed Mar. 29, 2000, entitled "Vector Modulation System and Method for Wideband Impulse Radio Communications"; and U.S. patent application Ser. No. 09/537,692, filed Mar. 29, 2000, entitled, "Apparatus, System and Method for Flip Modulation in an Impulse Radio Communication System," each of which is incorporated herein by reference in its entirety.

E. Packet Protocol

Prior to describing additional details of the present invention, it is useful to explain a protocol of the present invention. A packet protocol, according to an embodiment of the present invention, defines at least each of the following:

a. the integration length, also referred to as the ramp interval length N (e.g., N=16);
b. the length of the repeating short acquisition code 1204 (e.g., four frames);
c. the actual short acquisition code 1204 (e.g., P0, P1, P2, P3);
d. the number of short acquisition code sequences per packet (e.g., 40);
e. the length of each ratchet code sequence (e.g., 16 frames);
f. each actual ratchet code (e.g., P0, P1, P2, P3, P1, P2, P3, P0, P2, P3, P0, P1, P3, P0, P1, P2);
g. the number of different unique ratchet code sequences (e.g., 2) per packet;
f. the number of each different unique ratchet code sequence per packet (e.g., 2);
g. the actual delimeter sequence (e.g., a flipped version of the longest ratchet code sequence);
h. the long code used to encode the data payload; and
i. the length of the data payload (e.g., 1000 bits worth of frames, which can equal 1000·N ).

The packet protocol is known by impulse radios in communications with one another, such as an impulse radio transmitter and a cooperating impulse radio receiver. By knowing the short acquisition code used by a transmitter to produce repeating short code sequences of a header of an impulse signal packet, a receiving impulse radio (simply referred to as a receiver) can achieve frame alignment and code alignment to the extent of the short acquisition code. The receiver can then detect the end of the header (which is the same as the beginning of the data payload) based on one or more ratchet codes and/or a delimiter. All of this is explained in detail below.

F. Frame Alignment (First Stage Acquisition)

FIG. 16a illustrates additional details of step 1504 of method 1500, according to an embodiment of the present invention. It is noted that the step of achieving frame alignment is also referred to as a "first stage acquisition" because it is the first part of the acquisition process (after a signal has been received). The steps discussed in connection with FIG. 16 correspond to a method of achieving frame alignment based on an exemplary modulo-4 acquisition code and repeating modulo-4 acquisition code sequences of the received signal. Code synchronization is also achieved at step 1504 to the extent of the short acquisition code, as shall be explained. One of ordinary skill in the art will appreciate how this method can be modified to achieve frame alignment based on short acquisition codes of other lengths (e.g., a modulo-8 acquisition code, a modulo 16-acquisition code, etc.) after reading the relevant descriptions provided herein.

Initially, the frame offset F0 and code offset of a received impulse signal are unknown. As shown in FIG. 16a, at a step 1602a, a plurality of frames (i.e., N frames, where N the integration length) of the received impulse signal packet are sampled based on the repeating acquisition code (which is known by the impulse radio receiver), a frame offset FO, and a code offset CO0 (i.e., CO=0), to thereby produce a plurality of samples corresponding to the frame offset FO and the code offset CO0. For example, if the known repeating acquisition code has a length of four frames (i.e., is a modulo-4 code), then the four (4) frames of the received impulse signal packet are sampled based on the known acquisition code, the frame offset FO, and the code offset CO0. Concurrently (i.e., in parallel), at a step 1602b, the same plurality of frames of the received impulse signal packet are sampled based on the repeating acquisition code, the same frame offset FO, and a different code offset CO1 (i.e., CO=1), to thereby produce a plurality of samples corresponding to the frame offset FO and the code offset CO1. Concurrently, at a step 1602c, the same plurality of frames of the received impulse signal packet are sampled based on the repeating acquisition code, the same frame offset FO, and a different code offset CO2 (i.e., CO=2), to thereby produce a plurality of samples corresponding to the frame offset FO and the code offset CO2. Concurrently, at a step 1602d, the same plurality of frames of the received impulse signal packet are sampled based on the repeating acquisition code, the same frame offset FO, and a different code offset CO3 (i.e., CO=3), to thereby produce a plurality of samples corresponding to the frame offset FO and the code offset CO3. (It is noted that for this example, due to the lack of frame alignment, it is possible that five frames, not just four frames, of the received impulse signal packet are sampled at step 1602a, 1602b, 1602c and/or 1602d.)

At next parallel steps 1604a, 1604b, 1604c and 1604d, the plurality of samples produced at steps 1602a, 1602b, 1602c and 1602d, respectively, are accumulated to produce ramp values (also referred to as accumulated values). More specifically, at step 1604a, the plurality of samples corresponding to the frame offset FO and the code offset CO0 are accumulated (e.g., by a ramp builder) to produce a ramp value RV0. Concurrently, at step 1604b, the plurality of samples corresponding to the frame offset FO and the code offset CO1 are accumulated (e.g., by a separate ramp builder) to produce a ramp value RV1. Concurrently, at step 1604c, the plurality of samples corresponding to the frame offset FO and the code offset CO2 are accumulated (e.g., by another ramp builder) to produce a ramp value RV2. Concurrently, at step 1604d, the plurality of samples corresponding to the frame offset FO and the code offset CO3 are accumulated (e.g., by another ramp builder) to produce a ramp value RV3. The ramp values may be stored so that they can be used together with concurrently and/or later generated ramp values in a threshold determination.

At step 1605, discriminants are calculated from the ramp values to be used in a selected threshold equation. These disciminants are shown in FIG. 16b.

At a next step 1606, there is a determination of whether a threshold (e.g., a first state acquisition threshold) has been satisfied. This determination is based on one or more of ramp values RV0, RV1, RV2 and RV3. Various methods for performing this threshold determination, according to the present invention, are discussed in detail below.

If the threshold has been satisfied (i.e., if the answer to step 1606 is YES), then the impulse radio receiver determines that it has identified the correct frame time offset and code offset, and thus, the impulse radio receiver has achieved frame alignment and short acquisition code synchronization. Flow then proceeds to step 1506, which has been discussed above, and tracking is initiated.

Failure to satisfy the threshold will typically indicate that the sample frames are not frame aligned with the frames of the received packet because all code offsets have been searched (leaving only frame misalignment as the reason for not meeting the threshold). Accordingly, failure to satisfy the threshold shall be interpreted as indicating that there is an unacceptable offset between the beginning of each frame in the received packet and the beginning of each frame of the sample frames. Thus, if the threshold has not been satisfied (i.e., if the answer to step 1606 is NO), then the frame offset FO is adjusted by a step size (e.g., FO=FO+3 nsec, where 3 nsec is the step size) at a step 1608 so that another frame offset can be tested using the short code search steps 1602-1606.

In other words, at steps 1602(*a-d*), 1604(*a-d*) and 1606, each of the possible code offsets (four, in this example, i.e., CO0, CO1, CO2 and CO3) are essentially analyzed in parallel. If the threshold is not satisfied, it is assumed that the reason is because there exists an unacceptable frame offset FO. Thus, at step 1608, the frame offset is adjusted so that another frame offset can be tested.

After the frame offset FO has been adjusted at step 1608, flow returns to steps 1602*a*, 1602*b*, 1602*c* and 1602*d* where additional frames of the repeating code sequence are sampled using the new frame offset FO. This process (i.e., steps 1602-1608) is repeated, each time with a new frame offset FO, until the threshold is satisfied, thereby indicating that the impulse radio receiver has achieved satisfactory frame alignment (also referred to as frame synchronization), and also short acquisition code synchronization.

Figure 17:
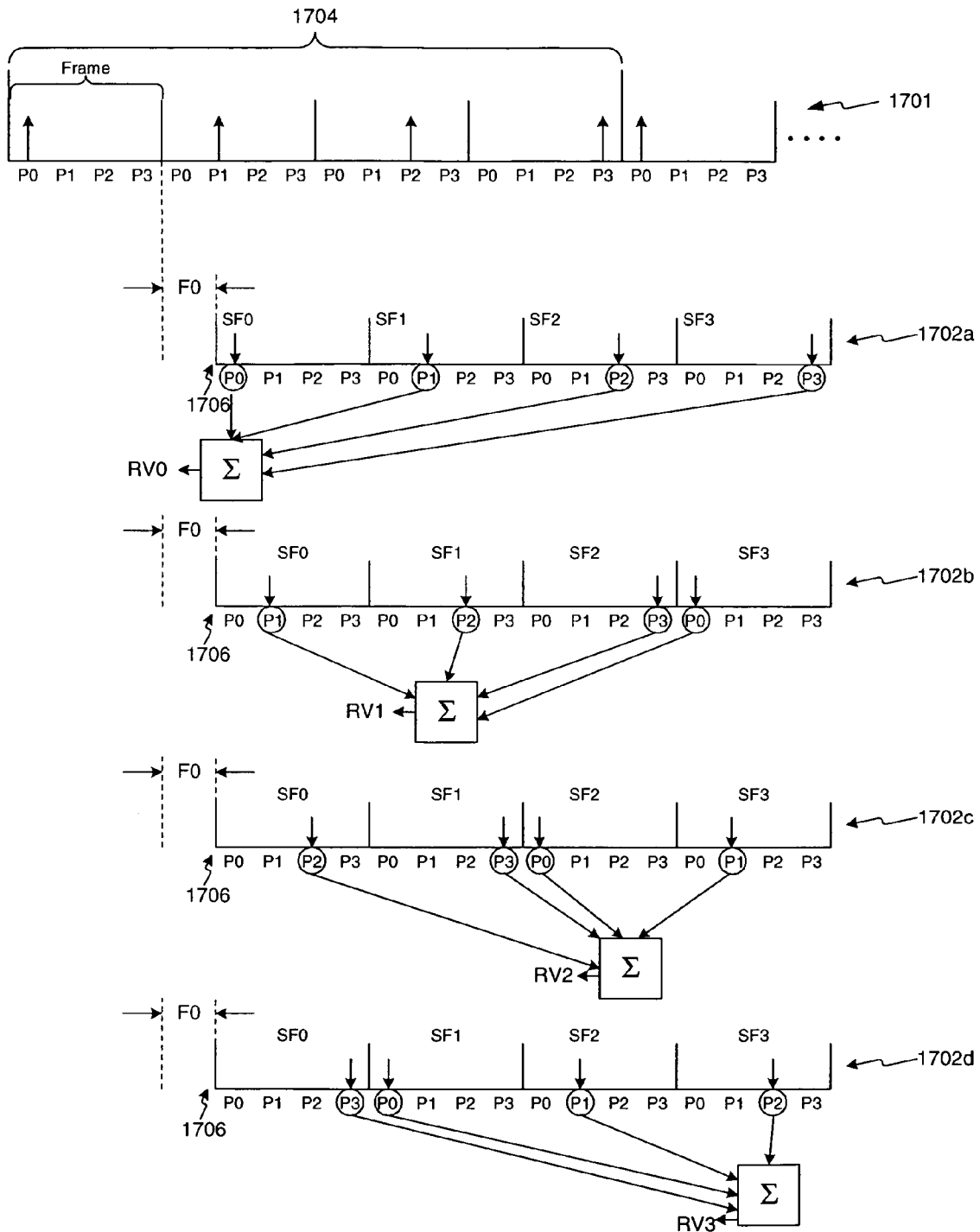
FIGS. 17 and 18 illustrate time-lines that are useful for explaining specific parallel steps of discussed in FIG. 16.

Parallel steps 1602*a*, 1602*b*, 1602*c* and 1602*d*, and parallel steps 1604*a*, 1604*b*, 1604*c* and 1604*d* can be explained with reference to the example of FIGS. 17 and 18. Shown at the top of FIG. 17 is a portion of a header of a received impulse signal 1701 that includes a repeating modulo-4 acquisition code sequence 1704. The exemplary repeating acquisition code sequence has a hop sequence P0, P1, P2, P3. Four receiver time-lines 1702*a*, 1702*b*, 1702*c* and 1702*d* are shown, each starting at an initial sample frame time 1706. As shown in this example, the initial sample frame time 1706 is offset from the closest (in time) frame boundary of received signal 1701 by a frame offset FO, where FO_0.

The receive timeline 1702*a* begins with (i.e., the initial sample frame SF0 includes) an impulse at the same position as the impulse in receive frame F0 of acquisition code sequence 1704, and thus, receive timeline 1702*a* has a zero code offset. Receiver timeline 1702*a* is useful for explaining step 1602*a*, where a plurality of frames of received impulse signal 1701 are sampled based on:

1. the repeating acquisition code (having the hop sequence P0, P1, P2, P3, which is known);
2. the frame offset FO; and
3. a code offset CO0 (code offset=0), to thereby produce a plurality of samples corresponding to frame offset FO and code offset CO0. As discussed above, downward pointed arrows represent the sample times within sample frames SF0, SF1, SF2 and SF3.

As indicated by the arrows pointing to the accumulation block (Í), the plurality of samples (e.g., four samples) corresponding to the frame offset FO and the code offset CO0 are accumulated, at step 1604*a*, to produce a ramp value RV0. Since, in the example, none of the sample times of receiver timeline 1702*a* coincide with the impulses (represented by upward pointed arrows) of received impulse signal 1701, the four amplitude values (accumulated to produce RV0) are not indicative of the actual received impulse energy of received impulse signal 1701. However, it is likely that the four amplitude values are indicative of received noise and/or interference. It is also possible that the four amplitude values are indicative of ring down from the received impulses.

The next receive timeline 1702*b* begins with (i.e., the initial sample frame SF0 includes) an impulse at the same position as the impulse in receive frame F1 of acquisition code sequence 1704, and thus, receive timeline 1702*b* has a code offset equal to one. Receiver timeline 1702*b* is useful for explaining step 1602*a*, where a plurality of frames of received impulse signal 1701 are sampled based on:

1. the repeating acquisition code (having the hop sequence P0, P1, P2, P3, which is known);
2. the frame offset FO, and
3. a code offset CO1 (code offset=1),
to thereby produce a plurality of samples corresponding to frame offset FO and code offset CO1. Because the code offset equals one, the hop sequence of sample frames SF0-SF3 of receive timeline 1702*b* is P1, P2, P3, P0, because the code sequence is rotated one position.

As indicated by the arrows pointing to the accumulation block (Í), the plurality of samples corresponding to the frame offset FO and the code offset CO1 are accumulated, at step 1604*b*, to produce a ramp value RV1. Since none of the sample times of receiver timeline 1702*b* are aligned with the impulses (represented by upward pointed arrows) of received impulse signal 1701, the four amplitude values (accumulated to produce RV1) are not indicative of the received impulse energy of received impulse signal 1701. However, it is likely that the four amplitude values are indicative of received noise, interference, and/or ring down from the received impulses.

The next receive timeline 1702*c* begins with (i.e., the initial sample frame SF0 includes) an impulse at the same position as the impulse in receivem frame F2 of acquisition code sequence 1704, and thus, receive timeline 1702*c* has a code offset equal to two. Receiver timeline 1702*c* is useful for explaining step 1602*c*, where a plurality of frames of received impulse signal 1701 are sampled based on:

1. the repeating acquisition code (having the hop sequence P0, P1, P2, P3, which is known);
2. the frame offset FO, and
3. a code offset CO2 (code offset=2), to thereby produce a plurality of samples corresponding to frame offset FO and code offset CO2. Because the code offset equals two, the hop sequence of sample frames SF0-SF3 of receive timeline 1702*c* is P2, P3, P0, P1 (i.e., the code sequence is rotated two positions).

As indicated by the arrows pointing to the accumulation black (Í), the plurality of samples corresponding to the frame offset FO and the code offset CO2 are accumulated, at step 1604*c*, to produce a ramp value RV2. Since none of the sample times of receiver timeline 1702*c* are aligned with the impulses (represented by upward pointed arrows) of received impulse signal 1701, the four amplitude values (accumulated to produce RV2) are not indicative of the received impulse energy. However, it is likely that the four amplitude values are indicative of received noise, interference, and/or ring down from the received impulses.

The receive timeline 1702*d* begins with (i.e., the initial sample frame SF0 includes) an impulse at the same position as the impulse in receive frame F3 of acquisition code sequence 1704, and thus, receive timeline 1702*c* has a code offset equal to three. Receiver timeline 1702*c* is useful for explaining step 1602*d*, where a plurality of frames of received impulse signal 1701 are sampled based on:

1. the repeating acquisition code (having the hop sequence P0, P1, P2, P3, which is known);
2. the frame offset FO, and
3. a code offset CO3 (code offset=3),
to thereby produce a plurality of samples corresponding to frame offset FO and code offset CO3. Because the code offset equals three, the hop sequence of sample frames SF0-SF3 of receive timeline 1702*c* is P3, P0, P1, P2 (i.e., the code sequence is rotated three positions).

As indicated by the arrows pointing to the accumulation block (Í), the plurality of samples corresponding to the frame offset FO and the code offset CO3 are accumulated, at step

1604*d*, to produce a ramp value RV3. In this instance, one of the four sample times of receiver timeline 1702*d* are coincidentally aligned with an impulses of received impulse signal 1701. Thus, the one of the four amplitude values accumulated to produce RV3 are indicative of the received impulse energy (i.e., the sample time in SF2 coincides with the impulse in the fourth shown frame of impulse signal 1701). The four amplitude values can also be indicative of received noise and/or interference, and/or ring down from the received impulses.

One of the purposes of the threshold determination is to recognize that code and frame offset synchronization has not occurred when, for example, just one of the four sample times of receiver timeline 1702*d* are aligned with an impulses of received impulse signal 1701. That is, the threshold detection is used to prevent false indications of frame and code synchronization. Various threshold determination embodiments are discussed below.

Assuming the impulse radio receiver determines that the threshold is not satisfied (i.e., at steps 1606), the frame offset is adjusted at step 1608. After the frame offset FO has been adjusted at step 1608, flow returns to steps 1602*a*, 1602*b*, 1602*c* and 1602*d* where additional frames of the repeating short code sequence are sampled using the new frame offset FO. This process (i.e., steps 1602-1608) is repeated, each time with a new frame offset FO, until the threshold is satisfied, thereby indicating that impulse radio receiver has achieved proper frame alignment and code synchronization to the extent of the acquisition short code. FIG. 18, which will now be explained in detail, illustrates the situation where there exists essentially no frame offset, causing the threshold to be satisfied.

Figure 18:
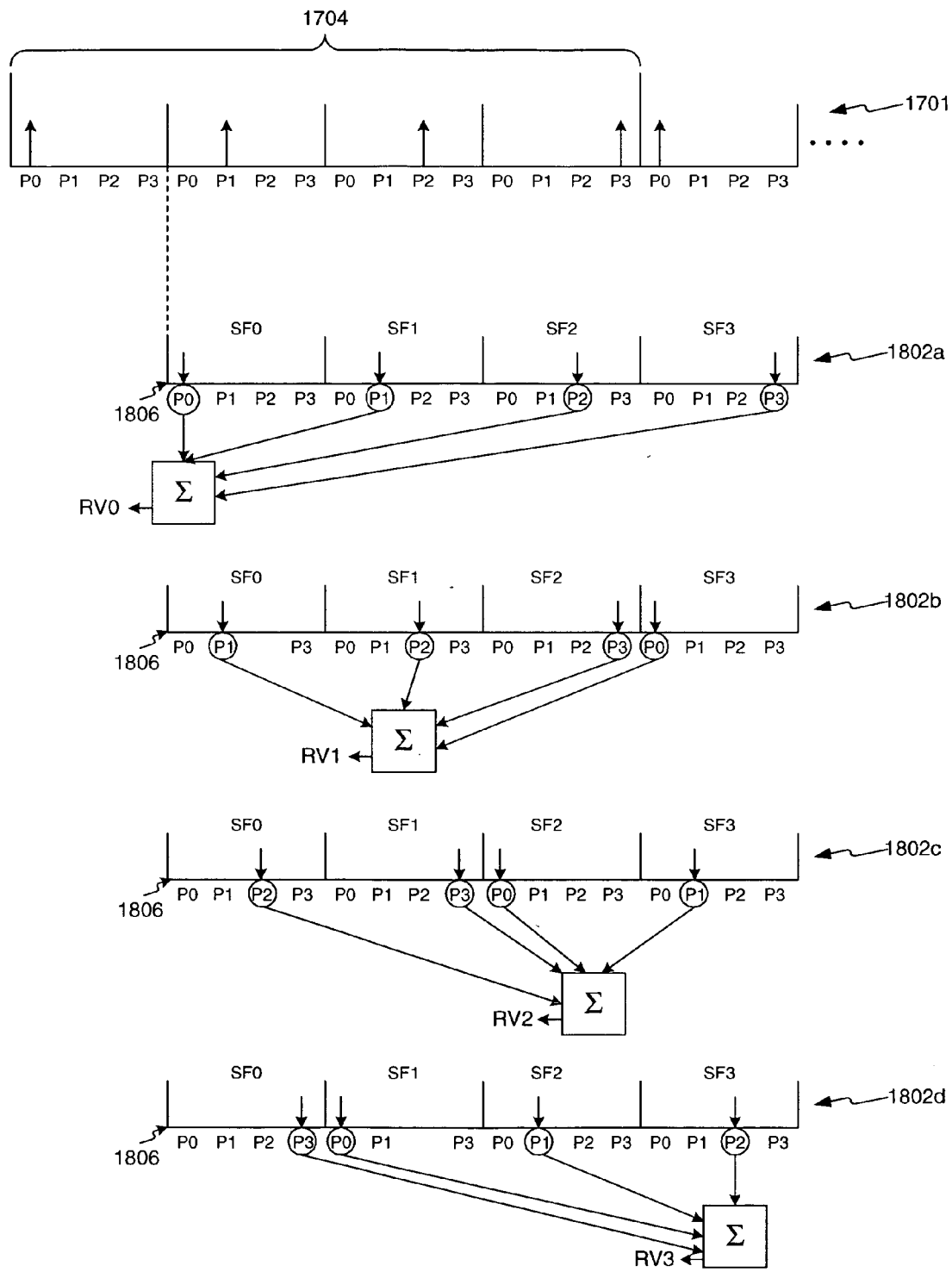

Referring to FIG. 18, four receiver time-lines 1802*a*, 1802*b*, 1802*c* and 1802*d* are shown, each starting at an initial sample frame time 1806. As shown in this example, there is essentially no offset between the initial sample frame time 180 and the closest (in time) frame boundary of received signal 1701 (i.e., frame offset FO=0).

The receive timeline 1802*a* begins with (i.e., the initial sample frame SF0 includes) frame F0 of acquisition code sequence 1704, and thus, receive timeline 1802*a* has a zero code offset. Receiver timeline 1802*a* is useful for explaining step 1602*a*, where a plurality of frames of received impulse signal 1701 are sampled based on the repeating acquisition code (having the hop sequence P0, P1, P2, P3, which is known), the frame offset FO≈0, and a code offset CO0 (code offset=0), to thereby produce a plurality of samples corresponding to frame offset FO≈0 and code offset CO0. As discussed above, downward pointed arrows represent the sample times within sample frames SF0, SF1, SF2 and SF3.

As indicated by the arrows pointing to the accumulation block (Í), the plurality of samples corresponding to the frame offset FO≈0 and the code offset CO0 are accumulated, at step 1604*a*, to produce a ramp value RV0. Since none of the sample times of receiver timeline 1802*a* coincide with the impulses (represented by upward pointed arrows) of received impulse signal 1701, the four amplitude values (accumulated to produce RV0) are not indicative of the actual received impulse energy of received impulse signal 1701. However, it is likely that the four amplitude values are indicative of received noise and/or interference. It is also possible that the four amplitude values are indicative of ring down from the received impulses.

Similarly, the amplitude values accumulated to produce ramp value RV2 (associated with receive timeline 1802*c*), and the amplitude values accumulated to produce ramp value RV3 (associated with receive timeline 1802*d*), are not indicative of the actual received impulse energy of received impulse signal 1701. However, as explained immediately below, the amplitude values accumulated to produce ramp value RV1 (associated with receive timeline 1802*b*) are indicative of the actual received impulse signal energy of received impulse signal 1701.

The receive timeline 1802*b* begins with (i.e., the initial sample frame SF0 includes) frame F1 of acquisition code sequence 1704, and thus, receive timeline 1802*b* has a code offset equal to one. Receiver timeline 1802*b* is useful for explaining step 1602*a*, where a plurality of frames of received impulse signal 1701 are sampled based on the repeating acquisition code (having the hop sequence P0, P1, P2, P3, which is known), the frame offset FO≈0, and a code offset CO1 (code offset=1), to thereby produce a plurality of samples corresponding to frame offset FO≈0 and code offset CO1. Because the code offset equals one, the hop sequence of sample frames SF0-SF3 of receive timeline 1802*b* is P1, P2, P3, P0 (i.e., the code sequence is rotated one position).

As indicated by the arrows pointing to the accumulation block (Í), the plurality of samples corresponding to the frame offset FO≈0 and the code offset CO1 are accumulated, at step 1604*b*, to produce a ramp value RV1. Since all of the sample times of receiver timeline 1802*b* are aligned with the impulses (represented by upward pointed arrows) of received impulse signal 1701, each of the four amplitude values (accumulated to produce RV1) are indicative of the received impulse energy of received impulse signal 1701. Additionally, it is likely that the four amplitude values are also indicative of received noise, interference, and/or ring down from the received impulses.

In this instance, it will be determined at step 1606, that the threshold has been satisfied. Threshold detection is discussed in detail below. Satisfaction of the threshold signifies that frame synchronization has been acquired. In this example, satisfaction of the threshold also signifies that the actual code offset is equal to one (i.e., code offset=1, or CO1), thereby enabling the impulse radio receiver to achieve code synchronization to the extent of the short acquisition code.

Once frame alignment and short acquisition code synchronization are achieved, the impulse radio receiver can begin to track the received signal using a tracking loop. An exemplary tracking loop is discussed above in connection with FIG. 11. As mentioned above, the specific system and method of tracking the received signal is not important to the present invention. Rather, what is significant to the present invention is that tracking can be initiated very early in the acquisition process, thereby improving a signal-to-noise (S/N) ratio during the remainder of the acquisition process, thus improving the probability for fast acquisition. One of ordinary skill in the art will appreciate that there are various ways to track to the received signal. Even though it is preferable to initiate tracking once first stage acquisition is achieved, it is noted that many aspects of the present invention do not rely on tracking beginning at this instance. Accordingly, in alternative embodiments of the present invention tracking can be initiated later in the acquisition process.

Following the tracking and/or in parallel with the tracking, the impulse radio receiver searches for the end of the header (which is the same as the beginning of the data payload). Additionally, the impulse radio receiver determines proper symbol timing. These features are discussed below.

In the above discussed example, each accumulated ramp value (e.g., RV0, RV1, RV2 and RV3) was the sum of four (4) amplitude samples of impulse signal packet 1202. Thus, the ramp integral length (also referred to as integration length)

was four (4). It is much more likely that the integration length is an integer multiple of the length of the short acquisition code (e.g., 8, 16, 32, 64, 256, 512, etc.), to achieve an improved S/N ratio due to integration. The above described step of achieving code and frame synchronization (i.e., step 1504) is essentially the same when the integration length is greater, except that the threshold determination step (e.g., 1606) would be based on accumulated ramp values that are the sum (i.e., integration) of more samples. For example, if the integration length is eight (8), then the threshold determination step would occur once every 8 frames (rather than once every four frames as described above) and each accumulated ramp value would be the sum of 8 samples. Similarly, if the integration length is two hundred and fifty six (256), then the threshold determination step would occur once every 256 frames and each accumulated ramp value would be the sum of 256 samples.

G. Threshold Determination

Various embodiments relating to step 1606, the step of determining whether a threshold has been satisfied, shall now be discussed. In each of these embodiments, this determination is based on ramp values (e.g., RV0, RV1, RV2 and/or RV3), which are determined at step 1604 (e.g., 1604a-1604d) and threshold discriminants, which are determined in steps 1605. One of ordinary skill in the art will understand that other threshold equations constructed from the threshold discriminants are within the spirit and scope of the present invention. The equations used to decide when first stage acquisition is complete are called the first stage acquire threshold equations. Simulations have identified several possible threshold equations involving the following quantities set forth in the table (Table 1) below:

TABLE 1

Threshold Equaiton Quantities

| NumberN Quantity | Description |
| --- | --- |
| 11 MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator variance |
| MA_MinV | Moving (historical) average of the minimum correlator variance |
| Logic_1 | Constant value 1 |
| Logic_0 | Constant value 0 |

Using the description and quantity information above, a basic set of first stage acquire threshold equations are given in the table (Table 2A) below.

TABLE 2A

Threshold Equations

| NumberN Number | Threshold Equationhold Equation |
| --- | --- |
| 11 1 | N * MaxR / MA_meanV > C |
| 2 | MaxR / NextR > C |
| 3 | Logic AND or OR of equation 1 and 2 (via the Master Sequencer) |
| 4 | N * MaxR / MaxV > C |
| 5 | N * (MaxR / MA_meanV) * (MinV / MaxV) > C |
| 6 | N * (MaxR / MA_meanV) * [FORCE_ZERO(MinV – MA_MinV) / FORCE_ONE(MaxV – MA_MinV)] > C |

TABLE 2A-continued

Threshold Equations

| NumberN Number | Threshold Equationhold Equation |
| --- | --- |
| 7 | N * (MaxR – NextR) / MA_meanV > C |
| 8 | N * [(MaxR – NextR) / MA_meanV] * (MinV / MaxV) > C |

Further, the following equations can be used, which are similar to the above, however, are greater than or equal to. To wit (Table 2B):

TABLE 2B

Threshold Equations

| NumberN Number | Threshold Equationhold Equation |
| --- | --- |
| 11 1 | N * MaxR / MA_meanV ≧ C |
| 2 | MaxR / NextR ≧ C |
| 3 | Logic AND or OR of equation 1 and 2 (via the Master Sequencer) |
| 4 | N * MaxR / MaxV ≧ C |
| 5 | N * (MaxR / MA_meanV) * (MinV / MaxV) ≧ C |
| 6 | N * (MaxR / MA_meanV) * [FORCE_ZERO(MinV – MA_MinV) / FORCE_ONE(MaxV – MA_MinV)] ≧ C |
| 7 | N * (MaxR – NextR) / MA_meanV ≧ C |
| 8 | N * [(MaxR – NextR) / MA_meanV] * (MinV / MaxV) ≧ C |

It is understood that other equations can be realized using up to four threshold equation setup registers. In the equations above, N represents the acquisition integration length and C is some programmable constant. The FORCE_ZERO(x) function yields x for $x \geq 0$ and 0 for $x < 0$ and the FORCE_ONE(x) function yields x for $x \geq 1$ and 1 for $x < 1$.

To provide a flexible thresholding scheme, the acquisition logic includes four fully programmable threshold equations. The equations have the following format.

$$\text{Register1} * \text{Term1} * OP1(\text{Term2} - \text{Term3}) <,>,=, \neq \text{Register2} * \text{Term4} * OP2(\text{Term5} - \text{Term6})$$

Each of the four threshold equations can be programmed such that terms 1-6 can select any of the quantities in the table of "Important First Stage Acquisition Quantities". The logic operators, OP1 and OP2, can be set to FORCE_ONE, FORCE_ZERO or NOP (no operation). Register1 and Register2 are 12-bit user configurable registers that realize the N and C constants in the equations above. All of the equations listed in the table of "Example First Stage Acquire Threshold Equations" (as well as many others) can be realized. Also, to provide a flexible comparison scheme, the equations left and right side may be compared using the greater than, less than, equal to, or not equal to operators. The equations in the table of "First Stage Acquire Threshold Equations" currently only require the greater than or greater than or equal to comparison.

To support equation number 3 in the table of "First Stage Acquire Threshold Equations", the Boolean result of each threshold equation may be combined using logic AND or logic OR in the Master Sequencer.

It should be emphasized that the programmable threshold equation logic is only used during short and long code FSA. Second stage acquisition uses separate threshold logic.

Figure 16C:
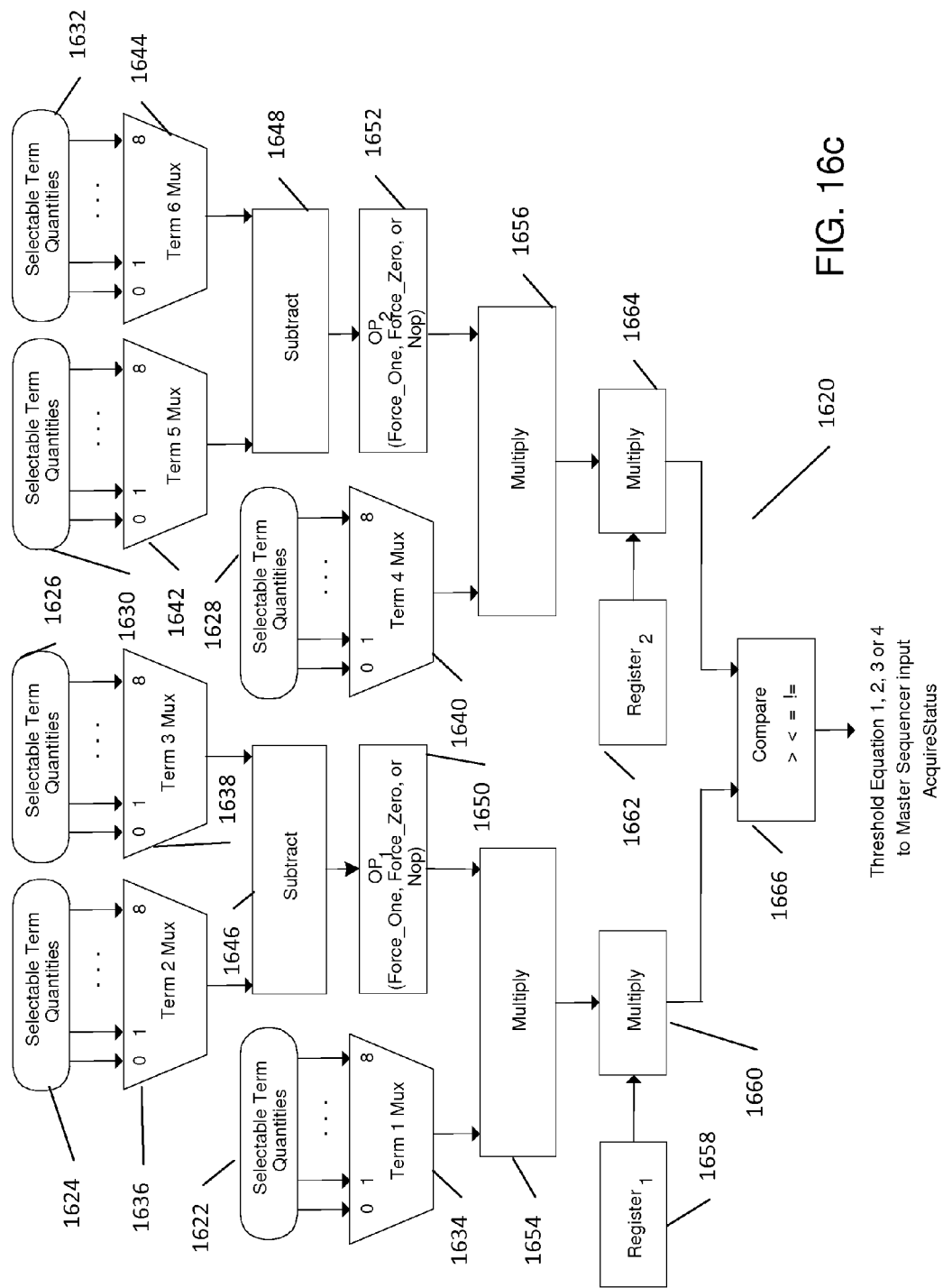
FIG. 16c depicts a quantity threshold comparison flowchart.

The first stage acquisition threshold equation logic is shown in FIG. 16c at 1620, wherein selectable term quantities are input at 1622, 1624, 1626, 1628 and 1630 and 1632. At 1634 Term 1 Mux is selected, at 1636 Term 2 Mux is selected, at 1638 Term 3 Mux is selected, 1640 Term 4 Mux is selected, at 1642 Term 5 Mux is selected and at 1644 Term 6 Mux is selected.

At 1646 Term 2 Mux and Term 3 Mux are substracted and output as OP1 at 1650, and at 1648, Term 5 Mux and Term 6 Mux are subtracted and output as OP2 at 1652. At 1654 Term 1 Mux is multiplied by OP1 and at 1656 Term 4 Mux is multiplied by OP2. Register1 at 1658 is multiplied by the output of 1654 at 1660. Register2 at 1662 is multiplied by the output of 1656 at 1664. The output of 1660 and 1664 are compared at 1666 at output at 1668.

The threshold determination techniques just set forth are further set forth in copending, patent application entitled, "SYSTEM AND METHOD SIGNALS IN UWB COMMUNICATIONS", Ser. No. 10/712,269, filed on 14 Nov. 2003 by Brethour et al. This patent application is incorporated herein by reference in its entirety and for all purposes.

One of ordinary skill in the art will also understand that the multiple ramp values used in the present invention might be built by a single ramp builder.

Another possible method for determining whether a threshold has been satisfied is comparing each of the acquisition ramp values (e.g., RV0, RV1, RV2 and/or RV3) to a predetermined threshold value (i.e., a first stage acquisition threshold value). However, this method is not optimum because one of the ramps can exceed the predetermined threshold value due to noise and/or interference, thereby causing an impulse radio receiver to falsely determine that frame and code synchronization has been acquired. Further, noise and/or interference can cause more than one of the ramps to be greater than the predetermined threshold value. Accordingly, in specific embodiments of the present invention discussed below, threshold determinations are based on relative comparisons between the acquisition ramp values, rather than comparing the acquisition ramp values to a static predetermined value.

In a first embodiment of the present invention, the first largest acquisition ramp (also referred to as MaxR) is compared to the second largest acquisition ramp (also referred to NextR). More specifically, the threshold is satisfied if the first largest acquisition ramp is a predetermined amount of times greater than the next largest acquisition ramp (i.e., MaxR/NextR>C). In one example, the threshold is satisfied if the first largest acquisition ramp is more than three (i.e., C=3) times greater than the next largest acquisition ramp (i.e., MaxR/NextR>3). One of ordinary skill in the art would understand that other values for C are within the spirit and scope of the present invention.

A relative comparison between the first largest acquisition ramp and the next largest acquisition ramp (as done in this embodiment) has advantages over a mere comparison of the first largest acquisition ramp to a predetermined value. First of all, a determination that the first largest acquisition ramp (MaxR) is more than a predetermined amount of times (e.g., 3 times) greater than the next largest acquisition ramp (NextR) also means that the first largest acquisition ramp (MaxR) is more than the predetermined amount of times (e.g., 3 times) greater than each of the other acquisition ramps. This gives a high level confidence that there is not a false threshold detection as can occur when the ramp values are compared to a predetermined threshold. Further, it is likely that noise and/or interference can cause the first largest acquisition ramp to be greater than a predetermined value, thereby causing an impulse radio receiver to falsely determine that frame and code synchronization has been acquired (i.e., if the threshold determination was based on a comparison to a static predetermined value). In contrast, because it is likely that noise and/or interference will corrupt each of the ramps in a relatively similar manner, it is not likely that such noise and/or interference can cause the first largest acquisition ramp to be more than three (3) times greater than the next largest acquisition ramp. This provides a further level confidence that there is not a false threshold detection. Further, it is likely that direct current (DC) offsets can cause the first largest acquisition ramp value to be greater than a predetermined value, thereby causing an impulse radio receiver to falsely determine that frame and code synchronization has been acquired (i.e., if the threshold determination was based on a comparison to a static predetermined value). In contrast, because it is likely that DC offsets will corrupt each of the ramps in a relatively similar manner, it is not likely that such DC offsets can cause the first largest acquisition ramp to be more than three (3) times greater than the next largest acquisition ramp. Therefore, relative comparisons between ramp values have advantages over against static predetermined thresholds.

In a second embodiment of the present invention, whether a threshold has been satisfied can be determined according to the following equation:

$$N \cdot \text{Max}R/(MA\ \text{Mean}V) \geq C$$

where,

N—is the acquisition ramp integral length (i.e., the number of samples accumulated in each ramp), a multiple of the acquisition ramp integral length (i.e., N*2), or a defined constant (i.e., N=64);

MaxR—is the first largest acquisition ramp value;

MA Mean V—is the moving (historical) average of a mean variance (associated with ramps or positions); and C—is a predetermined constant (e.g., 3).

The variance associated with a ramp is the variance of the samples (i.e., the N samples) accumulated to produce the ramp. Thus, for example, if four ramps are produced, then the "mean variance" can be the average of four variance values (where each variance value is associated with a different one of the four ramps).

As is apparent from FIG. 18, every possible position (e.g., P0, P1, P2 and P3) within a sample frame (e.g., SF0) is sampled during parallel steps 1602 (e.g., 1602*a*-1602*d*). The variance associated with a possible position (e.g., P0, P1, P2 or P3) is the variance of the samples (i.e., N samples) at one of the positions. Thus, for example, if an impulse can be located at one of four possible positions within each sample frame, then the mean variance can be the average of four variance values (where each variance value is associated with a different possible position).

The well known equation for variance is:

$$\sigma^2 = \frac{\sum_{i=1}^{N}(x_i - \mu)^2}{N}$$

In this example, $\sigma^2$ represents the amplitude variance of multiple samples (either associated with a ramp, or a possible position), xi represents the amplitude of one of multiple samples, N represents the number of multiple samples used in determining the variance (this can be the same as the acquisition ramp integral length, but may be more), and μ represent the mean (i.e., average) amplitude of the multiple data samples (associated with a ramp, or a possible position).

The above equation determines a biased amplitude variance. Other types of amplitude variance that can be used include an unbiased sample variance (where the denominator is N−1) and an absolute variance. One of ordinary skill in the art will appreciate that additional measures of variance can also be used. Additionally, one of ordinary skill in the art will understand how to determine the moving (historical) average of the mean variance.

In a third embodiment, whether a threshold has been satisfied can be determined according to the equation:

$$N \cdot (\text{Max}R/\text{Max}V) \geq C$$

where,

N is the acquisition ramp integral length (i.e., the number of samples accumulated in each ramp), a multiple of the acquisition ramp integral length (i.e., N*2), or a defined constant (i.e., N=64);

MaxR is the first largest acquisition ramp value;

MaxV is the maximum variance (associated with ramps, or positions, as explained above); and C is a predetermined constant (e.g., 3).

In a fourth embodiment, whether a threshold has been satisfied can be determined according to the equation:

$$\{N \cdot (\text{Max}R/MA \text{ mean } V) \cdot (\text{Min}V/\text{Max}V)\} \geq C$$

where,

N is the acquisition ramp integral length (i.e., the number of samples accumulated in each ramp), a multiple of the acquisition ramp integral length (i.e., N*2), or a defined constant (i.e., N=64);

MaxR is the first largest acquisition ramp value;

MA Mean V—is the moving (historical) average of the mean variance (associated with ramps, or positions, as explained above);

MIN V is the minimum variance (associated with ramps, or positions, as explained above);

MaxV is the maximum variance (associated with ramps, or positions, as explained above); and C is a predetermined constant (e.g., 3).

In a fifth embodiment, whether a threshold has been satisfied can be determined according to the equation:

$$\{N \cdot (\text{Max}R/MA \text{ mean } V) \cdot [(\text{Max}R - \text{Next}R)/\text{Max}R)]\} \geq C$$

where,

N is the acquisition ramp integral length (i.e., the number of samples accumulated in each ramp), a multiple of the acquisition ramp integral length (i.e., N*2), or a defined constant (i.e., N=64);

MaxR is the first largest acquisition ramp value;

MA Mean V—is the moving (historical) average of the mean variance (associated with ramps or positions, as explained above);

NextR is the second largest acquisition ramp value; and

C is a predetermined constant (e.g., 3).

In a sixth embodiment, whether a threshold has been satisfied can be determined according to the equation:

$$\{N \cdot (\text{Max}R/MA \text{ mean } V) \cdot [\text{FORCE\_POS}(\text{Min}V - MA \text{ Min}V)/\text{FORCE\_ONE}(\text{Max}V - MA \text{ Min}V)]\} \geq C$$

where,

N is the acquisition ramp integral length (i.e., the number of samples accumulated in each ramp), a multiple of the acquisition ramp integral length (i.e., N*2), or a defined constant (i.e., N=64);

MaxR is the first largest acquisition ramp value;

MA Mean V—is the moving (historical) average of the mean variance (associated with ramps, or positions, as explained above);

MA Min V—is the moving (historical) average of the minimum variance (associated with ramps, or positions, as explained above);

MA Max V—is the moving (historical) average of the maximum variance (associated with ramps, or positions, as explained above);

MIN V is the minimum variance (associated with ramps, or positions, as explained above);

MAX V is the maximum variance (associated with ramps, or positions, as explained above)

The FORCE_POS(x) function yields x for x≥0, and 0 for x<0;

The FORCE_ONE(x) function yields x for x≥1, and 1 for x<1; and

C is a predetermined constant (e.g., 3).

In an seventh embodiment, whether a threshold has been satisfied can be determined according to the equation:

$$\{N \cdot (\text{Max}R - \text{Next } R)/MA \text{ mean } V\} \geq C$$

where,

N is the acquisition ramp integral length (i.e., the number of samples accumulated in each ramp), a multiple of the acquisition ramp integral length (i.e., N*2), or a defined constant (i.e., N=64);

MaxR is the first largest acquisition ramp value;

MA Mean V—is the moving (historical) average of the mean variance (associated with ramps, or positions, as explained above);

NextR is the second largest acquisition ramp value; and

C is a predetermined constant (e.g., 3).

In an eighth embodiment, whether a threshold has been satisfied can be determined according to the equation:

$$\{N \cdot [(\text{Max}R - \text{Next } R)/MA \text{ mean } V] \cdot (\text{Min}V/\text{Max}V)\} \geq C$$

where,

N is the acquisition ramp integral length (i.e., the number of samples accumulated in each ramp), a multiple of the acquisition ramp integral length (i.e., N*2), or a defined constant (i.e., N=64);

MaxR is the first largest acquisition ramp value;

NextR is the second largest acquisition ramp value;

MA Mean V—is the moving (historical) average of the mean variance (associated with ramps, or positions, as explained above);

Min V is the minimum variance (associated with ramps, or positions, as explained above);

Max V is the maximum variance of (associated with ramps, or positions, as explained above); and C is a predetermined constant (e.g., 3).

In a ninth embodiment, which is a combination of any two of the above embodiments, a threshold is satisfied when the conditions of both specified equations are satisfied (e.g., (MaxR/NextR≥C) AND (N·MaxR/MA MeanV≥C)) or when the conditions of either of the two equations are satisfied (e.g., (MaxR/NextR≥C) OR (N·MaxR/MA MeanV≥C)).

Discussed above are the preferred embodiments for determining whether a threshold has been satisfied. Each of these embodiments reduces the chance of a false threshold detection resulting from noise, interference and/or DC offset. One of ordinary skill in the art would understand that other threshold determinations are within the spirit and scope of the present invention.

H. Tracking

First stage acquisition of the present invention provides for fast and efficient frame alignment and code synchronization to the extent of the short acquisition code, as described above. Accordingly, the present invention provides for a very early opportunity to track the received signal. Proper tracking enables the oscillator in the receiving impulse radio to lock onto the oscillator in the transmitting impulse radio so that the oscillators are not drifting with respect to one another. This will result in an impulse that holds still within a sampling window of the receiving impulse radio. One of ordinary skill in the art will appreciate the benefits of tracking a signal as early as possible in the acquisition process. For example, proper tracking of the received signal improves the signal to noise ratio (S/N) of samples of that signal because received impulses can be more precisely sampled in time.

Tracking can be accomplished in the manner discussed above in connection with FIGS. 6, 7 and 11. Alternatively, tracking can be accomplished using any tracking method known in the relevant art. It is not necessarily the precise method of tracking that is unique to the present invention (although, as discussed below, a unique method is preferably used). Rather it is the extremely early opportunity to track a signal that is unique to the present invention. As mentioned above, even though it is preferable to initiate tracking once first stage acquisition is achieved, it is noted that many aspects of the present invention do not rely on tracking beginning at this instance. Accordingly, in alternative embodiments of the present invention, tracking can be initiated later in the acquisition process (e.g., during or following second stage acquisition).

In a preferred embodiment of the present invention, what are referred to as "back ramp values" are used during tracking. This will be explained in more detail below. However, this use of "back ramp values" is not necessary to accomplish many other aspects of the present invention, as will be appreciated by one of ordinary skill in the art.

I. Back Ramps

Once first stage acquisition is complete, the impulse radio receiver searches for the appropriate ratchet code(s) (as part of second stage acquisition) in a manner described below. As shall be explained below, the impulse radio receiver begins this process by sampling the received signal in accordance with the first expected ratchet code. It is very likely that the impulse radio receiver will sample the received signal in accordance with the first expected ratchet code while the received packet still consists of the repeating short acquisition code sequences. This occurs when the receiver completes first stage acquisition using less than all of the repeating short acquisition code sequences of the packet (e.g., if first stage acquisition is achieved using 32 of 40 repeating short acquisition code sequences). During this intermediate period, there is the possibility that tracking of the received signal is adversely affected because the tracking loop may operate in a partial open loop fashion (e.g., because the tracker may not be tracking impulse signal energy because the radio may not be sampling actual impulses). This can reduce the S/N ratio of samples, and may even cause the oscillator in the impulse radio receiver to drift (with respect to the oscillator of the impulse radio transmitter) to the extent that acquisition of the packet is lost.

Accordingly, in an embodiment of the present invention, ramp values continue to be built based on the short acquisition code, during second stage acquisition. In one embodiment of the present invention, when first stage acquisition is complete, the detected short acquisition code is loaded into a "back" register or a back sequence generator, and samples generated in accordance with the short acquisition code are used for tracking, instead of samples generated in accordance with a ratchet code used in second stage acquisition. These ramps being built according to the short acquisition code, during second stage acquisition, are referred to herein as "back ramps", since they are produced in a background process during tracking and/or second stage acquisition (a foreground process). The ramp builder(s) used to build ramp values according to the short acquisition code, during second stage acquisition, is referred to a "back ramp", since it is operating in the background during tracking and/or second stage acquisition.

In accordance with an embodiment of the present invention, the smallest back ramp value (BRV) is stored in a memory or register so that it can be used for a threshold determination(s) of second stage acquisition. Each time a smaller BRV is determined, it replaces the previously stored smallest BRV. In another embodiment of the present invention, a largest BRV is stored. In still another embodiment, an average of many BRVs is determined and stored. In a further embodiment of the present invention, the last BRV generated during tracking, but prior to second stage acquisition, is stored. The use of such BRVs will be described below in the discussion of second stage acquisition.

J. Detect the Beginning of Data Payload (Second Stage Acquisition)

As mentioned above, each packet preferably includes a delimiter that is used to indicate the end of the header and the beginning of the data payload. As explained in method 1500, after frame alignment (and code synchronization to the extent of the short acquisition code) has been achieved (at step 1504), and tracking has been initiated (at step 1506), the next step is to detect the beginning of the data payload, which is the same as the end of the header (at step 1508). According to an embodiment of the present invention, this is accomplished by detecting a delimiter that defines the end of the packet header.

An exemplary packet was discussed above in connection with FIG. 12A. Referring again to FIG. 12A, packet 1202 includes header portion 1203 (also referred to as header 1203) followed by data payload portion 1208 (also referred to as data payload 1208). Header 1203 includes a plurality of acquisition short code sequences 1204 (also referred to as a plurality of short codes 1204) followed by delimiter 1206. Accordingly, the "delimiter" refers to the one or more frames in the packet used to indicate the end of the header and the beginning of the data payload.

As mentioned above, in one embodiment, delimiter 1206 includes the same number of frames as acquisition code sequence 1204. Thus, if the acquisition short code repeats every four frames (i.e., is a modulo-4 acquisition code), as shown in FIG. 12A, then delimiter 1206 is also four (4) frames in length. In another embodiment, described in more detail below, delimiter 1206 includes an integer multiple of the number of frames included in the acquisition code sequence 1204. More generally, as will be explained below, the length of the delimiter is preferably the same as the ramp integral length N (i.e., the number of samples accumulated in each ramp). The integration length (also referred to as the ramp interval length) is selected such that an acceptable signal to noise ratio can be achieved. Preferably, the integration length is defined by the packet protocol of the present invention.

The embodiment where delimiter 1206 includes the same number of frames as the repeating acquisition code sequence is only used if integration gain is not being used by the transmitter and receiver to improve the signal to noise ratio. This embodiment can be accomplished by making the delimiter identical to the acquisition code sequence, except that each impulse is flipped. Thus, based on the example shown in FIG. 12A, the delimiter would include four frames, with a flipped impulse in position P0 in the frame F0, a flipped impulse in position P1 in frame F1, a flipped impulse in position P2 in frame F2, and a flipped impulse in position P3 in frame F3. As mentioned above, this is illustrated in FIG. 14, which shows an exemplary acquisition code sequence 1204 and its corresponding delimiter 1206. Systems and methods for producing flipped impulses are disclosed in commonly assigned co-pending U.S. patent application Ser. No. 09/537, 692, filed Mar. 29, 2000, entitled, "Apparatus, System and Method for Flip Modulation in an Impulse Radio Communication System," which has been incorporated herein by reference in its entirety.

Once tracking has been achieved, the step of detecting the delimiter is in part accomplished by continuing to accumulate N samples (where N is the acquisition ramp integral length, i.e., the number of samples accumulated in a ramp) of the repeating acquisition code to produce further ramp values. In the embodiment where the delimiter is a flipped version of the acquisition code sequence, the further ramp value corresponding to the delimiter (i.e., corresponding to the accumulated samples of the delimiter frames) will have a polarity opposite to ramps corresponding to the (unflipped) acquisition code sequence. Thus, the delimiter can be detected by determining whether a delimiter threshold has been satisfied based on the further ramp value(s). For example, assuming a ramp value corresponding to the delimiter frames is a negative value, then the delimiter threshold can be satisfied if a ramp value (RV) is less than a predetermined negative delimiter threshold value (e.g., RV<C). More preferably, the delimiter threshold is satisfied if a ramp value is opposite in polarity from a previous ramp value, and at least a specific fraction (e.g., ⅝) or percentage (e.g., 75%) of the previous ramp value, e.g., $RV_n > (RV_{n-1}) \cdot (0.75) \cdot (-1)$. Alternatively, the delimiter can be detected by determining whether a ramp value is opposite in polarity from a stored back ramp value (BRV), and at least a specific fraction (e.g., ⅝) or percentage (e.g., 75%) of the stored BRV, e.g., $RV > (BRV) \cdot (0.75) \cdot (-1)$. The stored BRV, can be, for example, the smallest BRV determined, as discussed above. In each of these embodiments, the delimiter is detected if the delimiter threshold is satisfied. One of ordinary skill in the art will appreciate that other delimiter threshold determinations can be used to determine whether the delimiter has been detected, while still being within the spirit and scope of the present invention.

K. Ratchet Codes

As discussed above, if the integration length is the same as the length of the acquisition short code, then the length of the delimiter is the same as the length of the acquisition short code sequence (which is equal to the number of ramp builders in the receiver). In this situation there is no need for a ratchet code of the present invention, because, after frame alignment and short code synchronization there is no ambiguity relating to the boundaries of the delimiter and data payload that results from the integration length being greater than the number of ramp builders. However, because the S/N ratio is typically not acceptable without the use of integration lengths longer than the length of the acquisition short code, the aforementioned "no ambiguity" situation is unlikely. Stated another way, to increase signal to noise ratio to an acceptable level, integration gain is typically necessary, and N is typically greater than the number of ramp builders (in the impulse radio receiver) available for first and second stage acquisition.

Continuing with the above example, where a modulo-4 acquisition short code sequence is used, it is likely that samples from a plurality of (e.g., 4, 8, 16 or 32, etc.) received acquisition short codes will be accumulated (for integration gain) to generate the above discussed ramp values (e.g., RV0, RV1, RV2 and RV3). Again, this is done to improve S/N ratio. For example, if a receiver accumulates samples from four (4) consecutive modulo-4 acquisition short code sequences to generate each ramp value (e.g., RV0, RV1, RV2 and RV3), then each ramp value will include sixteen (16) amplitude samples (i.e., 1 sample/frame·4 frames/short code sequence·4 short code sequences=16 samples). In other words, the acquisition ramp interval length in this example is sixteen (i.e., N=16). As mentioned above, the length of the delimiter is preferably the same as the acquisition ramp integral length N (i.e., the number of samples accumulated in each ramp). Accordingly, in this example, the length of the delimiter is 16 frames. The contents of the delimiter for this example will be explained below following a discussion of ratchet codes. As noted above, the term "ramp interval length" is equivalent to the term "integration length."

Referring back to FIG. 12B, ratchet code sequence 1205 (or sequences) is located within header 1203 of packet 1202, between the last short acquisition code sequence 1204 and delimiter 1206. As mentioned above in the discussion relating to FIG. 12B, ratchet code(s) (e.g., 1205) is/are used to enable a receiver to resolve the ambiguity resulting from the integration length being greater than the number of ramp builders. Stated another way, ratchet code(s) (e.g., 1205) is/are used to enable a receiver to resolve the ambiguity relating to the start of delimiter 1206 in those situations when samples are integrated to improve a signal to noise ratio. The extent of the ambiguity is equal to the integration length divided by the number of ramp builders (in the receiver) that are used for acquisition (the resulting ambiguity can also be stated in terms of bits of ambiguity, as will be discussed below). For example, if a receiver uses four (4) ramp builders during signal acquisition, and the integration length is sixteen (16), then the receiver must resolve a four (4) way ambiguity (i.e., 16/4=4). This ambiguity can be explained by way of the following example discussed with reference to FIG. 19.

Figure 19:
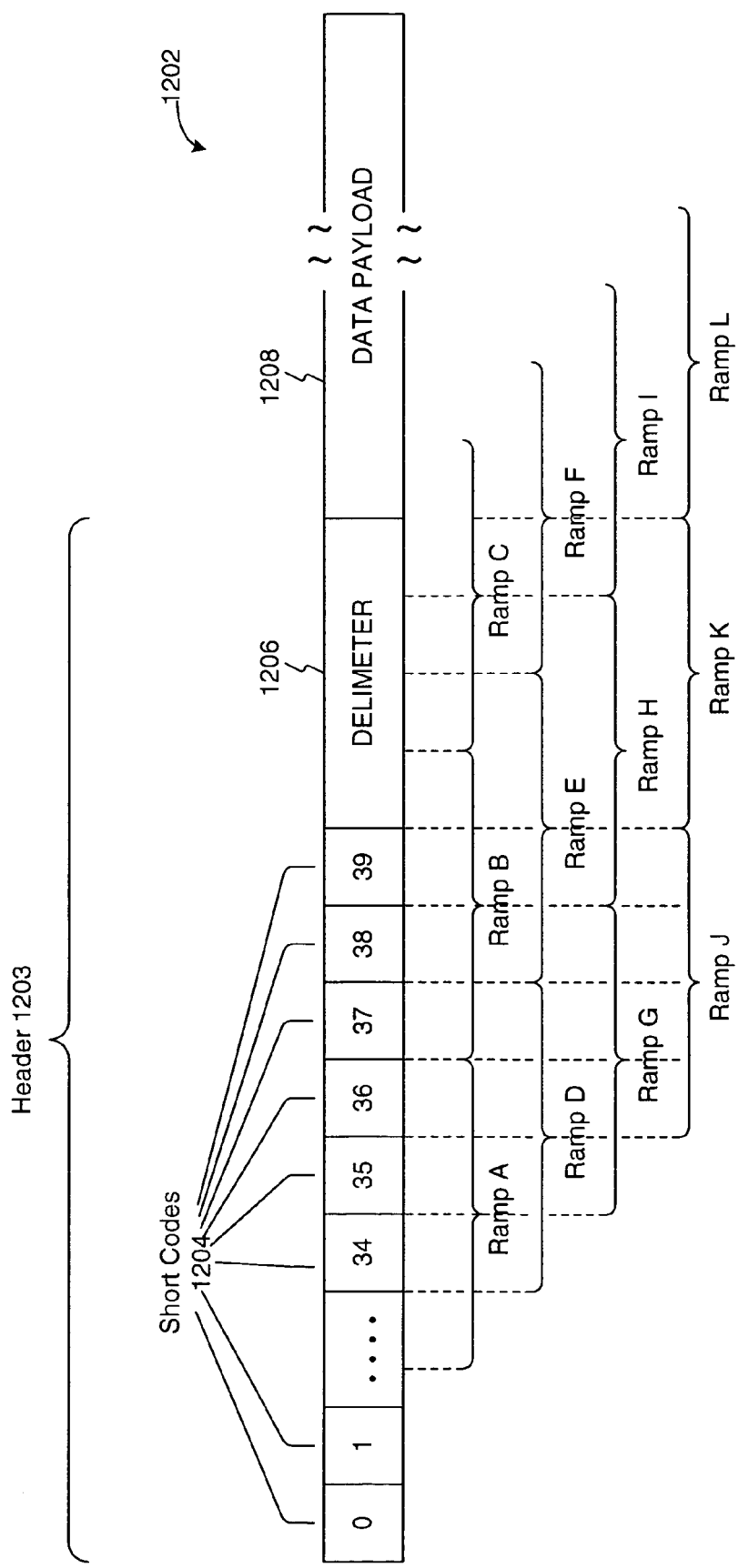
FIG. 19 shows an exemplary packet that is useful for explaining the ambiguity that results from the integration length used by an impulse radio receiver being greater than the number of ramp builders in the impulse radio receiver.

FIG. 19 shows an exemplary packet 1202 that includes forty (40) acquisition short code sequences 1204, 0 through 39 (where each short code sequence 1204 is four frames in length), followed by delimiter 1206 (which is 16 frames in length), followed by data payload 1208. In this example it is assumed that each accumulated ramp value (e.g., RV0, RV1, RV2, RV3) includes 16 samples (i.e., acquisition ramp interval length N=16) of four consecutive short code sequences. It is also assumed, for example, that a receiver was able to achieve code and frame synchronization, and acceptable tracking, using the first thirty three (33) short code sequences 0 . . . 32 (i.e., using the first 132 frames of packet 1202, 4·33=132). Accordingly, at this point (i.e., beginning with the 133rd frame of packet 1202) assume that the receiver begins to generate accumulated ramp values, each including 16 samples, to attempt to detect delimiter 1206. Because short acquisition code and frame synchronization have been achieved, the receiver knows where each impulse is within each frame of the short acquisition code sequences 1204. As discussed above, the receiver attempts to detect delimiter 1206 by determining whether a delimiter threshold has been satisfied. Various ways of determining whether the delimiter threshold has been satisfied have been discussed above.

Still referring to FIG. 19, assuming the use of modulo-4 short codes, and a ramp integral length N=16 (and thus a delimiter length=16), it is possible that a ramp builder of the receiver generates accumulated ramp values corresponding to the portions of packet 1202 designated Ramp A, Ramp B and Ramp C (referred, to respectively as ramp value A (RVA), ramp value B (RVB) and ramp value C (RVC)). As shown, RVB (corresponding to Ramp B) includes samples of three (3) short acquisition code sequences 1204 (short code sequences 37, 38 and 39) and one fourth (¼) of delimeter 1206. More specifically, RVB includes twelve (12) frames of short acquisition code 1204 (i.e., 3 code sequences·4 frames/code sequence=12 frames) and four frames (4) of delimeter 1206. Also shown, RVC includes samples of three fourths (¾) of delimeter 1206 and a small portion of data payload 1208. If ramp values are produced in this manner, the receiver will not detect delimeter 1206 because neither RVB nor RVC will satisfy the delimeter threshold. Thus, the receiver will continue to search for delimeter 1206 in data payload 1208, where the delimeter certainly will not be found. Accordingly, the receiver may not be able to demodulate the data of data payload 1208.

If the receiver generates accumulated ramp values corresponding to portions of packet 1202 designated Ramp D, Ramp E and Ramp F, the receiver will again not detect delimeter 1206, for reasons similar to those just discussed above. Similarly, if the receiver generates accumulated ramp values corresponding to portions of packet 1204 designated Ramp G, Ramp H and Ramp I, the receiver will not detect delimeter 1206.

Each of the above scenario occurs because of ambiguities relating to the start of delimeter 1206, resulting from the integration length being longer than the length of the acquisition short code. That is, the above scenario occurs because the receiver does not know where the series of repeating short code sequences ends and the delimeter begins. Because the integration length is 16, and the acquisition short code length is 4, the delimeter can start at one of four different possible positions over an integration period of 16 frames. The only way the receiver will detect delimeter 1206 is if it generates an accumulated ramp value corresponding to the portion of packet 1202 designated Ramp K. This is because such an accumulated ramp value (i.e., RVK) will consist solely of samples of delimeter 1206, and the delimeter threshold should be satisfied.

Accordingly, as can be appreciated from the above example, a reason there is an ambiguity relating to the start of delimeter 1206 is because all of the repeating acquisition short code sequences 1204 look exactly alike to the receiver. Thus, the receiver does not know when the acquisition short code sequences 1204 end, and delimeter 1206 begins. This presents no ambiguity if the acquisition ramp integral length N is equal to the length of acquisition short code 1204 (as was the case described above in connection with FIGS. 17 and 18), and thus equal to the length of delimeter 1206. However, as shown in the example discussed in connection with FIG. 19, this is a problem when the acquisition ramp integral length N, and the length of delimeter 1206, are integer multiples of the length of acquisition short code 1204. More generally, the issue is that the receiver includes insufficient hardware to resolve all possible ambiguities in parallel.

As shall now be explained, the ratchet codes of the present invention enable the receiver to efficiently detect delimeter 1206, and thus to detect the start of data payload 1208. As will be appreciated, the ratchet codes becomes much more important as the integration length is increased as compared to the number of ramp builders. For example, if the integration length in the example of FIG. 19 is 32 (i.e., N=32), then there are 8 ambiguities (i.e., 32/4=8) as to where the delimeter begins. This eight way ambiguity can be resolved, for example, with only 4 ramp builders using the ratchet codes of the present invention, as shall be explained below.

Another way of discussing the ambiguities that must be resolved are in terms of bits of ambiguities. The total number of bits of ambiguity that must be resolved during first and second stage acquisition, together, equals:

$$\log 2(\text{integration length}).$$

For example, if the integration length is 4, then only 2 bits of ambiguity must be resolved, i.e., log 2(4)=2. For another example, if the integration length is 16, then 4 bits of ambiguity must be resolved, i.e., log 2(16)=4. If the integration length is 256, then 8 bits of ambiguity must be resolved, i.e., log 2(256)=8.

The essence of acquisition is resolving ambiguities that exist with regards to frame alignment and code alignment, and in the present invention, integration length. During first stage acquisition, as explained above, the number of integrations (which is the same as the number of ramps that are built by each ramp builder) that are required to resolve the ambiguity relating to frame alignment (worst case) equals: (frame length/frame step size) rounded up to next integer.

For example, if frame length is 100 ns, and the step size is 3 ns, then approximately 34 integrations (worst case) are required to resolve the ambiguity relating to frame alignment, i.e., rounded up (100/3)=34. As explained above, during first stage acquisition, code alignment or synchronization is achieved to the extent of the short acquisition code. Stated another way, the number of bits of ambiguity resolved during first stage acquisition equals:

$$\log 2(\text{short acquisition code length}).$$

For example, if the short acquisition code length=4, then 2 bits of ambiguity are resolved during first stage acquisition. In another example, if the short code length is 16, then 4 bits of ambiguity are resolved during first stage acquisition.

The number of bits of ambiguity that must be resolved during second stage acquisition is equal to the number of bits that were not resolved during first stage acquisition. More specifically, the number of bits that must be resolved during second stage acquisition equals:

$$\log 2(\text{integration length}) - \log 2(\text{short acquisition code length}).$$

For example, if the integration length is 4 (i.e., N=4), and the short acquisition code length is 4, then 0 bits of ambiguity must be resolved during second stage acquisition (i.e., log 2(4)−log 2(4)=2−2=0). However, if the integration length is 16, and the short acquisition code length is 4, then 2 bits of ambiguity must be resolved during second stage acquisition (i.e., log 2(16)−log 2(4)=4−2=2). For another example, if the integration length is 256, and the short acquisition code is 4, then 6 bits of ambiguity must be resolved during second stage acquisition (i.e., log 2(256)−log 2(4)=8−2=6). As will be explained in detail below, the ratchet codes of the present invention are used to resolve the number of bits of ambiguity that must be resolved during second stage acquisition.

In the example discussed above in connection with FIGS. 13, 17 and 18 (which were used to explain parallel steps 1602*a*-*d* and 1604*a*-*d* of FIG. 16), four accumulated ramp values (RV0, RV1, RV2 and RV3) were repeatedly generated, in parallel, to achieve frame and code synchronization. A specific amount of receiver hardware (i.e., ramp builders) is required, as will be explained below, to generate these ramp values. For example, assume four correlators and four ramp builders are required to sample each frame (e.g., of modulo-4 acquisition short code 1204) at four different times (or positions), and integrate the samples, as shown in FIGS. 17 and 18. It is preferable that the receiver can resolve the ambiguity relating to the beginning of delimeter 1206 without requiring additional hardware. Phrased an alternative way, it is preferable that the receiver can resolve the ambiguities relating to the integration length being greater than the number of ramp builders, without requiring additional hardware. Stated still another way, it is preferable that the receiver can resolve the number of ambiguities that must be resolved during second stage acquisition, without additional hardware. The present invention achieves this using ratchet codes, as shall now be explained.

Whether a ratchet code is used, the number of different ratchet codes, the contents of each ratchet code, and how many of each ratchet code are in a packet header, are all defined by the packet protocol which is known by both the transmitting and receiving impulse radios.

The number of unique ratchet codes required to resolve the above discussed ambiguities that must be resolved during second stage acquisition is a function of the integration length, the short acquisition code length, and the number of ramp builders available (i.e., used) for signal acquisition. More specifically, the number of unique ratchet codes required to resolve the ambiguities that must be resolved during second stage acquisition is equal to:

rounded up to next integer $$\left\{ \frac{\log_2(\text{int.\_length}) - \log_2(\text{short\_aqu\_code\_length})}{\log_2(\text{\#\_of\_available\_ramp\_builders})} \right\}.$$

The numerator of the above equation is equal to the number of bits that must be resolved during second stage acquisition. The denominator is log 2 of the number of ramp builders available (i.e., used) for signal acquisition during first stage acquisition, and during second stage acquisition (this does not include any back ramp builders). Preferably, as mentioned above, the same ramp builders are used during first stage acquisition as during second stage acquisition. Also, the length of each ratchet code is greater than the length of the short acquisition code.

If, for example, two unique ratchet codes are required, then the length of the second ratchet code is greater than the length of the first ratchet code, which is greater than the length of the short acquisition code. The length of the longest ratchet code will be equal to the integration length. More generally, each additional unique ratchet code is longer than the previous unique ratchet code.

The number of each unique ratchet code sequences that must be included in a packet transmitted from an impulse radio transmitter to an impulse radio receiver is preferably as follows:

1) one sequence of the longest unique ratchet code; and
2) two sequences of each of the other (i.e., shorter) unique ratchet code(s).

Thus, if only one unique ratchet code is required, then only one ratchet code sequence must be included in a packet transmitted from the transmitter to receiver. However, if two unique ratchet codes are required, then two of the first (i.e., shorter) ratchet code sequences are included in a packet, and one of the second (i.e., longer) ratchet code sequences are included in the packet. Once again, this is defined by the packet protocol that is known by impulse radios in communications with one another. The sending of more than the above specified number of ratchet codes is within the spirit and scope of the present invention.

The length of the longest ratchet code is preferably equal to the integration length. The length of the first ratchet code can be as long as the short acquisition code length multiplied by the number of available ramp builders. The length of each additional ratchet code (if necessary) can be as long as the previous ratchet code multiplied by the number of available ramp builders, keeping in mind, that the length of the longest ratchet code is preferably equal to the integration length.

Figure 20:
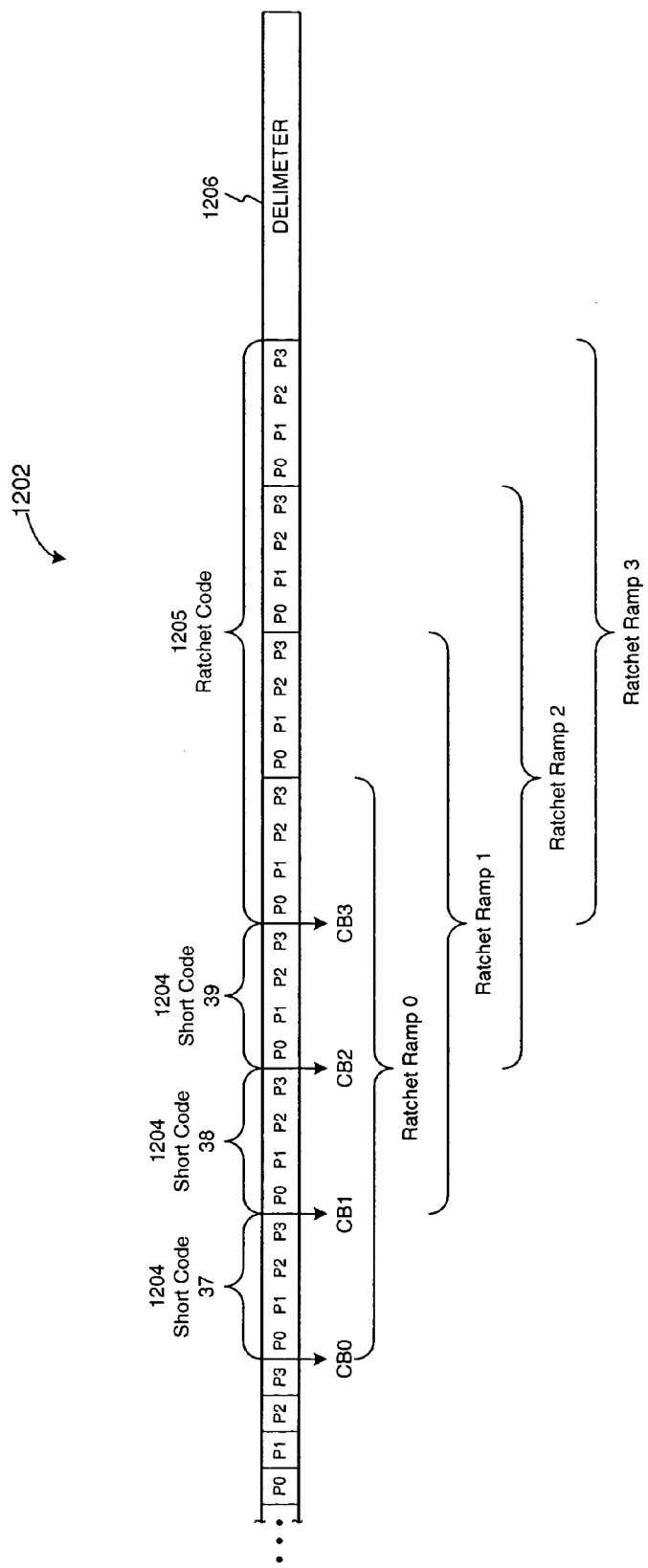
FIG. 20 illustrates an exemplary packet and relative times over which ramp values can be generated, is useful for explaining how a ratchet codes of the present invention can be used to resolve a four (4) way ambiguity that results when a receiver uses four (4) ramp builders during signal acquisition, and the integration length is sixteen (16), and is useful for explaining the steps of FIG. 21.

FIG. 20 shall be used to explain how a ratchet code of the present invention can be used to resolve the ambiguities that occur when a receiver uses four (4) available ramp builders during signal acquisition, the short acquisition code is length four (4), and the integration length is sixteen (16). Thus, in this example, the number of bits of ambiguity resolved during first stage acquisition is 2 (i.e., log 2(4)=2). The number of ambiguities that must be resolved during second stage acquisition is 2 (i.e., log 2(16)–log 2(4)=4–2=2). The number of unique ratchet codes required to resolve the ambiguities that must be resolved during second stage acquisition is equal to 1, i.e., rounded up to next integer {(log 2(16)–log 2(4))/log 2(4)}={(4–2)/2}={2/2}=1. One sequence of the one unique ratchet code should be included in a packet. The length of the ratchet code is preferably 16. FIG. 20 is also used to explain the steps of FIG. 21.

FIG. 21 illustrates additional details of step 1508 of method 1500, according to an embodiment of the present invention. The steps discussed in connection with FIG. 21 correspond to a method of detecting the beginning of a data payload, after frame alignment was achieved based on a modulo-4 acquisition code and repeating modulo-4 acquisition code sequences of the received signal, and code synchronization was achieved to the extent of the short acquisition code. Step 1508 occurs after step 1504 (explained in above additional detail in connection with FIG. 16), and after signal tracking at step 1506. Thus, the receiver can predict the various possible beginning boundaries of a ratchet code, since the receiver knows where frame boundaries are at this point. Based on the description herein, one of ordinary skill in the art will appreciate how this method can be modified to achieve frame alignment based on short acquisition codes of other lengths (e.g., a modulo-8 acquisition code, a modulo 16-acquisition code, etc.). Based on the description herein, one of ordinary skill in the art will also appreciate how ratchet codes of the present invention can be used to resolve additional ambiguities that would result from increased integration lengths.

As shown in FIG. 21, at a step 2102a, a plurality of frames (i.e., N frames, where N is the integration length) of the received impulse signal packet are sampled based on a ratchet code (which is known or derived by the impulse radio receiver) and a code boundary CB0 (i.e., CB=0), to thereby produce a plurality of samples corresponding to the code boundary. For example, if the ratchet code has a length of sixteen (16) frames, then sixteen frames of the received signal packet are sampled based on the known or derived ratchet code, and a guess that the ratchet code begins at the short code boundary designated CB0 in FIG. 20. The sixteen frames sampled at step 2102a are designated Ratchet Ramp 0 in FIG. 20.

Concurrently (but beginning slightly later in time, e.g., one code length later in time), at a step 2102b, the plurality of frames of the received impulse signal packet are sampled based on the ratchet code and a different code boundary CB1 (i.e., CB=1), to thereby produce a plurality of samples corresponding to the code boundary CB1. The sixteen frames sampled at step 2102b are designated Ratchet Ramp 1 in FIG. 20.

Concurrently (but beginning slightly later in time), at a step 2102c, a plurality of frames of the received impulse signal packet are sampled based on the ratchet code and a different code boundary CB2 (i.e., CB=2), to thereby produce a plurality of samples corresponding to the code boundary CB2. The sixteen frames sampled at step 2102c are designated Ratchet Ramp 2 in FIG. 20.

Concurrently (but beginning slightly later in time), at a step 2102d, a plurality of frames of the received impulse signal packet are sampled based on the ratchet code and a different code boundary CB3 (i.e., CB=3), to thereby produce a plurality of samples corresponding to the code boundary CB3. The sixteen frames sampled at step 2102d are designated Ratchet Ramp 3 in FIG. 20.

At next parallel steps 2104a, 2104b, 2104c and 2104d, the plurality of samples produced at steps 2102a, 2102b, 2102c and 2102d, are, separately accumulated to produce respective ramp values (also referred to as accumulated values). More specifically, at step 2104a, the plurality of samples corresponding to the code boundary CB0 are accumulated (e.g., by a ramp builder) to produce a ratchet ramp value RRV0. Concurrently, at step 2104b, the plurality of samples corresponding to the code boundary CB1 are accumulated (e.g., by a separate ramp builder) to produce a ratchet ramp value RRV1. Concurrently, at step 2104c, the plurality of samples corresponding to code boundary CB2 are accumulated (e.g., by another ramp builder) to produce a ratchet ramp value RRV2. Concurrently, at step 2104d, the plurality of samples corresponding to the code boundary CB3 are accumulated (e.g., by still another ramp builder) to produce a ratchet ramp value RRV3.

At a next step 2106, there is a determination of whether a ratchet threshold has been satisfied. This determination is based on one or more of the ratchet ramp values RRV0, RRV1, RRV2 and RRV3. Various methods for performing this threshold determination, according to the present invention, are discussed below. For example, the ratchet threshold can be satisfied if a ratchet ramp value is at least a specific fraction (e.g., ⅝) or percentage (e.g., 75%) of a previous ramp value (e.g., a previous highest ramp value). Alternatively, the ratchet code threshold can be satisfied if a ratchet ramp value is at least a specific fraction (e.g., ⅝) or percentage (e.g., 75%) of the stored back ramp value (BRV), e.g., RRV>(BRV)·(0.75). Preferably, the ratchet code threshold is satisfied when RRV>(BRV)·(Back Ramp Factor), where BRV is the smallest back ramp determined during tracking. Possible values for the back ramp factor are, for example, 1, ⅞, ¾, and ⅝. In each of these embodiments, the ratchet code is detected if the ratchet threshold is satisfied. One of ordinary skill in the art will appreciate that other ratchet threshold determinations can be used to determine whether a ratchet code sequence has been detected.

The threshold may not be satisfied, for example, if the receiver is sampling in accordance with the ratchet code when the actual portion of the packet header being sampled still includes short acquisition code sequences. Accordingly, if the answer to step 2106 is NO, then flow returns to parallel steps 2102a, 2102b, 2102c and 2102d so that additional frames of the packet header can be sampled in search of a ratchet code sequence. If flow indefinitely returns to parallel steps 2102a, 2102b, 2102c and 2102d, then frame alignment and/or short code synchronization has most likely been lost. Thus, preferably, if flow returns to parallel steps 2102a, 2102b, 2102c and 2102d a predetermined number of times, then flow jumps back to step 1502 and first stage acquisition starts over again.

The threshold will be satisfied (i.e., the answer to step 2106 is YES) when one of the accumulated ratchet ramp values (i.e., RRV3 in this example, as shown in FIG. 20) consists solely of samples of ratchet code sequence 1205. For this example it is assumed that the packet protocol only defines one unique ratchet code. A more general flow diagram applicable to various packet protocols (that may define more than one unique ratchet code) shall be discussed below, with reference to FIG. 22.

If the answer to step 2106 is YES (i.e., if a ratchet code sequence is detected), then, in this example, flow goes to step 2110, as shown. At this point, in this example, the ambiguity resulting from the integration length being greater than the number of ramp builders has been resolved. Accordingly, the receiver now samples the received signal in an attempt to detect the delimeter. The delimeter is defined by the packet protocol. According to a preferred embodiment of the present invention, the delimeter is a flipped version of the longest ratchet code of the packet protocol. Thus, at step 2110, a plurality of frames are samples based on the longest ratchet code of the protocol. In this example there is only one rachet code, which was 16 frames in length.

Next, at a step 2112, there is a determination of whether the delimeter threshold has been satisfied. Various ways of performing this threshold determination have been discussed in detail above.

If the answer to step 2112 is NO (i.e., if the delimeter was not detected), then the receiver has probably lost frame alignment, and thus, flow jumps back to step 1502 and first stage acquisition starts over again. If the answer to step 2112 is YES, then flow goes to step 1510, where data payload symbols are detected. At this point symbol timing has been determined because the impulse radio knows precisely when the first frame of the data payload begins and the receiver knows the long code used to encode the symbols in the data payload (e.g., based on the packet protocol).

FIG. 22 shall now be used to illustrate the details of step 1508 of method 1500, in more general terms, according to an embodiment of the present invention. At a step 2201, a value X is set to zero (X is used to track the number of times flow returns to step 2102 due to the ratchet threshold not being satisfied). At step 2102, the received signal is sampled at a plurality of times in accordance with the ratchet code and a code boundary, to produce sequences of samples corresponding to a code boundary. Next at step 2104, the sequence of samples are combined to produce a ratchet ramp value corresponding to the code boundary. As shown, steps 2102 and 2104 are concurrently performed for each of n different code boundaries, thereby producing n ratchet ramp values each corresponding to one of the different code boundaries.

At step 2106 there is a determination of whether a ratchet threshold is satisfied based on the n ratchet ramp values. This has been explained in detail above.

If the answer to step 2106 is NO, then X=X+1 (at step 2203) and there is a determination of whether X<MaxX (e.g., 4), which is a predetermined value (at step 2205). If the answer to step 2205 is YES, then flow returns to step 2102 so that the ratchet code can be searched for again. If the answer to step 2205 is NO, then it is assume that the receiver has lost frame alignment, and thus, flow jumps back to step 1502 and first stage acquisition starts over again.

If the answer to step 2106 is YES, then synchronization has been achieved to the length of the ratchet code, and flow goes to step 2208, as shown. In other words, if the answer to step 2106 is YES, then ambiguity resulting from the integration length being greater than the number of ramp builders has been resolved to the extent of the length of the ratchet code.

At step 2208, there is a determination of whether there are additional ratchet codes for which to search. This determination is based on the packet protocol which is known by both the transmitting and receiving impulse radios. The packet protocol, as discussed above, preferably defines each ratchet code, defines how many different ratchet codes are within each packet, and defines how many of each different ratchet code are within each packet. If the answer to step 2208 is YES, then at step 2209 the ratchet code is set to the next ratchet code (i.e., ratchet code=next ratchet code). For example, the answer to step 2208 will be YES at least once, when the integration length is longer than the first ratchet code. Flow then returns to step 2102, and steps 2102 through 2106 are repeated using the next ratchet code. It is noted that the first time step 2102 is performed, the code boundary is defined by the short acquisition code. If step 2102 is performed in search of additional ratchet codes (i.e., if the answer to step 2208 is YES), then the code boundary will be defined by the previous ratchet code (e.g., if the second ratchet code is being searched for, the code boundaries are defined by the first ratchet code), in a similar manner as when the code boundaries are defined by the short acquisition code, as discussed above.

As mentioned above, a packet protocol may specify that a packet includes more than one different ratchet code sequence because it may not be possible to resolve the ambiguity, resulting from the integration length being greater than the number of ramp builders, using just one ratchet code sequence. For example, assume a receiver uses eight (8) ramp builders during signal acquisition, the short acquisition code is length sixteen (16), and the integration length is two hundred and fifty six (256). Thus, in this example, the number of bits of ambiguity resolved during first stage acquisition is 4 (i.e., log 2(16)=4). The number of ambiguities that must be resolved during second stage acquisition is 4 (i.e., log 2(256)−log 2(16)=8−4=4). The number of unique ratchet codes required to resolve the ambiguities that must be resolved during second stage acquisition is equal to 2, i.e., rounded up to next integer {(log 2(256)−log 2(32))/log 2(8)}=rounded up to next integer {(8−4)/3}=rounded up to next integer {4/3}=2. Two sequences of a shorter one of the unique ratchet codes should be included in a packet, and one sequence of the longer ratchet code should be included. The length of the shorter ratchet code is preferably 128 (i.e., 16·8=128). The length of the longer ratchet code is preferably 256 (the length can be up to 1024 because 128·8=1024, but the length of the longest ratchet code is preferably equal to the integration length).

Returning to the discussion of FIG. 22, if the answer to step 2208 is NO (indicating that the ambiguity resulting from the integration length being greater than the number of ramp builders has been resolved), then flow goes to step 2110, and the receiver samples the received signal in an attempt to detect the delimeter (defined by the packet protocol). As mentioned above, according to a preferred embodiment of the present invention, the delimeter is a flipped version of the longest ratchet code of a packet protocol. Accordingly, at step 2110, a plurality of frames are samples based on the longest ratchet code of the protocol.

Next, at step 2112, there is a determination of whether the delimeter threshold has been satisfied. Various ways of performing this threshold determination have been discussed in detail above.

If the answer to step 2112 is NO (i.e., if the delimeter was not detected), then the receiver has probably lost frame alignment, and thus, flow jumps back to step 1502 and first stage acquisition starts over again. In another embodiment, the answer to step 2112 must be NO a predetermined number of times (e.g., 3) before flow returns to step 1502. If the answer to step 2112 is YES, then flow goes to step 1510, where data payload symbols are detected. At this point symbol timing has been determined because the impulse radio knows precisely when the first frame of the data payload begins and the receiver knows the long code used to encode the symbols in the data payload (based on the packet protocol). As discussed below, in an embodiment of the present invention, command information is included between the delimeter and data payload.

L. Generating Ratchet Codes

Figure 23:
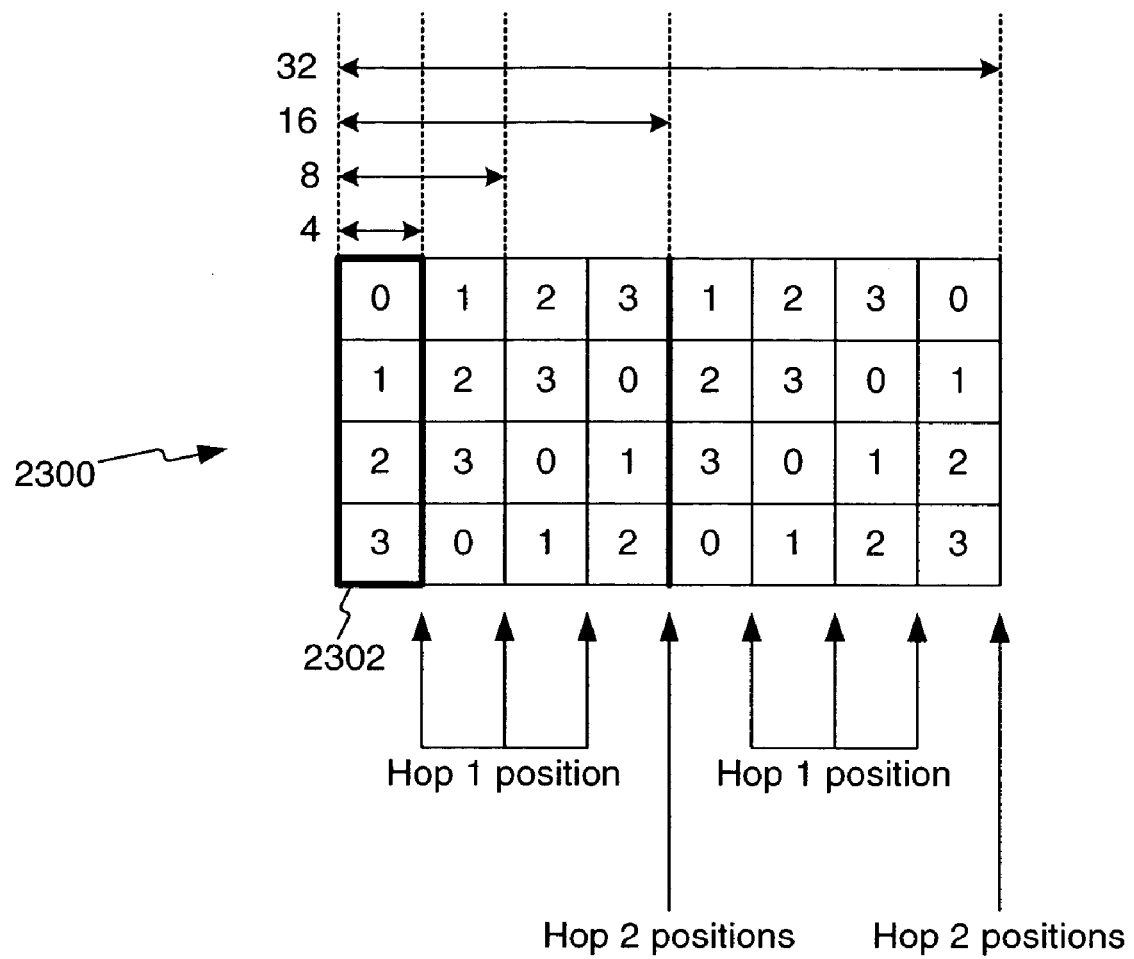
FIG. 23 illustrates a table that is useful for showing how ratchet codes can be generated based on a length four (4) short acquisition code, according to an embodiment of the present invention.

FIG. 23 illustrates how ratchet codes can be generated based on a short acquisition code. The left most column 2302 of table 2300 represents a short acquisition code stored, for example, in an acquisition root register of an impulse radio transceiver. The additional columns show how longer ratchet codes can be derived by "hopping" or "skipping" positions of the short acquisition code. These additional columns need not be stored in the impulse radio receiver. Rather, an acquisition sequence generator of the impulse radio receiver can generate the portion of a code, shown in the additional columns, based on the short acquisition code stored in the register (i.e., column 2302), as will be explained below.

During first stage acquisition, an acquisition sequence generator of the impulse radio transceiver can simply cycle through the short acquisition code (e.g., stored in the acquisition root register, and shown at the left most column 2302 of table 2300) from top to bottom going through the length four code. To generate longer codes (e.g., ratchet codes) based on the modulo-4 short acquisition code, the logic (e.g., of the acquisition sequence generator) goes through the left column once but instead of starting over at 0 (i.e., the zeroth code position) after the end of the first column 2302, the logic "hops" or "skips" one code position. This causes the sequence to hop over code position 0 and start at code position 1. The second column from the left shows the sequence after one hop. Thus, if the short code is P0, P1, P2, P3 (as shown in the left most column 2302), then a length 8 ratchet code, generated in accordance with an embodiment of the present invention, is P0, P1, P2, P3, P1, P2, P3, P0 (represented by the first two columns of table 2300).

If additional longer ratchet codes are required for first stage acquisition, then the process repeats each time the end of a column is reached until the desired code length is obtained. For example, a length 16 ratchet code is obtained by cycling through the short acquisition code four times, each time hopping another one position. This is represented in the first four columns of the table 2300. According the length 16 ratchet code is P0, P1, P2, P3, P1, P2, P3, P0, P2, P3, P0, P1, P3, P0, P1, P2.

Codes up to length 16 can be generated using a length 4 short code and single hops. For codes longer than 16, two hops are required to break up the sequence. For example, to generate a length 32 code, the logic starts at the upper left corner of table 2300, and single hops at the end of each column until the end of the fourth column. At that point, two positions are hopped to produce the fifth column. Then one position is hopped to produce the sixth, seventh and eighth columns. For example, a length 32 ratchet code can be obtained using all eight columns shown in table 2300, wherein the ratchet code is P0, P1, P2, P3, P1, P2, P3, P0, P2, P3, P0, P1, P3, P0, P1, P2, P1, P2, P3, P0, P2, P3, P0, P1, P3, P0, P1, P2, P0, P1, P2, P3. To generate even longer codes double hops are performed at each length 32 code boundary. As stated above, the second through eighth columns need not be stored in the impulse radio receiver. Rather, the acquisition sequence generator of the impulse radio receiver can generate the portions of a code shown in the additional columns (i.e., the second through eighth columns) based on the short acquisition code stored in the register (i.e., column 2302).

When discussing possible positions within a frame (where an impulse can be located, e.g., due to a code), the nomenclature Pn (e.g., P0, P1, P2, P3) has been used to represent the different possible (e.g., four) positions. It is noted, however, that position P0, need not be a position that is earlier in a frame (i.e., closer to the beginning frame boundary) than positions P1, P2 and/or P3. Rather, references to position P0, P1, P2, P3 simply refer to four different possible positions within a frame. The order of the positions as shown in the figures (e.g., FIGS. 12A, 13, 14, 17 and 18) was to simplify the discussion.

According to an embodiment of the preset invention, the packet protocol is such that every ratchet code can be derived from a short acquisition code that is stored in a register of an impulse radio. For example, a register can include the contents of first column 2302 of table 2300. The ratchet codes can be derived from the contents of first column 2302 as described above in the discussion of FIG. 23. Similarly, a register can include the contents of first column 2802 of table 2800. The ratchet codes can be derived from the contents of first column 2802 as described below in the discussion of FIG. 28. Thus, a packet protocol of the present invention enables a minimum amount of data (e.g., the short acquisition code) to be stored in a register that is used to derive codes for signal acquisition.

M. Exemplary Impulse Radio Receiver Subsystem

Figure 24:
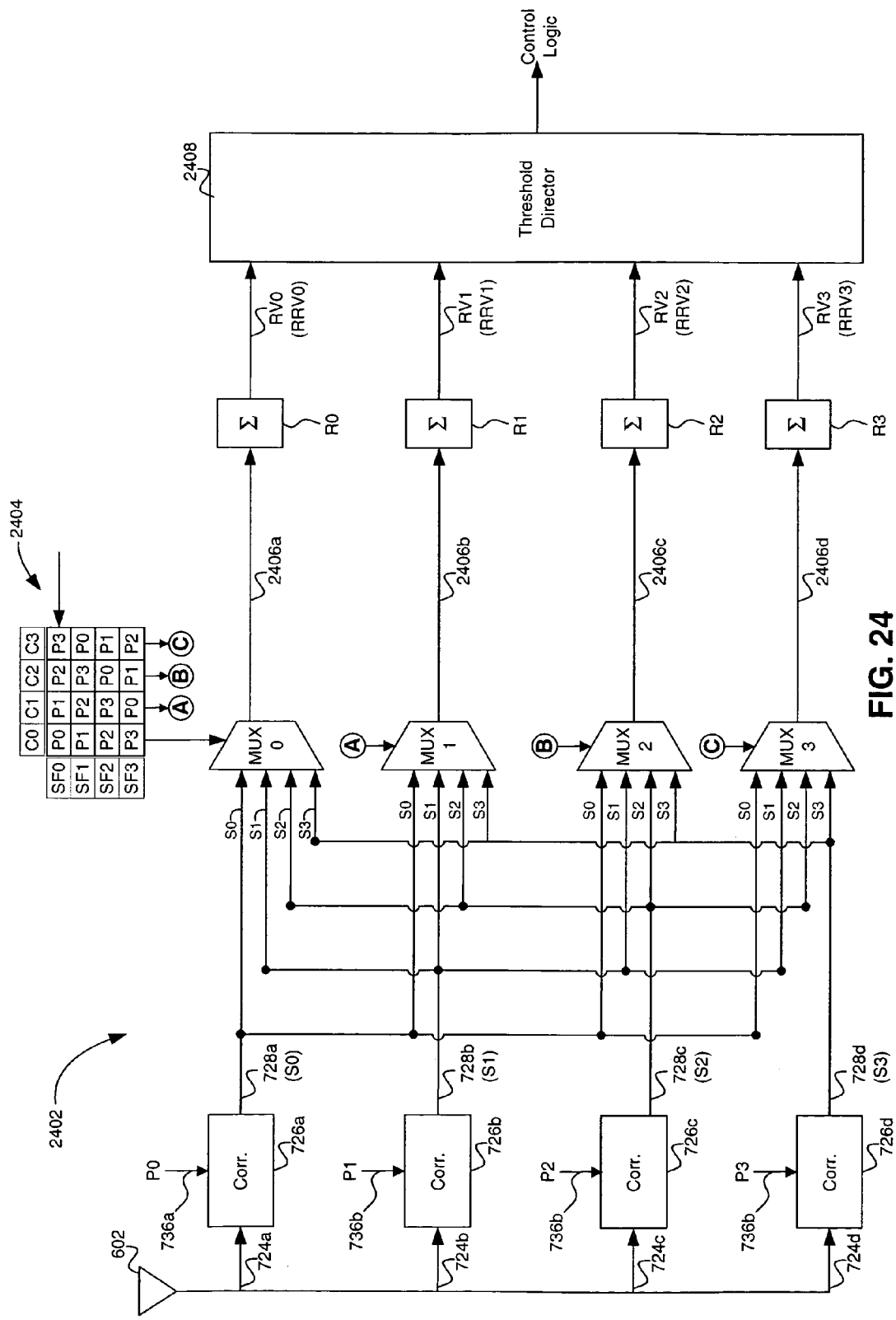
FIG. 24 shows an exemplary portion of an impulse radio receiver according to an embodiment of the present invention.

FIG. 24 shows an exemplary portion of an impulse radio receiver 2402 (simply referred to as receiver 2402, or receiver subsystem 2402) of the present invention. This exemplary receiver 2402 can be used to implement the methods of the present invention that have been explained above. Receiver 2402 can be implemented using receiver 600 of FIGS. 6 and 7, with elements not explicitly shown in FIGS. 6 and 7, for example, implemented in baseband processor 620.

1. Operation during First Stage Acquisition

Referring to FIG. 24, exemplary receiver 2402 includes four sampling correlators 726a, 726b, 726c, 726d. During first stage acquisition: correlator 726a samples a zeroth impulse position P0 in accordance with a sampling control signal 736a; correlator 726b samples a first impulse position P1 in accordance with a sampling control signal 736b; correlator 726c samples a second impulse position P2 in accordance with a sampling control signal 736c; and correlator 726d samples a third impulse position P3 in accordance with a sampling control signal 736d. First stage acquisition has previously been described in connection with step 1502 of FIG. 15, and also in connection with additional figures, such as FIGS. 16, 17 and 18. Accordingly, earlier discussed figures will be referred to below where applicable.

A resulting Sample/Hold (S/H) signal 728a (also referred to as S0), representing correlation results from correlator 726a, is provided to four multiplexers, including Mux0, Mux1, Mux2 and Mux3. Similarly, resulting Sample/Hold (S/H) signal 728b (also referred to as S1), representing correlation results from correlator 726b, is provided to Mux0, Mux1, Mux2 and Mux3. Resulting Sample/Hold (S/H) signal 728c (also referred to as S2), representing correlation results from correlator 726c, is provided to Mux0, Mux1, Mux2 and Mux3. Resulting Sample/Hold (S/H) signal 728d (also referred to as S3), representing correlation results from correlator 726d, is also provided to Mux0, Mux1, Mux2 and Mux3.

In accordance with specific embodiments of the present invention discussed above, correlators 726a, 726b, 726c and 726d sample each of the possible impulse positions during a frame period (four possible positions in this example) in an attempt to sample impulses of repeating short acquisition codes of a packet header. The outputs S0, S1, S2 and S3 of the correlators are provided to multiplexers Mux0, Mux1, Mux2 and Mux3. Mux0 selects one of outputs S0, S1, S2 and S3 in accordance with the short acquisition code (P0, P1, P2, P3) and a zero code offset (CO0), represented by the first column of table 2404. Sample timelines 1702a and 1802a are useful for understanding the operation of Mux0. Mux1 selects one of outputs S0, S1, S2 and S3 in accordance with the short acquisition code (P0, P1, P2, P3) and a code offset=1 (CO1), represented by the second column of table 2404. Sample timelines 1702b and 1802b are useful for understanding the operation of Mux1. Mux2 selects one of outputs S0, S1, S2 and S3 in accordance with the short acquisition code (P0, P1, P2, P3) and a code offset=2 (CO2), represented by the third column of table 2404. Sample timelines 1702c and 1802c are useful for understanding the operation of Mux2. Mux3 selects one of outputs S0, S1, S2 and S3 in accordance with the short acquisition code (P0, P1, P2, P3) and a code offset=3 (CO3), represented by the fourth column of table 2404. Sample timelines 1702d and 1802d are useful for understanding the operation of Mux3.

Accordingly, correlators 726a, 726b, 726c and 726d perform steps 1602a, 1602b, 1602c and 1602d, discussed above in connection with FIG. 16, and also explained in connection with FIGS. 17 and 18.

It is noted that table 2404 need not be stored in a memory of receiver 2402. Rather, only a first column of table 2404 is stored in a memory or register (e.g., a short code register) of receiver 2402, and the contents of the other columns (i.e., the short acquisition code with code offsets CO1, CO2 and CO3) are generated based on the contents of the register (e.g., by shifting the contents of the register, or by beginning at a different point in a rotating register).

Mux0 outputs a signal 2406a, which includes a plurality of samples corresponding to the code offset CO0 and a frame offset (FO). These samples corresponding to the code offset CO0 and the frame offset (FO) (i.e., signal 2406a) are provided to a ramp builder R0 (also referred to as an accumulator R0), which accumulates N samples (where N is the integration length), and outputs a ramp value RV0.

Mux1 outputs a signal 2406b, which includes a plurality of samples corresponding to the code offset CO1 and the same frame offset (FO). These samples corresponding to the code offset CO1 and the frame offset (FO) (i.e., signal 2406b) are provided to a ramp builder R1 (also referred to as an accumulator R1), which accumulates N samples (where N is the integration length), and outputs a ramp value RV1.

Mux2 outputs a signal 2406c, which includes a plurality of samples corresponding to the code offset CO2 and the same frame offset (FO). These samples corresponding to the code offset CO2 and the frame offset (FO) (i.e., signal 2406c) are provided to a ramp builder R2 (also referred to as an accumulator R2), which accumulates N samples (where N is the integration length), and outputs a ramp value RV2.

Mux3 outputs a signal 2406d, which includes a plurality of samples corresponding to the code offset CO3 and the same frame offset (FO). These samples corresponding to the code offset CO1 and the frame offset (FO) (i.e., signal 2406d) are provided to a ramp builder R3 (also referred to as an accumulator R3), which accumulates N samples (where N is the integration length), and outputs a ramp value RV3.

Accordingly multiplexers Mux0, Mux1, Mux2 and Mux3, and ramp builders R0, R1, R2 and R3 perform steps 1604a, 1604b, 1604c and 1604d, discussed above in connection with FIG. 16, and also in connection with FIGS. 17 and 18.

Ramp values RV0, RV1, RV2 and RV3 are provided to a threshold detector 2408, which determines whether a threshold (e.g., a first stage acquisition threshold) has been satisfied. Thus, threshold detector 2408 performs step 1606 discussed above in connection with FIG. 16. This determination is based on one or more of ramp values RV0, RV1, RV2 and RV3. Various threshold determinations, according to the present invention, have been discussed in detail above.

If the threshold has been satisfied, then receiver 2402 determines that it has identified the correct frame offset and code offset, and thus, the impulse radio receiver has achieved frame alignment and short acquisition code synchronization. Failure to satisfy the threshold will typically indicate that the sample frames are not frame aligned with the frames of the received packet. Accordingly, failure to satisfy the threshold shall be interpreted as indicating that there is an unacceptable offset between the beginning of each frame in the received packet and the beginning of each frame of the sample frames. Thus, if the threshold has not been satisfied, then the frame offset FO is adjusted (e.g., FO=FO+3 nsec, where 3 nsec is referred to as the step size) so that another frame offset can be tested. After the frame offset FO has been adjusted, each of correlators 726a, 726b, 726c and 726d attempts to sample additional frames of repeating short code sequences, in accordance with a specific code offset (e.g., respectively, CO0, CO1, CO2 and CO3) and the new frame offset FO. New ramps values RV0, RV1, RV2 and RV3 are produced in the same manner discussed above. This process is repeated, each time with a new frame offset FO, until the threshold is satisfied, thereby indicating that impulse radio receiver 2402 has achieved satisfactory frame alignment (also referred to as frame synchronization), and also short acquisition code synchronization.

It is noted that analog to digital converters (e.g., A/Ds 772a-d) are not explicitly shown in FIG. 24. However, it is likely that A/Ds are placed at the output of each correlator, so that the inputs to the multiplexers are digital signals. Alternatively, such A/Ds can be placed between the multiplexers and the ramp builders, or between the ramp builders and threshold detector 2408. Additionally, certain elements of the receiver front end are not shown in FIG. 24.

2. Tracking and Back Ramps

Figure 11:
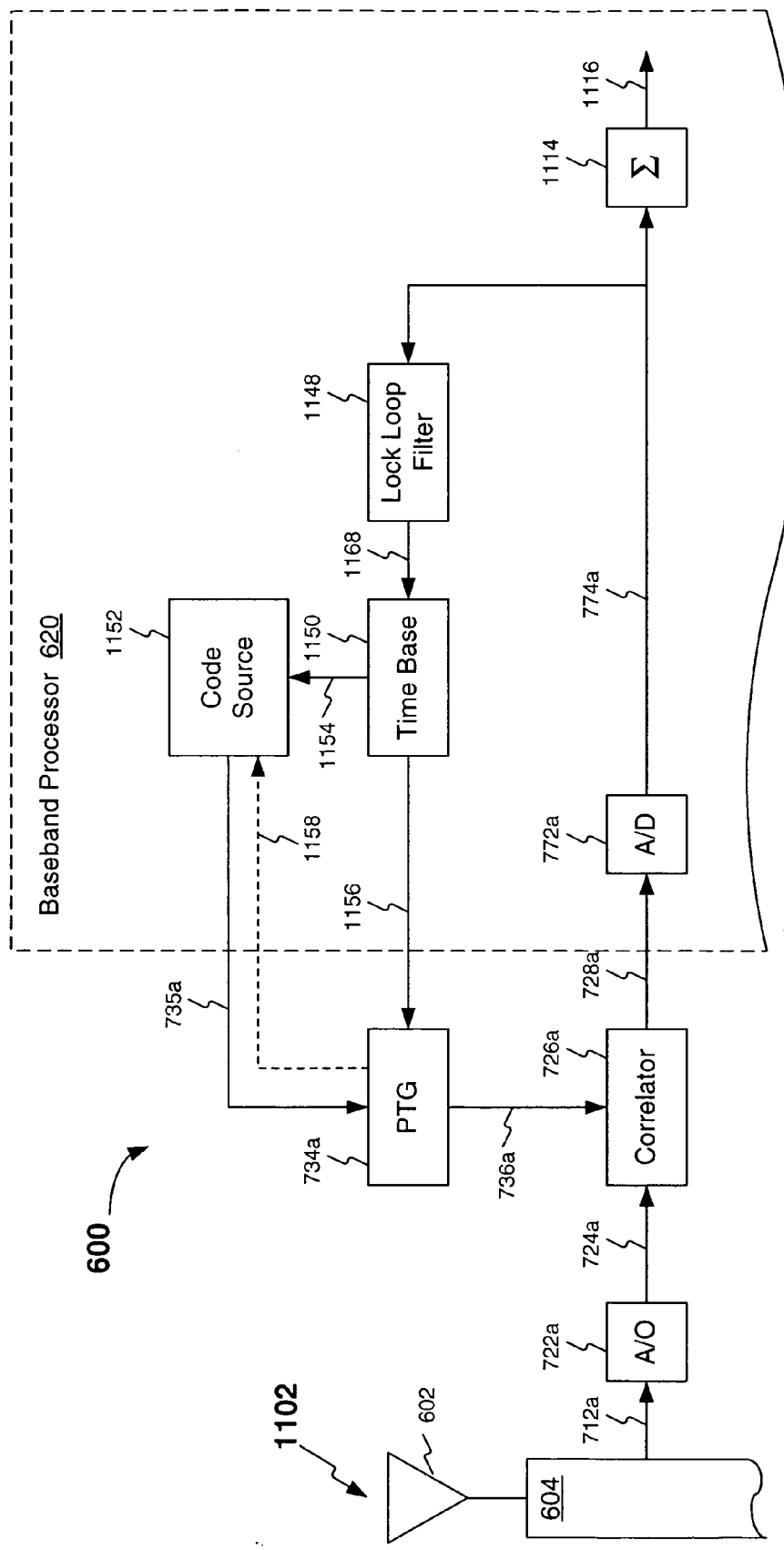
FIG. 11 is a block diagram of an exemplary lock loop used for tracking a receive impulse signal.

After first stage acquisition, one or more of correlators 726a, 726b, 726c and 726d can be used for tracking, as discussed in more detail above (e.g., in connection with FIG. 11).

After first stage acquisition is complete and preferably after tracking has been initiated, impulse radio receiver 2402 searches for appropriate ratchet code(s), as part of second stage acquisition. Impulse radio receiver 2402 begins this process by sampling the received signal in accordance with the first expected ratchet code. As explained above, it is likely that receiver 2402 will sample the received signal in accordance with the first expected ratchet code while the received packet still consists of the repeating short acquisition code sequences. This occurs when receiver 2402 completes first stage acquisition using less than all of the repeating short acquisition code sequences of the packet (e.g., if first stage acquisition is achieved using 32 of 40 repeating short acquisition code sequences). During this intermediate period, there is the possibility that tracking of the received signal is adversely affected because the tracking loop may operate in a partial open loop fashion. This can reduce the signal to noise ratio of samples, and may even cause the oscillator in impulse radio receiver 2402 to drift (with respect to the oscillator of the impulse radio transmitter) to the extent that acquisition of the packet is lost.

Figure 25:
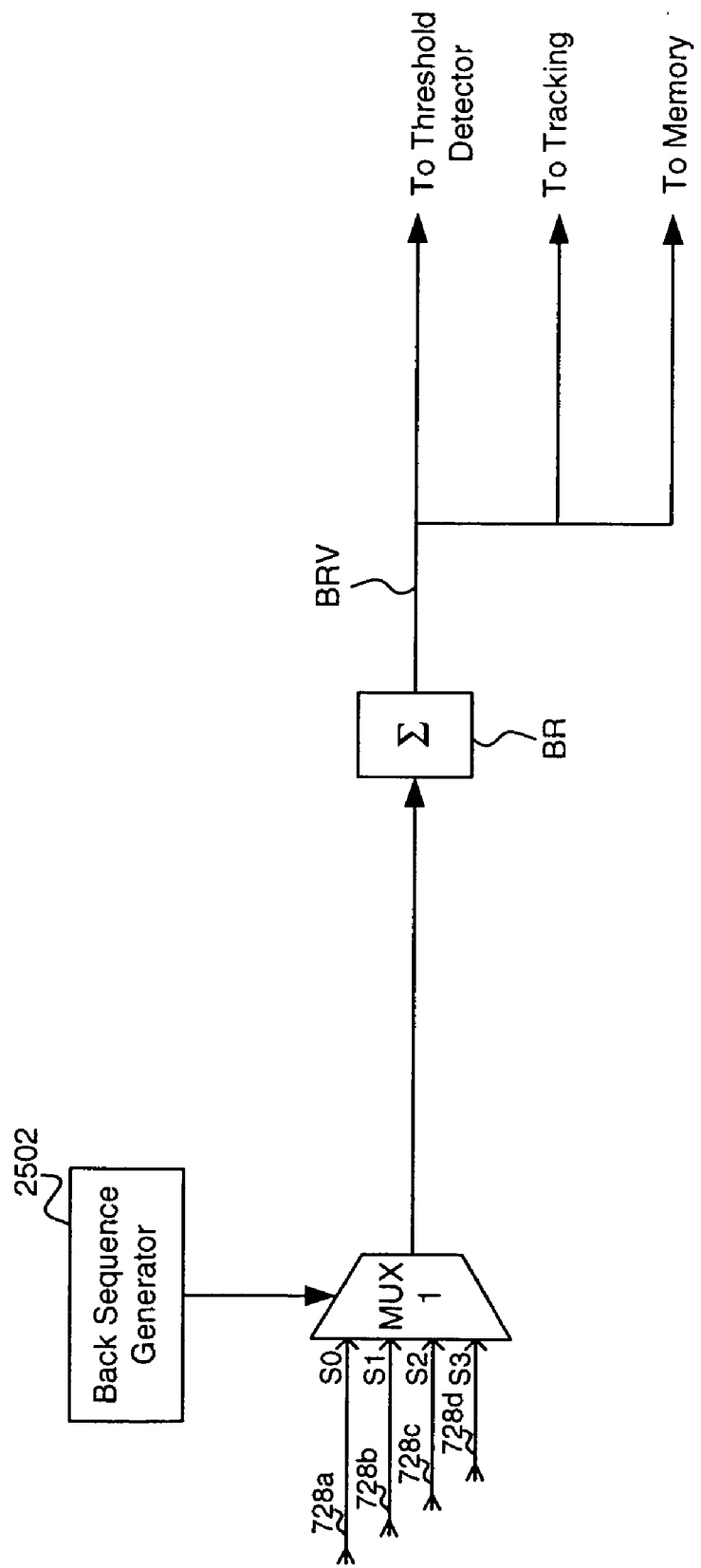
FIG. 25 illustrates an exemplary portion of an impulse radio reciever that is used to produce back ramp values, according to an embodiment of the present invention.

Accordingly, in an embodiment of the present invention, ramp values continue to be built based on the short acquisition code, during second stage acquisition. Referring now to FIG. 25, in an embodiment of the present invention, when first stage acquisition is complete, the detected short acquisition code and its code offset is loaded into a back register and/or a back sequence generator 2502. Samples generated in accordance with the short acquisition code and the appropriate code offset (as selected by BackMux) are then used in the tracking loop, instead of samples generated in accordance with ratchet codes. More specifically, Back Ramp builder (BR) generates back ramp values (BRVs) according to the short acquisition code (stored in back sequence generator or register 2502), during second stage acquisition.

In accordance with an embodiment of the present invention, the smallest back ramp value (BRV) is stored in a memory or register (which may or may not be part of threshold detector 2408) so that it can be used for threshold determination(s) of second stage acquisition. Each time a smaller BRV is determined, it replaces the previously stored smallest BRV. In another embodiment of the present invention, a largest BRV is stored. In still another embodiment, an average of many BRVs is determined and stored. In a further embodiment of the present invention, the latest BRV generated is stored. The use of BRVs has been discussed above, and will be described again below in the discussion of receiver operation during second stage acquisition.

3. Operation during Second Stage Acquisition

In accordance with a preferred embodiment of the present invention, the same hardware used for first stage acquisition is also used for second stage acquisition. Second stage acquisition has previously been described in connection with step 1508 of FIG. 15, and also in connection with additional figures, such as FIGS. 20, 21 and 22. Accordingly, these figures are referenced below when appropriate.

Referring again to FIG. 24, during second stage acquisition, sampling correlator 726a samples a plurality of frames (i.e., N frames, where N the integration length) of the received impulse signal packet based on a ratchet code (which is known or derived by the impulse radio receiver) and a code boundary CB0 (i.e., CB=0), to thereby produce a plurality of samples corresponding to the code boundary. For example, if the ratchet code has a length of sixteen (16) frames, then sixteen frames of the received signal packet are sampled based on the ratchet code, and a guess that the ratchet code begins at a short code boundary CB0 (e.g., shown in FIG. 20, discussed above). For example, the sixteen frames sampled by correlator 726a are designated Ratchet Ramp 0 in FIG. 20. Accordingly, correlator 726a is used to perform step 2102a, discussed above in connection with FIGS. 21 and 22. Receiver 2402 preferably derives the ratchet code(s) based on the acquisition short code stored in a register, as explained in detail above.

Concurrently (but beginning slightly later in time), sampling correlator 726b samples a plurality of frames of the received impulse signal packet based on the ratchet code and a different code boundary CB1 (i.e., CB=1), to thereby produce a plurality of samples corresponding to the code boundary CB1. For example, the sixteen frames sampled by correlator 726b are designated Ratchet Ramp 1 in FIG. 20. Accordingly, correlator 726b is used to perform step 2102b, discussed above in connection with FIGS, 21 and 22.

Concurrently (but beginning slightly later in time), sampling correlator 726c samples a plurality of frames of the received impulse signal packet based on the ratchet code and a different code boundary CB2 (i.e., CB=2), to thereby produce a plurality of samples corresponding to the code boundary CB2. For example, the sixteen frames sampled at by correlator 726c are designated Ratchet Ramp 2 in FIG. 20. Accordingly, correlator 726c is used to perform step 2102c, discussed above in connection with FIGS, 21 and 22.

Concurrently (but beginning slightly later in time), sampling correlator 726d samples a plurality of frames of the received impulse signal packet based on the ratchet code and a different code boundary CB3 (i.e., CB=3), to thereby produce a plurality of samples corresponding to the code boundary CB3. The sixteen frames sampled at step 2102d are designated Rachet Ramp 3 in FIG. 20. Accordingly, correlator 726d is used to perform step 2102d, discussed above in connection with FIGS. 21 and 22.

The outputs S0, S1, S2 and S3 of the correlators are provided to multiplexers Mux0, Mux1, Mux2 and Mux3. Mux0 selects one of outputs S0, S1, S3 and S3 in accordance with the ratchet code (e.g. P0, P1, P2, P3, P1, P2, P3, P4, P2, P3, P0, P1, P3, P0, P1, P2) and a zeroth code boundary (CB0). Mux1 selects one of outputs S0, S1, S3 and S3 in accordance with the ratchet code and a code boundary=1 (CB1). Mux2 selects one of outputs S0, S1, S3 and S3 in accordance with the ratchet code and a code boundary=2 (CB2). Mux3 selects one of outputs S0, S1, S3 and S3 in accordance with the short acquisition code (P0, P1, P2, P3) and a code boundary=3 (CB3).

The plurality of samples corresponding to the code boundary CB0 are accumulated by ramp builder R0 to produce a ratchet ramp value RRV0. Concurrently, the plurality of samples corresponding to the code boundary CB1 are accumulated by separate ramp builder R1 to produce a ratchet ramp value RRV1. Concurrently, the plurality of samples corresponding to code boundary CB2 are accumulated by ramp builder R2 to produce a ratchet ramp value RRV2. Concurrently, the plurality of samples corresponding to the code boundary CB3 are accumulated by ramp builder R3 to produce a ratchet ramp value RRV3.

Accordingly multiplexers Mux0; Mux1, Mux2 and Mux3, and ramp builders R0, R1, R2 and R3 perform steps 2104a, 2104b, 2104c and 2104d, discussed above in connection with FIG. 21, and also in connection with FIGS. 22 and 23.

As can be appreciated from FIG. 20, Ratchet Ramp 3 is built slightly later in time than Ratchet Ramp 2, which is built slight later in time than Ratchet Ramp 1, which is built slightly later in time than Ratchet Ramp 0. Thus, the earlier generated ratchet ramp values must be stored so that they can be used together with the later generated ratchet ramp values in a threshold determination. It is noted that additional ratchet ramp values (e.g., a second Ratchet Ramp 0) begin to be generated while later generated ratchet ramp values (e.g., the first Ratchet Ramp 3) are being generated.

Ratchet ramp values RRV0, RRV1, RRV2 and RRV3 are provided to threshold detector 2408, which determines whether a ratchet threshold (also referred to as a second stage acquisition threshold) has been satisfied. This determination is based on one or more of ratchet ramp values RRV0, RRV1, RRV2 and RRV3. Thus, threshold detector 2408 performs step 2106 discussed above in connection with FIGS. 21 and 22. This threshold determination may also be based on a back ramp value, which has been discussed above, and will be discussed again below. Various methods for performing this threshold determination, according to the present invention, have been discussed in detail above.

If the ratchet threshold has been satisfied, then receiver 2402 determines that it has identified the correct code boundary offset, and thus, the impulse radio receiver has achieved code alignment to the extent of the ratchet code.

The threshold may not be satisfied, for example, if the receiver is sampling in accordance with the ratchet code when the actual portion of the packet header being sampled still includes short acquisition code sequences. Accordingly, if the threshold is not satisfied, additional frames of the packet header are sampled in search of a ratchet code sequence. If a rachet code sequence is not found within a specific amount of frames (or a specific amount of time), then frame alignment and/or short code synchronization has most likely been lost. At that point, first stage acquisition starts over again.

The threshold will be satisfied when one of the accumulated ratchet ramp values consists solely of samples of a ratchet code sequence. As discussed above, if the threshold is satisfied, the ambiguity resulting from the integration length being greater than the number of ramp builders has been resolved to the extent of the ratchet code. Accordingly, if receiver 2402 does not expect any additional ratchet codes sequences (as defined by the packet protocol), receiver 2402 now samples the received signal in an attempt to detect the delimeter (which is also defined by the packet protocol). If receiver 2402 expects additional ratchet code sequences (as defined by the packet protocol), receiver 2402 will sample the received signal in accordance with the next ratchet code to resolve further ambiguities, as explained above.

As discussed above, an exemplary delimeter is a flipped version of the longest ratchet code of a packet protocol. Thus, correlators 726a, 726b, 726c and 726d sample the next N frames (e.g., the next 16 frames) based on the longest ratchet code of the protocol, and a multiplexer (e.g., Mux0) and ramp builder (e.g., R0) are used to accumulate the plurality of samples generated in accordance with the longest ratchet code. The delimeter ramp value produced (e.g. by R0) based on the longest ratchet code is provided to threshold detector 2408, which determines whether the delimeter threshold has been satisfied. Various ways of performing this threshold determination have been discussed in detail above.

If the delimeter threshold is not satisfied (i.e., the delimeter is not detected), then receiver 2402 has probably lost frame alignment, and thus, receiver 2402 starts first stage acquisition over again. If the delimeter threshold is satisfied (i.e., the delimeter is detected), then receiver 2402 begins to detect data payload symbols. At this point symbol timing has been determined because impulse radio 2402 knows precisely when the first frame of the data payload begins, and receiver 2402 knows the long code used to encode the symbols in the data payload (e.g., based on the packet protocol).

4. Frame Format and Additional Receiver Embodiments for Use with Longer Short Acquisition Codes and Ratchet Codes In the exemplary embodiments discussed above, a modulo-4 short acquisition code was used during first stage acquisition, and four correlators were used to sample each of four possible positions of an impulse within each frame of a header. As noted above, it is likely that short acquisition codes of other lengths (e.g., modulo-8 or modulo-16) will be used. In one example, if a modulo-8 short acquisition code is used, then an impulse can be located in one of eight possible positions within each frame of a header. Accordingly, eight correlators can be used to sample the eight possible positions of an impulse within each frame. Alternatively, only four correlators are used to sample the eight possible positions, in accordance with an embodiment of the present invention that shall now be explained with reference to FIG. 26.

Figure 26:
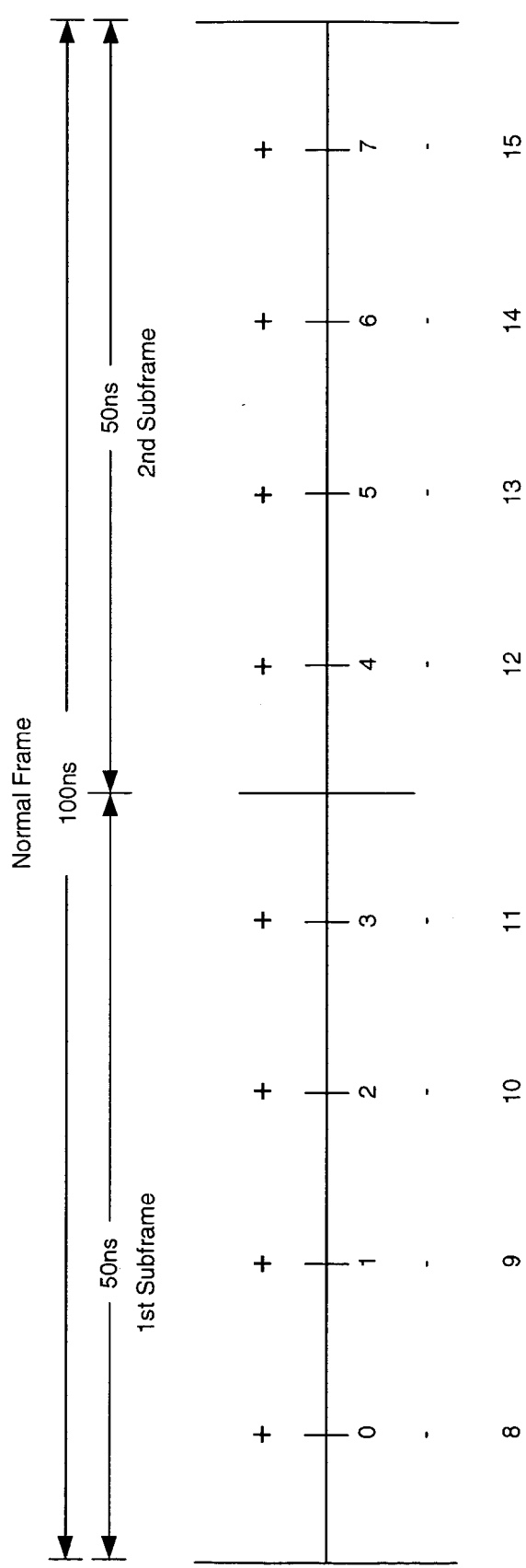
FIG. 26 illustrates an exemplary frame, which is useful for showing how multiple states can be represented according to various embodiments of the present invention.

Referring now to FIG. 26, a 100 ns frame is shown split into two (2) 50 ns subframes. Each of the subframes includes four (4) possible positions. More specifically, the 1st subframe includes P0, P1, P2 and P3. The 2nd subframe includes P4, P5, P6 and P7. According to an embodiment of the present invention, each correlator (e.g., 726a, 726b, 726c and 726d) of receiver 2402 is used to sample two (2) possible positions during each fame (e.g., each 100 ns frame). This is accomplished by causing each correlator to sample one position during each subframe (e.g., each 50 ns subframe). For example, a first correlator (e.g., 726a) can sample P0 during the 1st subframe, and then sample P4 during the 2nd subframe. A second correlator (e.g., 726b) can sample P1 during the 1st subframe, and then sample P5 during the 2nd subframe. A third correlator (e.g., 726c) can sample P2 during the 1st subframe, and then sample P6 during the 2nd subframe. A fourth correlator (e.g., 726d) can sample P3 during the 1st subframe, and then sample P7 during the 2nd subframe. In this manner, the length of the short codes can be increased without increasing the required number of correlators in receiver 2402. In such an embodiment, there would be eight ramp builders, and the multiplexors would send samples to the ramp builders in accordance with the modulo-8 short acquisition code.

In another example, a modulo-16 short acquisition code is used, and an impulse can be located in one of sixteen possible positions within each frame of a header. Accordingly, sixteen correlators can be used to sample the sixteen possible positions of an impulse within each frame. Alternatively, only four correlators are used to sample the sixteen possible positions, in accordance with an embodiment of the present invention that shall now be explained with reference to FIGS. 26 and 27.

Referring first to FIG. 26, shown above each of the eight positions (P0, P1, P2, P3, P4, P5, P6, P7) is a "+" and shown below each position is a "−". This is meant to represent, that at each position, an impulse can be a positive impulse or a negative (i.e., a flipped or inverted) impulse. Thus, with eight different positions, and two states at each position, a total of sixteen different states can be detected. Of course, the transmitting impulse radio must be able to generate positive and negative impulses. This has been described in the commonly owned, co-pending U.S. patent application Ser. No. 09/537,692, filed Mar. 29, 2000, entitled, "Apparatus, System and Method for Flip Modulation in an Impulse Radio Communication System," which has been incorporated by reference above.

Still referring FIG. 26, each of the subframes includes four (4) possible positions, wherein an impulse at each position can have two states (such as "flipped" and "unflipped", for example). Thus, it is now more appropriate to refer to states, rather than simply positions. For example, the 1st subframe can include impulses representing states P0, P1, P2, P3, P8, P9, P10 and P11. The 2nd subframe can include impulses representing states P4, P5, P6, P7, P12, P13, P14 and P15. According to an embodiment of the present invention, each correlator (e.g., 726a, 726b, 726c and 726d) of receiver 2402 is used to sample two (2) possible positions during each fame (e.g., each 100 ns frame). Each sample is provided to each of sixteen multiplexers. Each sample is also inverted and then provided to each of the sixteen multiplexers. In this manner, the length of the short codes can be further increased without increasing the required number of correlators in a receiver. In such an embodiment, there would be sixteen ramp builders, and the multiplexors would provide samples to the ramp builders in accordance with the modulo-16 short acquisition code. This is explained in more detail with reference to FIG. 27.

Figure 27:
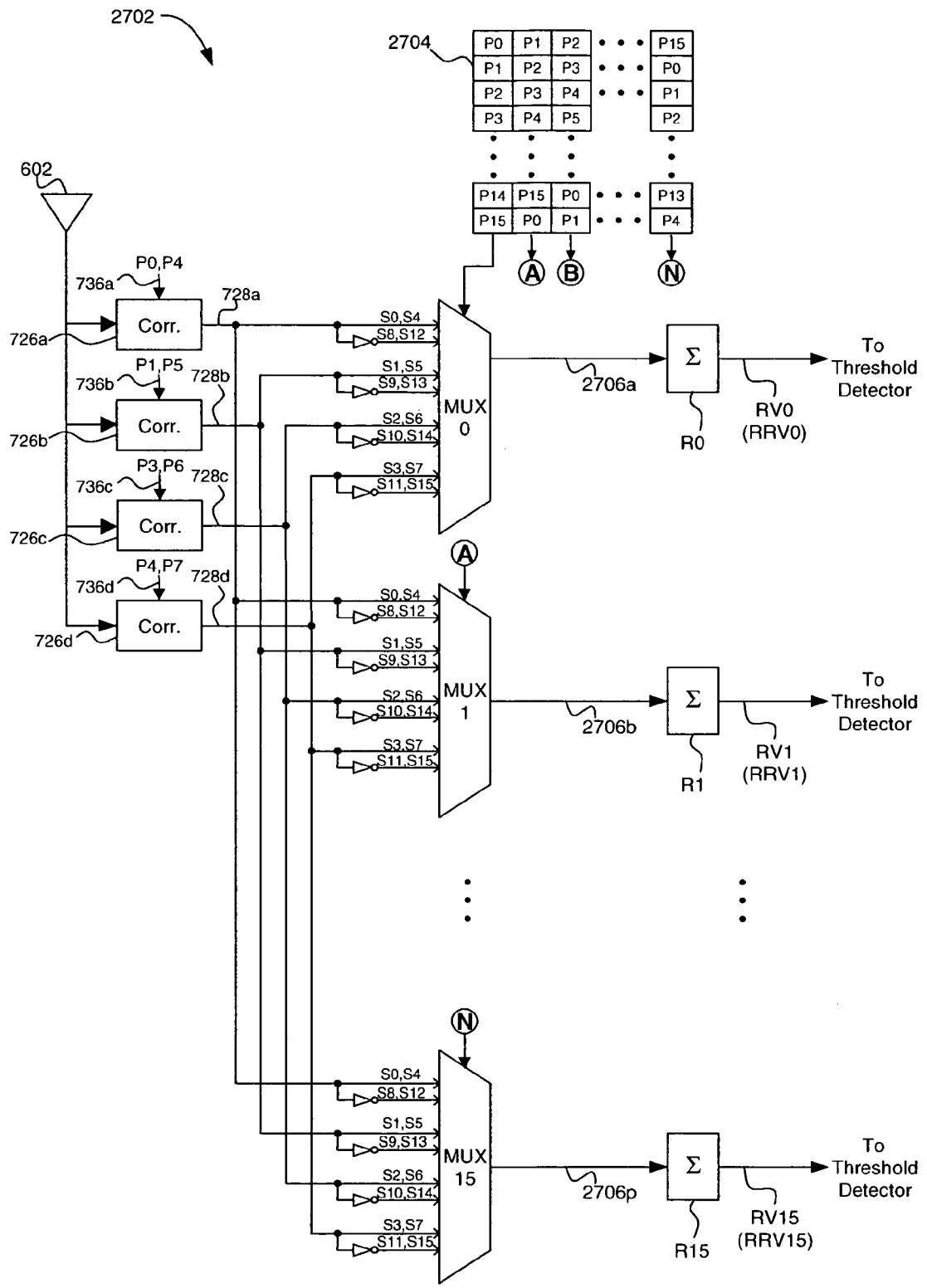
FIG. 27 shows an exemplary portion of an impulse radio receiver according to an embodiment of the present invention.

Referring now to FIG. 27, exemplary receiver 2702 includes four sampling correlators 726a, 726b, 726c, 726d. During first stage acquisition: correlator 726a samples a zeroth impulse position P0 and a fourth impulse position P4 in accordance with a sampling control signal 736a; correlator 726b samples a first impulse position P1 and a fifth impulse position P5 in accordance with a sampling control signal 736b; correlator 726c samples a second impulse position P2 and a sixth impulse position P6 in accordance with a sampling control signal 736c; and correlator 726d samples a third impulse position P3 and a seventh impulse position P7 in accordance with a sampling control signal 736d.

A resulting Sample/Hold (S/H) signal 728a (also referred to as S0, S4), representing correlation results from correlator 726a, is provided to sixteen multiplexers (Mux0, Mux1 . . . Mux15). Signal 728a is also inverted (the inverted signal is also referred to as S8, S12) and provided to the sixteen multiplexers.

Similarly, resulting Sample/Hold (S/H) signal 728b (also referred to as S1, S5), representing correlation results from correlator 726b, is provided to the sixteen multiplexers (Mux0, Mux1 . . . Mux15). Signal 728b is also inverted (the inverted signal is also referred to as S9, S13) and provided to the sixteen multiplexers.

Resulting Sample/Hold (S/H) signal 728c (also referred to as S2, 26), representing correlation results from correlator 726c, is provided to the sixteen multiplexers (Mux0, Mux1 . . . Mux15). Signal 728c is also inverted (the inverted signal is also referred to as S10, S14) and provided to the sixteen multiplexers.

Resulting Sample/Hold (S/H) signal 728d (also referred to as S3), representing correlation results from correlator 726d, is provided to the sixteen multiplexers (Mux0, Mux1 . . . Mux15). Signal 728d is also inverted (the inverted signal is also referred to as S11, S15) and provided to the sixteen multiplexers.

In accordance with specific embodiments of the present invention discussed above, correlators 726a, 726b, 726c and 726d sample each of the possible impulse positions during a frame period (eight possible positions in this example) in an attempt to sample impulses of repeating short acquisition codes of a packet header. The outputs S0, S1, S2, S3, S4, S5, S6 and S7 of the correlators are provided to sixteen multiplexers Mux0-Mux15. The outputs S0, S1, S2, S3, S4, S5, S6 and S7 are also inverted to produce outputs S8, S9, S10, S11, S12, S13, S14 and S15, which are also provided to the sixteen multiplexers Mux0 through Mux15.

During first stage acquisition, each multiplexer selects one of the outputs S0-S15 in accordance with the short acquisition code (e.g., P0, P1, P2, P3, P4, P5, P6, P7, P8, P9, P10, P11, P12, P13, P14, P15) and a specific code offset. For example: Mux0 selects one of outputs S0-S15 in accordance with the short acquisition code and a zero code offset (CO0), represented by the first column of table 2704; Mux1 selects one of outputs S0-S15 in accordance with the short acquisition code and a code offset=1 (CO1), represented by the second column of table 2404; and so on.

Mux0 outputs a signal 2706a, which includes a plurality of samples corresponding to the code offset CO0 and a frame offset (FO). These samples corresponding to the code offset CO0 and the frame offset (FO) (i.e., signal 2406a) are provided to a ramp builder R0 (also referred to as an accumulator R0), which accumulates N samples (where N is the integration length), and outputs a ramp value RV0. Mux1 outputs a signal 2706b, which includes a plurality of samples corresponding to the code offset CO1 and the same frame offset (FO). These samples corresponding to the code offset CO1 and the frame offset (FO) (i.e., signal 2406b) are provided to a ramp builder R1 (also referred to as an accumulator R1), which accumulates N samples (where N is the integration length), and outputs a ramp value RV1. The remaining multiplexers operate in a similar fashion such that each of sixteen ramp builders R0-R15 generates a corresponding ramp value RV0-RV15. These ramp values are provided to a threshold detector, and receiver 2702 operates in a similar manner to receiver 2402, discussed above in connection with FIG. 24. The major difference between the operation of receiver 2702 and receiver 2402 is that receiver 2702 is capable of detecting sixteen different states per frame during acquisition, where the simpler receiver 2402 detects four different states per frame during acquisition.

Figure 28:
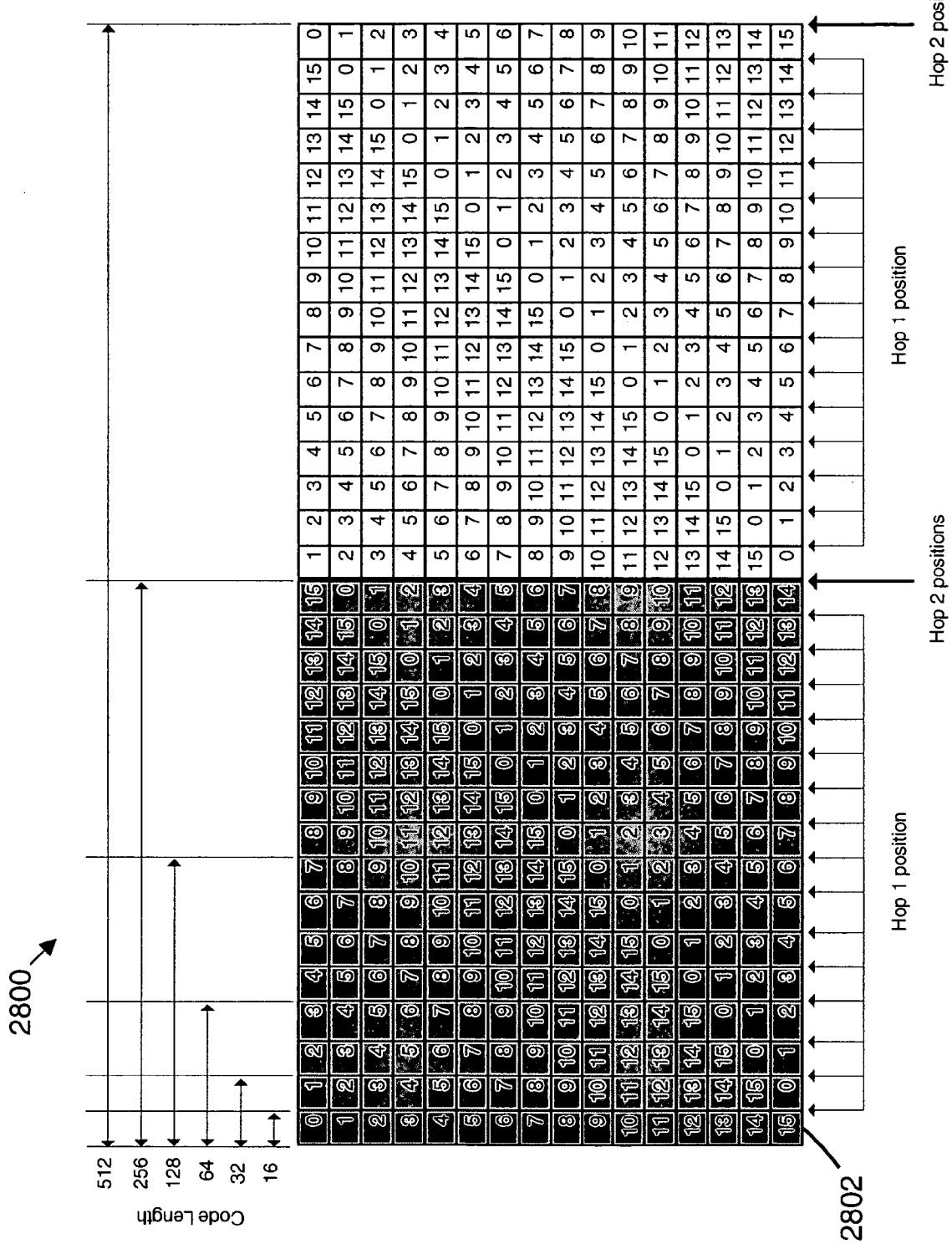
FIG. 28 illustrates a table that is useful for showing how ratchet codes can be generated based on a length sixteen (16) short acquisition code, according to an embodiment of the present invention.

If the integration length N is greater than the number of ramp builders (16 in this example), then ratchet codes are used to resolve ambiguities relating to the end of the packet header (which is the same as the beginning of the data payload). FIG. 23, discussed above, was used to illustrate how ratchet codes can be generated based on a length 4 short acquisition code. FIG. 28 illustrates how ratchet codes can be generated based on a length 16 short acquisition code. The left most column 2802 of table 2800 represents a short acquisition code stored, for example, in an acquisition root register of an impulse radio transceiver. The additional columns show how longer ratchet codes can be derived by "hopping" or "skipping" positions of the short acquisition code. These additional columns need not be stored in the impulse radio receiver. Rather, an acquisition sequence generator of the impulse radio receiver can generate the portion of a code, shown in the additional columns, based on the short acquisition code stored in the register (i.e., column 2802), in the same manner explained above in connection with FIG. 23. During first stage acquisition, an acquisition sequence generator of the impulse radio transceiver can simply cycle through the short acquisition code (e.g., stored in the acquisition root register, and shown at the left most column 2802 of table 2800) from top to bottom going through the length 16 code. To generate longer codes (e.g., ratchet codes) based on the modulo-16 short acquisition code, the logic (e.g., of the acquisition sequence generator) goes through the left column once but instead of staring over at 0 (i.e., the zeroth code position) after the end of the first column, the logic "hops" or "skips" one code position. This causes the sequence to hop over code position 0 and start at code position 1. The second column from the left shows the sequence after one hop. Thus, if the short code is P0, P1, P2, P3 ... P15 (as shown in the left most column 2802), then a length 256 ratchet code can be generated as shown in the first sixteen columns of table 2800.

Codes up to length 256 can be generated using a length 16 short code and single hops. For codes longer than 256, two hops are required to break up the sequence. For example, to generate a length 512 code, the logic starts at the upper left corner of table 2300, and single hops at the end of each column until the end of the sixteenth column. At that point, two positions are hopped to produce the seventeenth column. Then one position is hopped to produce the eighteenth through thirty first columns. For example, a length 512 ratchet code can obtained using all thirty columns shown in table 2800. To generate even longer codes double hops are performed at each length 256 code boundary. When discussing possible states within a frame (wherein a state relates to where an impulse is located in a frame, and whether it is flipped or not flipped, e.g., due to a code), the nomenclature Pn (e.g., P0, P1, P2, P3 ... P15) has been used to represent the different possible (e.g., 16) states. It is noted, however, that state P0, need not be associated with a position that is earlier in a frame (i.e., closer to the beginning frame boundary) than states P1, P2 ... P15. Rather, references to states P0, P1, P2 ... P15 simply refer to sixteen different possible states within a frame.

To summarize the above discussion, 16 states can be sampled using four correlators of a receiver. The receiver samples 8 pulse positions in a frame by firing each of the four correlators twice per frame. Each pulse may or may not be flipped. The receiver acquisition hardware inverts these eight samples and routes both the inverted and non-inverted samples (e.g., using multiplexors) to 16 ramp builders. Thus, four correlators can be used to acquire a packet including modulo-16 short acquisition code sequences in the header, in accordance with the above discussed embodiment of the present invention. More generally, X correlators can be used to acquire a packet including a modulo-(X·4) short acquisition code sequences in the header. One of ordinary skill n the art will appreciate how the above description enables embodiments where different numbers of correlators are used, different code lengths are used, and the like.

5. IJ or IQ Correlator Pairs and Ramp Builder Pairs

As discussed above in connection with FIGS. 9, 10A, 10B and 10C, some impulse radios include correlator pairs to produce In-phase (I) and Quadrature (Q) sample pairs (or more generally, I-J sample pairs). As explained above, in such embodiments, a Q or J sample is produced at a time slightly delayed from each I sample using a correlator pair. Such correlator pairs can be used in the present invention, as shall be explained below with reference to FIG. 30.

Figure 30:
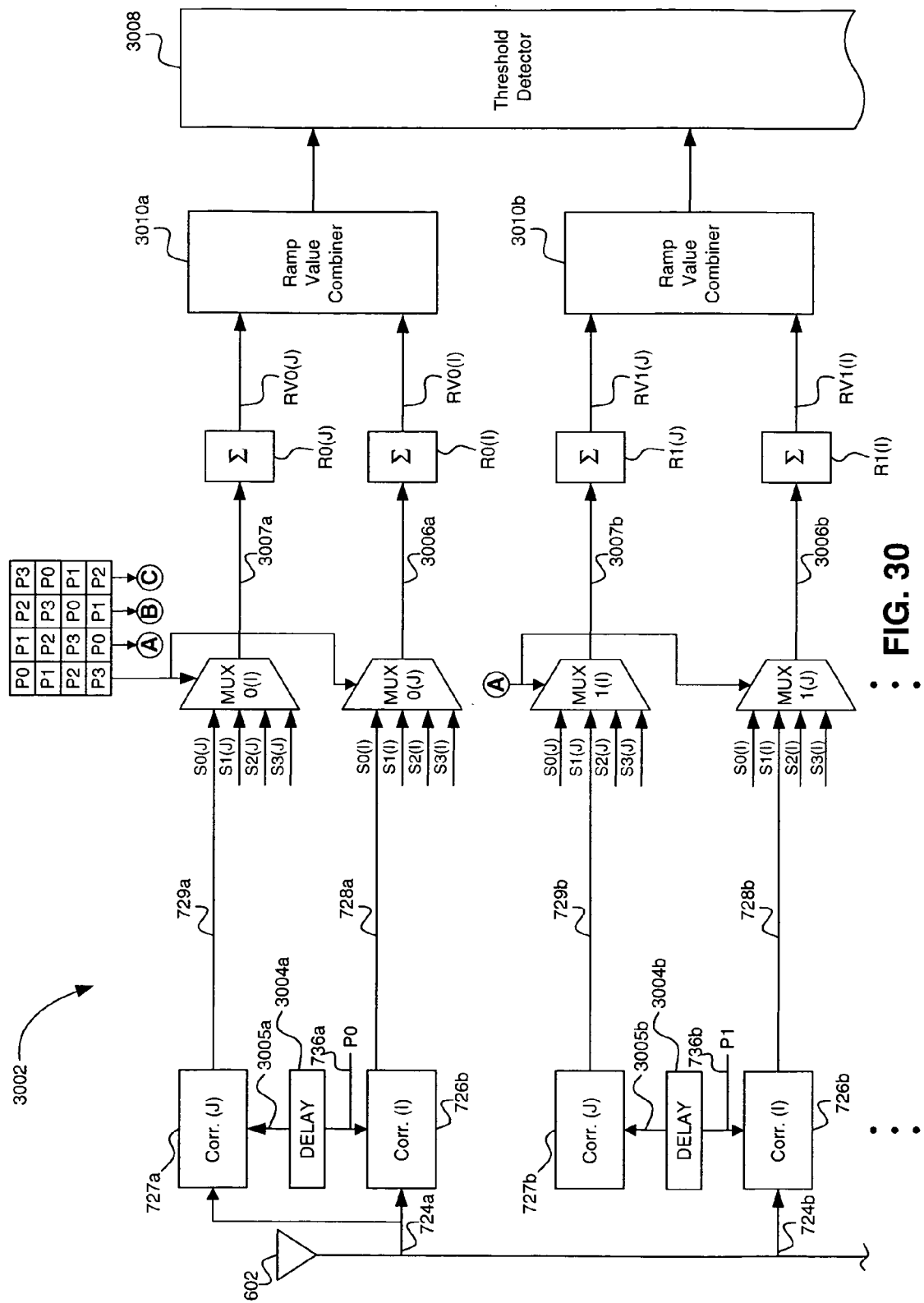
FIG. 30 shows an exemplary portion of an impulse radio receiver according to an embodiment of the present invention.

Referring to FIG. 30, the portion of exemplary receiver 3002 shown includes I (In-phase) sampling correlators 726*a*, 726*b*, etc., and corresponding J or Q sampling correlators 727*a*, 727*b*, etc. During first stage acquisition: I correlator 726*a* samples a zeroth impulse position P0 (within a sample frame) in accordance with sampling control signal 736*a*, and J or Q correlator 727*a* samples in accordance with a delayed sampling control signal 3005*a* produced by delay 3004*a*; I correlator 726*b* samples a first impulse position P1 in accordance with sampling control signal 736*b*, and J or Q correlator 727*b* samples in accordance with a delayed sampling control signal 3005*b* produced by delay 3004*b*. Not shown, additional correlator pairs sample a third impulse position P3 (and at a delayed offset) and a fourth impulse position P4 (and at a delayed offset).

A resulting Sample/Hold (S/H) signal 728*a* (also referred to as S0(I)), representing correlation results from correlator 726*a*, is provided to four multiplexers (Mux0(I), Mux1(I), Mux2(I) and Mux4(I)). S/H signal 729*a* (also referred to as S0(J)), representing the results from correlator 727*a*, is provided to four multiplexers (Mux0(J), Mux1(J), Mux2(J) and Mux4(J)). Mux2(I), Mux3(I), Mux2(J) and Mux3(J) are not explicitly shown in FIG. 30.

Similarly, a resulting Sample/Hold (S/H) signal 728*b* (also referred to as S1(I)), representing correlation results from correlator 726*b*, is provided to four multiplexers (Mux0(I), Mux1(I), Mux2(I) and Mux4(I)). S/H signal 729*b* (also referred to as S1(J)), representing the results from correlator 727*b*, is provided to four multiplexers (Mux0(J), Mux1(J), Mux2(J) and Mux4(J)).

A resulting Sample/Hold (S/H) signal 728*c* (also referred to as S2(I)), representing correlation results from correlator 726*c*, is provided to four multiplexers (Mux0(I), Mux1(I), Mux2(I) and Mux4(I)). S/H signal 729*c* (also referred to as S2(J)), representing the results from correlator 727*c*, is provided to four multiplexers (Mux0(J), Mux1(J), Mux2(J) and Mux4(J)). Correlators 726*c* and 727*c* are not explicitly shown in FIG. 30.

A resulting Sample/Hold (S/H) signal 728*d* (also referred to as S3(I)), representing correlation results from correlator 726*d*, is provided to four multiplexers (Mux0(I), Mux1(I), Mux2(I) and Mux4(I)). S/H signal 729*d* (also referred to as S3(J)), representing the results from correlator 727*d*, is provided to four multiplexers (Mux0(J), Mux 1(J), Mux2(J) and Mux4(J)). Correlators 726*d* and 727*d* are not explicitly shown in FIG. 30.

In accordance with specific embodiments of the present invention discussed above, correlators 726a, 726b, 726c and 726d sample each of the possible impulse positions during a frame period (four possible positions in this example) in an attempt to sample impulses of repeating short acquisition codes of a packet header. The outputs S0(I), S1(I), S2(I) and S3(I) of the correlators are provided to four multiplexers Mux0(I)-Mux3(I). Correlators 727a, 727b, 727c and 727d sample at times slightly delayed (e.g., 0.125 nsec) from the sample times of correlators 726a, 726b, 726c and 726d, respectively. The outputs S0(J), S1(J), S2(J) and S3(J) of the correlators are provided to four multiplexers Mux0(J)-Mux3 (J).

During first stage acquisition, each multiplexer Mux0(I)-Mux3(I) selects one of the outputs S0(I)-S3(I) in accordance with the short acquisition code (e.g., P0, P1, P2, P3) and a specific code offset. Similarly, each multiplexer Mux0(J)-Mux3(J) selects one of outputs S0(J)-S3(J) in accordance with the short acquisition code (e.g., P0, P1, P2, P3) and a specific code offset.

Mux0(I) outputs a signal 3006a, which includes a plurality of samples corresponding to the code offset CO0 and a frame offset (FO). These samples corresponding to the code offset CO0 and the frame offset (FO) (i.e., signal 3006a) are provided to a ramp builder R0(I) (also referred to as an accumulator R0(I)), which accumulates N samples (where N is the integration length), and outputs a ramp value RV0(I). Mux0(J) outputs a signal 3007a, which includes a plurality of samples corresponding to the code offset CO0 and the frame offset (FO). These samples corresponding to the code offset CO0 and the frame offset (FO) (i.e., signal 3007a) are provided to a ramp builder R0(J) (also referred to as an accumulator R0(J)), which accumulates N samples (where N is the integration length), and outputs a ramp value RV0(J). Ramp values RV0(I) and RV0(J) are provided to a ramp value combiner 3010a, which combines RV0(I) and RV0(J) to produce a single ramp value RV0 to be used by threshold detector 3008. According to one embodiment of the present invention, RV0 is the square root of the sum of the squares of ramp values RV0(I) and RV0(J). According to another embodiment, RV0 is the sum of the absolute values of ramp values RV0(I) and RV0(J). One or ordinary skill in the art will appreciate that ramp values RV0(I) and RV0(J) can be combined in other manners while still being within the scope of the present invention. In still another embodiment, the largest ramp value of the ramp value pair (e.g., RV0(I)/RV0(J)) is selected as the ramp value (e.g., RV0) that is provided to threshold detector 3008. A benefit of this embodiment is that the chance of a I/J correlator pair (e.g., 726a/727a) sampling a zero crossing of a received impulse (and thus not detecting the impulse) is significantly reduced as compared to a single correlator (e.g., 726a) sampling for an impulse.

The remaining correlator pairs (i.e., 726b/727b, 726c/727c, 726d/727d), multiplexor pairs, and ramp builder pairs operate in a similar fashion to produce combined ramp values (i.e., RV1, RV2 and RV3). Threshold detector 3008 can determine whether the first stage threshold is satisfied, based on the combined ramp values RV0, RV1, RV2 and RV3, as described in detail above.

During second stage acquisition, receiver 3002 operates in a similar manner as receiver 2402, except ratchet ramp value pairs (e.g., RRV0(I)/RRV0(J)) are produced, and then combined to produce a single ratchet ramp value (e.g., RRV0).

The correlator pairs are extremely useful during demodulation of the data payload because they enable detection of many different types of modulated signals, for example, as is described in U.S. patent application Ser. No. 09/538,519, entitled "Vector Modulation System and Method for Wideband Impulse Radio Communications," and U.S. patent application Ser. No. 09/537,692, filed Mar. 29, 2000, entitled, "Apparatus, System and Method for Flip Modulation in an Impulse Radio Communication System," both of which have been incorporated by reference above.

Analog to digital converters (e.g., A/Ds 772a-d and 773a-d) are not explicitly shown in FIG. 30. However, it is likely that A/Ds are placed at the output of each correlator, so that the inputs to the multiplexers are digital signals. Alternatively, such A/Ds can be placed between the multiplexers and the ramp builders, or between the ramp builders and ramp value combiners.

N. Radio Command Channel

In an embodiment of the present invention, the packet protocol, which is known by impulse radios in communications with one another, also defines the data integration length (i.e., the number of samples of a received signal that are accumulated to make a symbol decision regarding a symbol in the data payload).

In an alternative embodiment of the present invention, a command channel between an impulse radio transmitter and an impulse radio receiver can be established. More specifically, a predetermined number of command frames are included between the acquisition delimeter and the data payload. Thus, in this embodiment, the delimiter refers to one or more frames in a packet that is used to indicate the end of the header and the beginning of the command frames. Such command frames include radio commands bits. For example, in one embodiment, the command frames include 8 bits to produce a command byte. The command bits (or bytes) can be used to provide control information, such as data integration length, modulation type, and the like. Thus, the data integration length need not be predetermined by the packet protocol. Rather, in this embodiment of the present invention, the packet protocol can specify specific frames (or bits) that define the data integration length associated with the data payload. This would enable impulse radios to adjust (on the fly) the data integration length such that an acceptable signal to noise ratio (or bit error rate, or the like) is achieved, while still trying to maximize the data throughput.

O. Jittering Impulse Positions

Typically, a relatively long PN code (e.g., code length 512 or greater) is used to break down frequency spectrum comb line structures and spread the impulse energy more uniformly across frequencies. Thus, the use of relatively short (e.g., length 16 or 32) repeating short acquisition code sequences may cause some unwanted frequency spectrum comb lines. Accordingly, an embodiment of the present invention has been developed to spread energy in the frequency domain when short acquisition code sequences of the present invention are transmitted.

Figure 29:
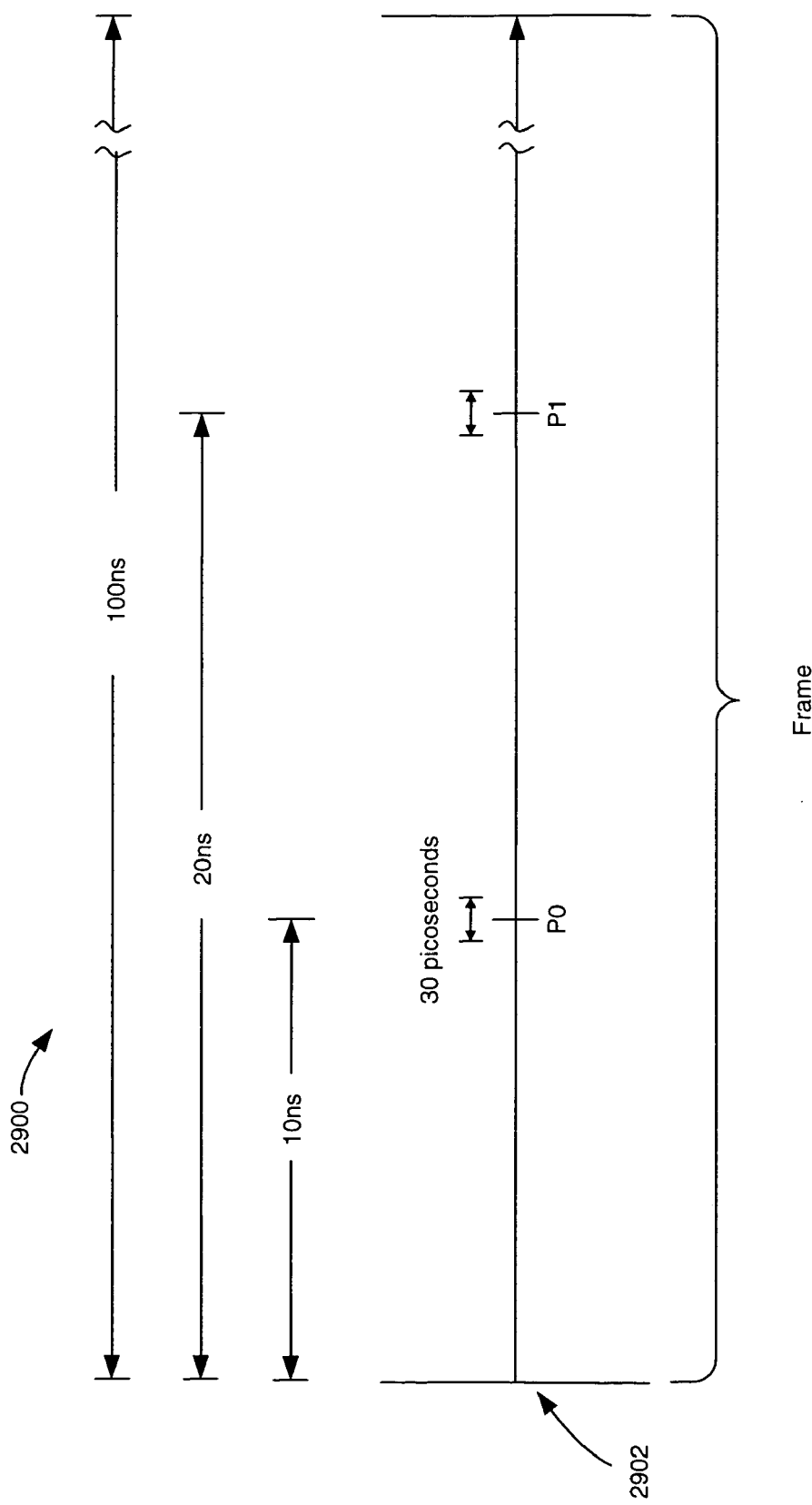
FIG. 29 illustrates a portion of a frame, which is useful for showing how impulses are deliberately jittering in an embodiment of the present invention.

According to this embodiment of the present invention, each of the possible impulse positions is purposely jittered by an impulse radio transmitter. For example, assume a frame width is 100 ns, and 8 possible impulse positions exist within the frame during first stage acquisition. Each of the 8 different positions is likely to be about 10 ns apart from the closest other possible positions. For example, referring to FIG. 29, assume that a zeroth possible position (P0) of a frame 2900 is 10 ns from the beginning frame boundary 2902, and the first possible position (P1) is 20 ns from the beginning frame boundary 2902. According to this embodiment of the present invention, each of these possible positions is purposely jittered approximately 30-40 picoseconds, to help spread impulse energy in the frequency domain.

This deliberate jitter can be accomplished in many ways. For example, referring back to FIG. 7, a delay line and a random delay generator (e.g., that together produce a random delay between 30 and 40 picoseconds) can be placed between PTG 740 and pulser 608. Alternatively, PTG 740 can be adapted to produce the purposeful or deliberate jitter. One of ordinary skill in the art will appreciate that such deliberate jitter can be accomplished in many other ways while still being within the scope of the present invention. It is noted that an impulse radio will normally generate about 3-10 picoseconds of jitter without trying.

Such jitter (e.g., 30-40 ps) can effectively spread energy in the frequency domain, while still allowing an impulse radio receiver to achieve first stage acquisition. That is, even though an impulse radio receiver does not have knowledge of a random jitter pattern, the jitter is sufficiently small that the correlators of the receiver will still sample energy of receive impulses (e.g., because the width of each impulse is approximately 500 ps).

P. Acquisition Time

The present invention enables fast and efficient acquisition of a signal. The following is an exemplary comparison of acquisition using the present invention as compared to a typical conventional system.

In this example, assume the following are used with the present invention:

short acquisition code length=16;
ramp builders available=8;
integration length=256;
search step size=3 nsec; and
frame size=100 nsec.

Using the present invention, the time required for complete signal acquisition=first stage acquisition time+tracking time+second stage acquisition time. Each of these are explained separately below.

1. First Stage Acquisition Time

First stage acquisition time=(ramp time)·round up (frame length/step size)·(code length/ramp builders avail.)=(100 nsec·256)·round up (100 nsec/3 nsec)·(16/8)=25,600 nsec·34·2=1,740,800 nsec=1,740.8 microsec.

2. Tracking Time

Tracking time=(# of ramps budgeted for tracking)·(ramp time). Assume that approximately 25 ramp times (i.e., full ramp integrations) are budgeted for tracking. Thus, tracking time=25(100 nsec·256)=640,000 nsec=640 microsec.

3. Second Stage Acquisition Time

Second stage acquisition time=(number of integrations)·(ramp time). The number of integrations, and thus second stage acquisition time, is dependent on the number of bits of ambiguity that must be resolved during second stage acquisition.

In this example, the total number of bits of ambiguity that must be resolved during signal acquisition (first and second stage together)=log 2(integration length)=log 2(256)=8 bits. The number of bits of ambiguity resolved during first stage acquisition=log 2(short acquisition code length)=log 2(16)= 4. Thus, the number of bits of ambiguity that must be resolved during second stage acquisition is equal to the number of bits that were not resolved during first stage acquisition=log 2(integration length)−log 2(short acquisition code length)= 8−4=4 bits that must be resolved during second stage acquisition.

The number of unique ratchet codes required to resolve the 4 bits of ambiguity that must be resolved during second stage acquisition=

(rounded up to next integer)

$$\left\{ \frac{\log_2(\text{int.\_length}) - \log_2(\text{short\_aqu.\_code\_length})}{\log_2(\text{\#\_of\_available\_ramp\_builders})} \right\}.$$

The numerator of the above equation is equal to the number of bits that must be resolved during second stage acquisition. The denominator is log 2 of the number of ramp builders available (i.e., used) for signal acquisition during first stage acquisition, and during second stage acquisition (this does not include any back ramp builders). Thus, in this example, the number of unique ratchet codes=rounded up{4/log 2(8)}=rounded up {4/3}=2 unique ratchet codes. The number of integrations required during second stage acquisition is thus 2 integrations for the first (shorter) unique ratchet code, and one integration for the second (longer) unique ratchet code, equaling a total of 3 integrations.

Thus, the second stage acquisition time=(ramp time)·(number of integrations)=(256·100 nsec)·(3)=25,600 nsec·3=76,800 nsec=76.8 microsec.

4. Time Required for Complete Acquisition

As mentioned above, time required for complete signal acquisition=first stage acquisition time+tracking time+second stage acquistion time=1,740.8 microsec+640 microsec+ 76.8 microsec=2457.6 microsec=2,500 microsec≈2.5 millisec for complete acquisition in this example. This shall now be compared to acquisition using a typical conventional system. If tracking is performed in parallel with second stage acquisition, the complete acquisition time can be further reduced.

5. Time Required in a Typical Conventional System

Assuming a conventional system typically includes one (1) integrator for use during acquisition (as opposed to 8 parallel ramp builders as in the present invention), the time required for conventional signal acquisition=(integration time)·rounded up (frame size/step size)·(length of code used for signal acquisition).

During signal acquisition, a convention system uses a much longer code length than the short acquisition code lengths used in the present invention. For this example a conservative conventional code length 512 is assumed (however, longer conventional code lengths are typically used).

Also assuming, as was the case above:
integration length=256;
search step size=3 nsec; and
frame size=100 nsec.

The time required for conventional signal acquisition=(integration time)·rounded up (frame size/step size)·(code length)=(256·100 nsec)·(100 nsec/3 nsec)·(512)=(25,600 nsec)·(34)·512=445,644,800 nsec=445,644.8 microsec≈445, 600 microsec≈445.6 millisec.

6. Comparison

A reduction in acquisition time from 445.6 millisec (conventional) to 2.5 millisec (present invention) is extremely significant. The significant time reduction is due to the use of the short acquisition codes, the ratchet codes, and the parallel ramp builders, all of the present invention. Of course, the exact acquisition time is dependent on the above stated starting assumptions. Also, the above calculations are for worst case scenarios. For example, in the present invention it may not be necessary to step through an entire 100 nsec frame, 3 nsec at a time, 34 different times. Rather, first stage acquisition may be accomplished much earlier. One of ordinary skill in the art will appreciate that even if the above assumptions are varied, the present invention will still provide extremely significant reductions in acquisition time.

Q. Hardware and Software Implementations

Figure 31:
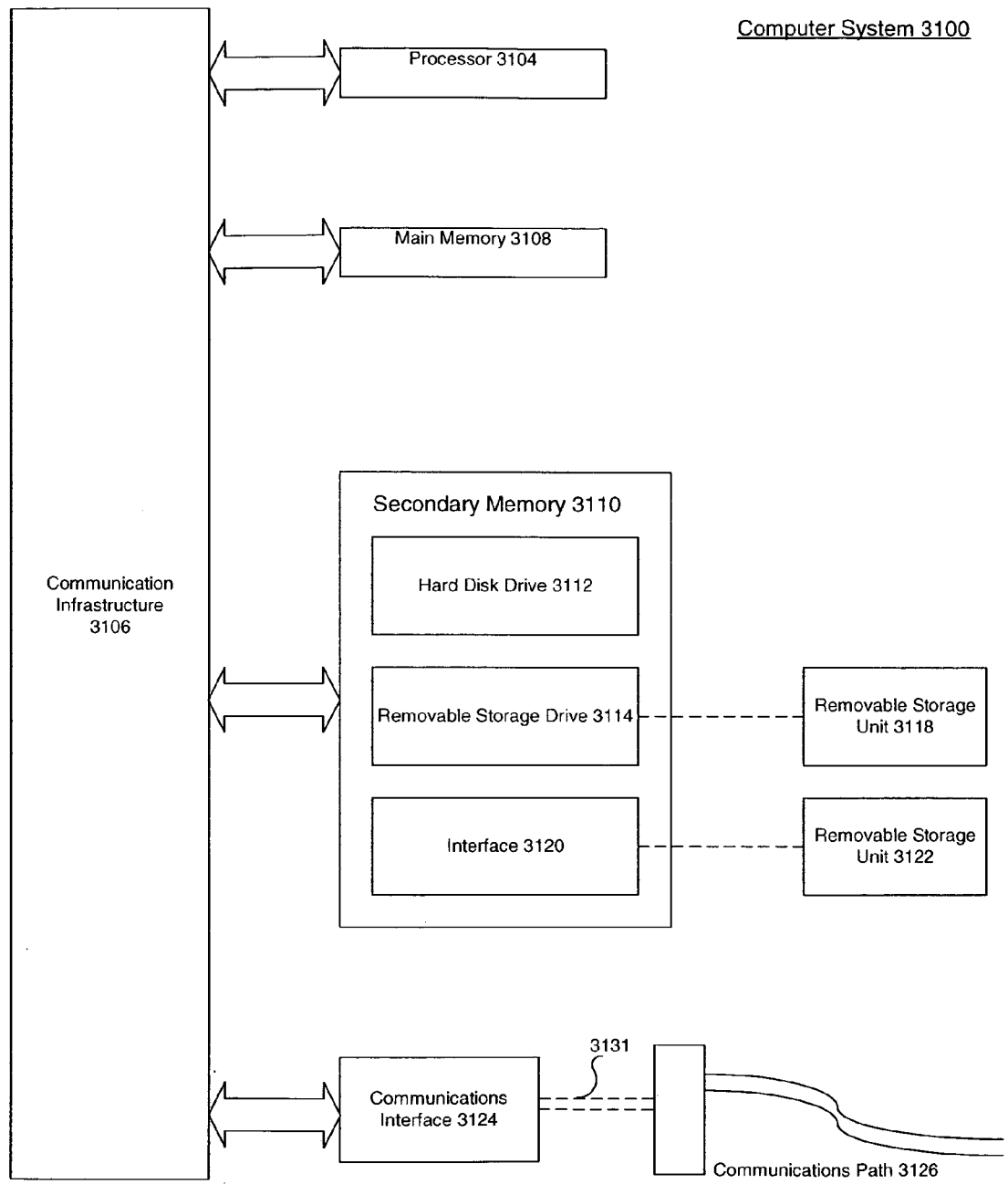
FIG. 31 is an example computer system environment in which the present invention can operate.

Specific features of the present invention are performed using controllers. For example, control subsystem 612 (including baseband processor 620 and system controller 622) can be implemented as controllers. These controllers in effect comprise computer systems or portions of computer systems (e.g., within an impulse radio). Therefore, the following description of a general purpose computer system is provided for completeness. The present invention can be implemented in hardware, or as a combination of software and hardware. Consequently, the invention may be implemented in the environment of a computer system or other processing system (e.g., within an impulse radio). An example of such a computer system 3100 is shown in FIG. 31. In the present invention, all of the received signal processing functions occurring after received RF signals are down-converted to digitized baseband, can execute on one or more distinct computer systems 3100. The computer system 3100 includes one or more processors, such as processor 3104. The processor 3104 is connected to a communication infrastructure 3106 (for example, a bus or network). Various software implementations are described in terms of this exemplary computer system. After reading this description, it will become apparent to a person skilled in the relevant art how to implement the invention using other computer systems and/or computer architectures.

Computer system 3100 also includes a main memory 3108, preferably random access memory (RAM), and may also include a secondary memory 3110. The secondary memory 3110 may include, for example, a hard disk drive 3112 and/or a removable storage drive 3114, representing a floppy disk drive, a magnetic tape drive, an optical disk drive, etc. The removable storage drive 3114 reads from and/or writes to a removable storage unit 3118 in a well known manner. Removable storage unit 3118, represents a floppy disk, magnetic tape, optical disk, etc. which is read by and written to by removable storage drive 3114. As will be appreciated, the removable storage unit 3118 includes a computer usable storage medium having stored therein computer software and/or data.

In alternative implementations, secondary memory 3110 may include other similar means for allowing computer programs or other instructions to be loaded into computer system 3100. Such means may include, for example, a removable storage unit 3122 and an interface 3120. Examples of such means may include a program cartridge and cartridge interface (such as that found in video game devices), a removable memory chip (such as an EPROM, or PROM) and associated socket, and other removable storage units 3122 and interfaces 3120 which allow software and data to be transferred from the removable storage unit 3122 to computer system 3100.

Computer system 3100 may also include a communications interface 3124. Communications interface 3124 allows software and data to be transferred between computer system 3100 and external devices. Examples of communications interface 3124 may include a modem, a network interface (such as an Ethernet card), a communications port, a PCM-CIA slot and card, etc. Software and data transferred via communications interface 3124 are in the form of signals 3128 which may be electronic, electromagnetic, optical or other signals capable of being received by communications interface 3124. These signals 3128 are provided to communications interface 3124 via a communications path 3126. Communications path 3126 carries signals 3128 and may be implemented using wire or cable, fiber optics, a phone line, a cellular phone link, an RF link and other communications channels.

In this document, the terms "computer program medium" and "computer usable medium" are used to generally refer to media such as removable storage drive 3114, a hard disk installed in hard disk drive 3112, and signals 3128. These computer program products are means for providing software to computer system 3100.

Computer programs (also called computer control logic) are stored in main memory 3108 and/or secondary memory 3110. Computer programs may also be received via communications interface 3124. Such computer programs, when executed, enable the computer system 3100 to implement the present invention as discussed herein. In particular, the computer programs, when executed, enable the processor 3104 to implement the processes of the present invention, such as methods 1500 (including the steps explained in connection with FIGS. 15, 16, 21 and 22), for example. Accordingly, such computer programs represent controllers of the computer system 3100. By way of example, in the preferred embodiments of the invention, the processes performed by processors/controllers 620 and 622 can be performed by computer control logic. Also, information necessary for implementation of such processes, such as interference signal predicted frequencies, and so on, are stored in memory 3108 and/or memories 3110 (corresponding to, for example, memory 766). Where the invention is implemented using software, the software may be stored in a computer program product and loaded into computer system 3100 using removable storage drive 3114, hard drive 3112 or communications interface 3124.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

R. Automatic Acquisition Threshold

One embodiment of the present invention includes an automatic acquisition threshold setting capability. Whereas the threshold may be set to a predefined value as already described in detail in this disclosure, further improvement in performance may be obtained by adjusting the threshold setting based on the signals being received or the environment. Such adjustment may result in faster acquisition time, more reliable acquisition, and/or a better likelihood of achieving an optimum lock point. If the threshold is too high, packets may be missed, requiring retransmission and slowing the data throughput. If the threshold is too low, the system may lock on a weak multipath reflection resulting in a high bit error rate (BER) or fragile lock, potentially requiring packet retransmission. Thus, establishing an optimum threshold is essential for best system performance.

The optimum threshold, however, is an elusive quantity. The optimum threshold value depends on the signal strength, the multipath environment, the interference, and potentially, on construction variations from system to system. Since the optimum threshold value depends on changing system and environment variables, it is difficult to establish a universal fixed value that is optimum for all conditions.

In one embodiment of the invention, the issue of the variability of the optimum threshold value is solved by adaptively varying the threshold value in response to system performance measurements.

One such performance measurement, which is available to a system or network with a known or approximately known packet transmission rate, is the packet loss rate, or the complement, the packet receive rate.

For example, in a network where a hub sends monitor packets at a regular interval and sends data traffic packets between monitor packets, the monitor packets may be used to establish thresholds so that when data arrives for a given client, the thresholds are already established and optimized. Thus, if monitor packets are sent once each millisecond, 1000 monitor packets will be sent each second and packet loss rate may be determined as the difference between the packets received and packets transmitted over an interval of time. For example, if 800 packets are received over one second, then the packet receive rate is 800 packets per second and the packet loss rate is 200 packets per second.

It is often beneficial to begin the threshold at a high level and lower the threshold into the peaks of the signals being received rather than starting at a low value and raising the threshold out of the noise. Beginning at a high level thus assures a greater probability of acquiring strong signals rather than weak reflections.

Thus, an exemplary process may begin by setting the threshold value at a value higher than nominal to favor high signal levels. Monitor packets are then received over an interval of time and the packet loss rate is determined. If less than, for example, 50% of the expected monitor packets are observed, the threshold may be lowered. If over the following interval more monitor packets are observed, the threshold may be lowered further. The process may be continued until, at some point, further lowering of the threshold may result in fewer packets being received. At such point that fewer packets are received, the threshold may be raised again. The threshold may then be alternately slightly raised and lowered from interval to interval in accordance with packets received (or lost) to maintain optimum performance.

When the threshold is first started at a high level, few, if any, packets may be received and the threshold may be lowered rapidly until the number of packets is close to the expected number, at which point the threshold may be adjusted at a slower rate. In one such embodiment, the adjustment size is proportional to the packet loss rate and in a direction in accordance with the change in packet loss rate from interval to interval. In another embodiment, the adjustment size is proportional to the square of the packet loss rate.

Tracking on packets received or packets lost requires that the system track the peak or valley respectively. That is, the error signal, packets lost, has no direction information by which to adjust the threshold. As described, direction information is derived by whether successive intervals improve performance. Alternatively, the number of packets lost may be stored as a function of threshold value and the peak or valley of the function estimated by curve fitting. The minimum of packets lost is thus the best value for the threshold. It may be beneficial to add a dither to the process to insure that values off center influence the result. Statistical estimation techniques such as Kalman or Bayesian filters may be used to estimate the peak or valley of the function. Other methods of tracking a peak may be employed as are known in the art.

When packets are being received, the threshold may also track the average amplitude of the maximum ramp being received. Thus, if the transmitter is moving or if the path is occluded by a moving object or person, the threshold will better track the variations in amplitude. In one such embodiment, the threshold value is the product of a term based on packet loss rate and a term based on maximum ramp average amplitude. In another embodiment, the threshold is the sum of a term of a term based on packet loss rate and a term based on maximum ramp average amplitude.

In one embodiment, each packet contains packet sequence information, such as a packet sequence number, that may be used to determine precisely the number of lost packets. Packet sequence information is particulary beneficial in systems where the packet rate is variable or unknown. For example, packets are observed for three intervals, the first interval includes packets up to sequence number 323, the second interval includes packets with sequence numbers: 324, 325, 327, 330, and 331 the third interval begins with a packet sequence number 332. Thus the missing packets are 326, 328, and 329—three of eight packets missing in the second interval. For this example, an eight packet interval is illustrated; however, typically a larger sample size is used to establish a more statistically stable average, especially for refining the threshold value. Initially the interval may be smaller to effect a faster initialization. Once signals are being acquired with nominal missing packets, the interval may be lengthened to improve the precision of the measurement of the missing packet fraction and thus improve the precision of the threshold setting. Alternatively, the threshold adjustment size may be lowered to, in effect, use the threshold value to average the intervals in an integrating control loop sense.

In an alternative embodiment, frame offset space is scanned to determine the maximum signal strength and thresholds are initially set below the maximum signal strength. Thresholds may then be further optimized based on performance criteria.

In a further alternative, frame offset space is scanned to determine a noise floor and a maximum signal strength wherein the threshold value is initially established at some value, for example half way, between the noise floor and the maximum signal strength. Thresholds may then be further optimized based on performance criteria.

In a further embodiment, thresholds may be optimized by a first transceiver and the optimization information sent to a second transceiver to aid in the reception of the first transceiver by the second transceiver. For example, on a network where a hub sends regular control packets that a client may use for optimizing reception, the client's optimization information may be useful to the hub in receiving data from the client. This is because the distance and multipath will be symmetrical between the hub and the client, potentially resulting in similar threshold optimization. The hub must first receive the client using a nominal threshold level. Upon receiving the client's thresholding information, the nominal threshold may be replaced by or modified by the clients threshold information. Subsequently, the hub may independently further optimize the threshold levels.

The threshold adjustment may be applied to any of the thresholds described in this application or to other architectures using one or more correlators or to time slot networks or other situations where the known transmission rate is available.

S. Software Gain Control

In one embodiment, the signal compared with the threshold is the maximum ramp value. Since the ramp value is proportional to signal strength, it is beneficial to adjust the threshold value relative to the ramp value. For the same reasons described earlier, if the threshold is above the ramp peak, the system will not acquire the ramp. Also, if the threshold is too low, the system may acquire on a weak reflection of the signal, resulting in poor performance. Thus it is desirable to adjust the threshold to an optimum point relative to the ramp maximum value.

Depending on the implementation details of the system, the threshold value or threshold comparison may be performed in digital hardware, software, or analog circuits or a combination.

In a further exemplary embodiment, the threshold value may remain fixed and the gain of a variable gain stage before the comparator may be varied. Varying the gain may be desirable for a number of reasons. The signal strength may vary over a wide dynamic range from the closest to the farthest distance to the transmitter. Accommodating such wide dynamic range may require an expensive and power hungry A/D converter for the digital radio and presents challenges for comparator offsets in an analog radio. These problems may be overcome by varying the gain ahead of the comparator, typically using a variable gain RF stage or variable RF attenuator 706.

Figure 32:
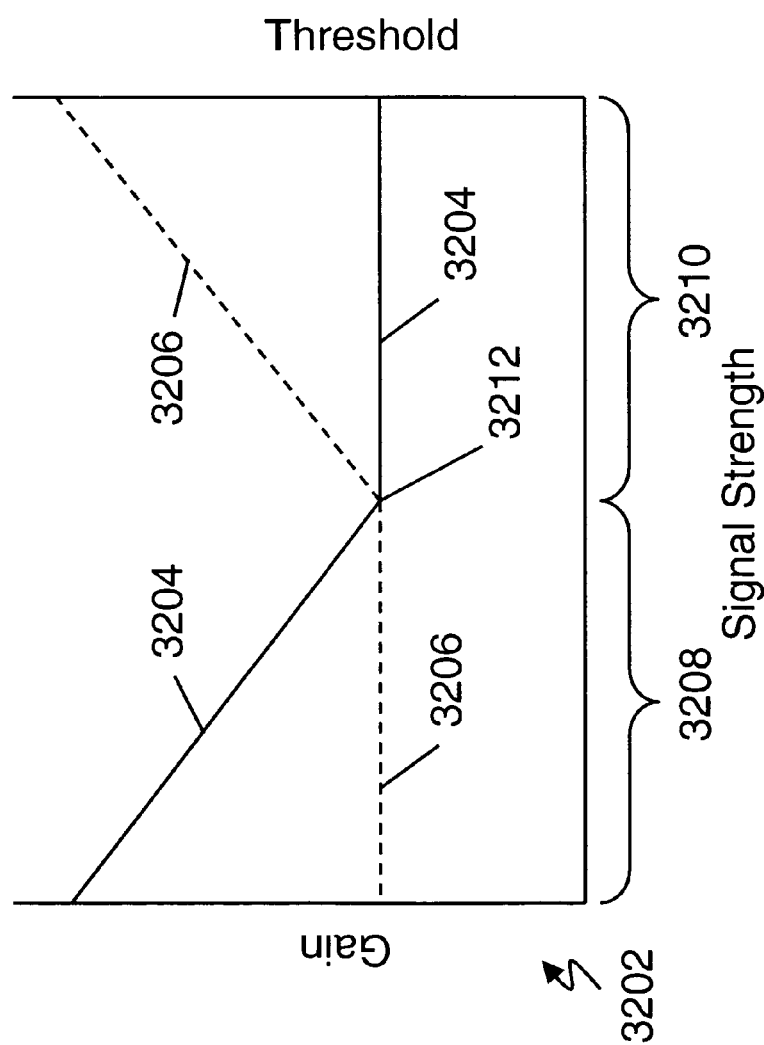
FIG. 32 shows a gain plot for a variable gain system wherein both gain and threshold are varied in a coordinated manner, in accordance with the present invention.

FIG. 32 shows a gain plot for a variable gain system wherein both gain and threshold are varied in a coordinated manner, in accordance with the present invention. Referring to FIG. 32, the graph 3202 shows gain 3204 vs signal strength on the same graph as threshold 3206 vs signal strength. The gain 3204 axis is on the left and the threshold 3206 axis is on the right. As shown, for low signal strength 3208, the gain 3204 is varied to maintain a constant ramp maximum value and the threshold 3206 is held constant. For high signal strength 3210, the gain 3204 is held constant and the threshold 3206 is varied for optimum performance. The transition 3212 from high gain to low gain may be based on the gain control value used to control the gain control stage 706; i.e., for low gain, the gain control is adjusted using closed loop feedback to keep a constant ramp magnitude, but as the gain control value reaches a limit value 3212, the gain control is held constant and the threshold is raised to maintain a constant relationship between the threshold and the ramp magnitude. An exemplary constant relationship is to keep the threshold at 50% of the ramp magnitude, or other percentage value as may be determined by simulation or test. Also, more complex relationships may be used, as have been described in this disclosure.

In an alternative embodiment, the gain 3204 and threshold 3206 may be set or adjusted according to performance measurements such as packet loss rate as described above.

In a further embodiment, the threshold is varied to track signal amplitude for low signal levels below the gain range of the variable gain stage, i.e., signal levels below the level where the maximum gain can maintain the constant ramp magnitude.

Figure 33:
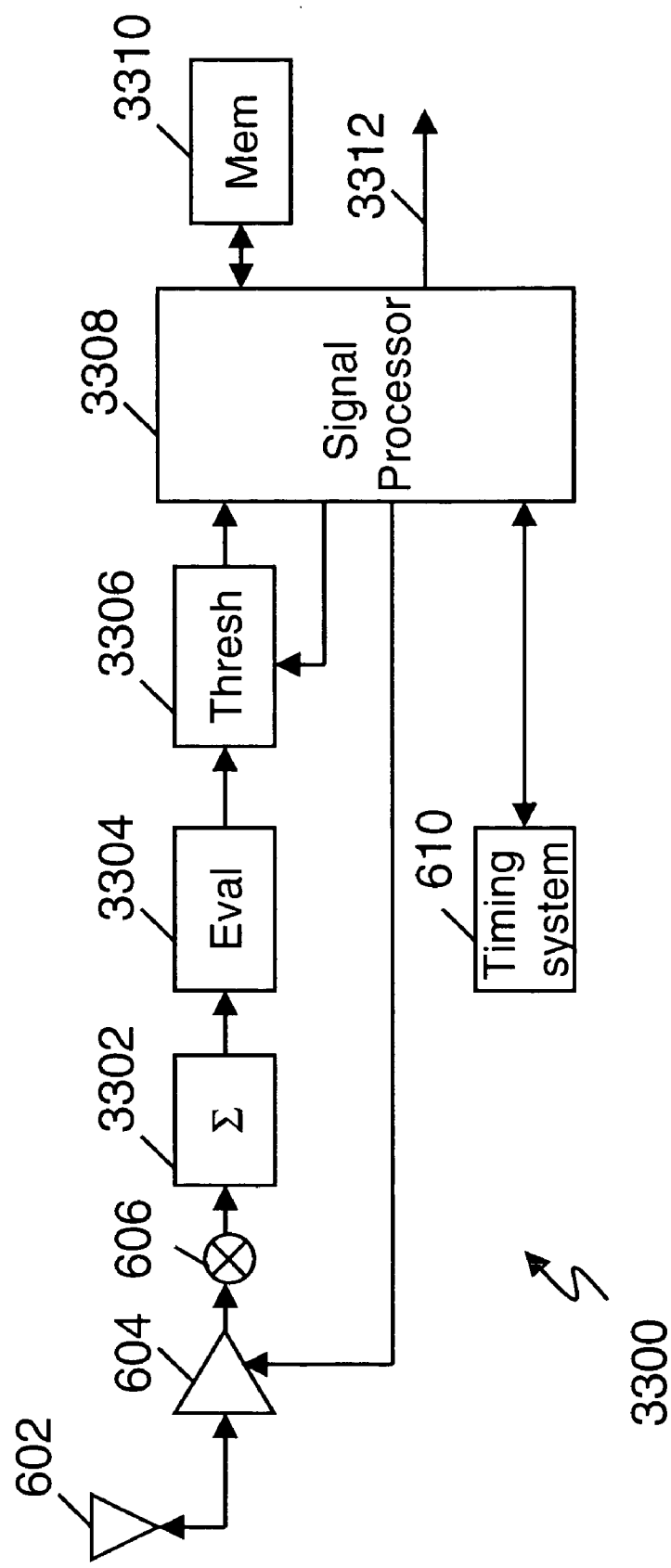
FIG. 33 is a functional flow diagram for a receiver employing a variable gain and threshold system in accordance with the present invention.

FIG. 33 is a functional flow diagram for a receiver employing a variable gain and threshold system in accordance with the present invention. Referring to FIG. 33, a signal is received by an antenna 602 and coupled to a variable gain stage, which is part of the receiver front end 604. The amplified signal is detected using a correlator 606 or sampler 606 or other detector to generate a detected signal. The detection may involve multiple parallel correlators FIG. 7, 727a-727d, and 726a-726d, or other architectures as have been disclosed for UWB systems. The following functions 3302-3310 may be performed by a baseband processor 620 as in FIG. 6, 620. Detection is followed by a summation stage 3302 where one or more samples are summed to generate a summation result. The progressive summation of samples is also referred to as building ramps. The final result of building ramps is the summation result. The summation may involve one sample to tens of thousands or more. The summation process may also involve parallel concurrent ramp builders as previously described in this disclosure. Further details on parallel ramp builders may be found in "SYSTEM AND METHOD FOR PROCESSING SIGNALS IN UWB COMMUNICATIONS", Ser. No. 10/712,269, filed on 14 Nov. 2003 by Brethour et al, which has been incorporated herein by reference.

The summation process is followed by an evaluation stage 3304 where evaluation criteria are applied to the ramp value or set of ramp values to generate an evaluation result. In one embodiment, the evaluation result is the summation result. In another embodiment, a group of ramp values are evaluated using the equations of Table 2A or Table 2B or the other threshold relations disclosed herein. The equations of Table 2B are substantially equivalent to the equations Table 2A except for the relatively academic difference of replacing a ">" with a "$\geq$". The group of ramp values may be generated in sequence by a single correlator receiver, or alternatively, the group of ramp values may be generated concurrently using parallel ramp builders as previously described in this disclosure. Other architectures may be used to generate a set of ramps for use with evaluation criteria such as the evaluation criteria of Table 2A or Table 2B. It may be appreciated by one skilled in the art that additional evaluation criteria may be used within the spirit and teaching of the present invention. It may also be appreciated that varying the threshold is equivalent to varying the evaluation criteria, i.e., for any variation in the threshold compared with a given evaluation criteria, an equivalent variation in the evaluation criteria may be found to compare with the original threshold. Thus variation of the threshold is intended to include equivalent variation of the evaluation criteria.

The evaluation result is then compared with the threshold 3206. If the threshold 3206 is satisfied, then processing follows as for a potential signal detection. If the threshold is not satisfied, then another portion of signal space is sampled i.e., typically the timing system 610 is shifted to another frame offset value and further samples are received 606 and summed 3302. When the potential signal is detected, the system 3300 proceeds to check validity, track the signal, and detect data as described in this disclosure. Once acquisition is achieved, the detection 606 summation 3302, evaluation 3304, and thresholding 3306 resources are directed by the signal processor 3308 to receive data and deliver a data output 3312.

The threshold value and gain value may be set in accordance with the processes described in this disclosure. For example, in one embodiment, the evaluation criteria is the maximum ramp value and the gain is set to control the maximum ramp value to be a predetermined value within the limits of the gain control range of the variable gain amplifier 604 or attenuator 706. The threshold is then set to 50% of a long term average of the maximum ramp value. The threshold value may track the variations in the maximum ramp value if the signal level exceeds the high or low limits of the control range for the gain control stage 604, 706.

In a further embodiment, where multiple transmitters are received in turn by the receiver, the gain and threshold values may be stored in memory 3310, typically called context memory 3310, and the gain and threshold values may be read from memory to prepare to receive each respective transmitter in turn.

In a further exemplary embodiment, the summation stage comprises parallel ramp builders and the evaluation criteria includes one of the equations of Table 2A or Table 2B. Some of the equations of Table 2A are ratiometric with respect to the amplitude of the signal, that is, the numerator and denominator of the ratio are both proportional to signal amplitude so that the equation result is insensitive to signal amplitude.

In a further embodiment, multiple criteria, such as the criteria of Table 2A, may be calculated and the criterion selected based on a performance measure. Fore example, two or more of the criteria may be used and the associated packet loss rate recorded for each with the better performing criteria selected.

In a further embodiment, multiple criteria, such as the criteria of Table 2A, may be calculated and the criterion selected based on an application characteristic. One such application characteristic is a variable link range. For example, applications which require supporting highly variable link ranges will preferentially use the table entries which are ratiometric.

Gain may be set to establish the signal amplitude properly within the dynamic range of the system. Thus, the gain may be adjusted to deliver the ramp maximum amplitude at a predetermined value. The threshold value may then be adjusted based on performance criteria such as packet loss rate, as has been described herein.

T. Automatic Multi-Stage Threshold Adjustment

Figure 34:
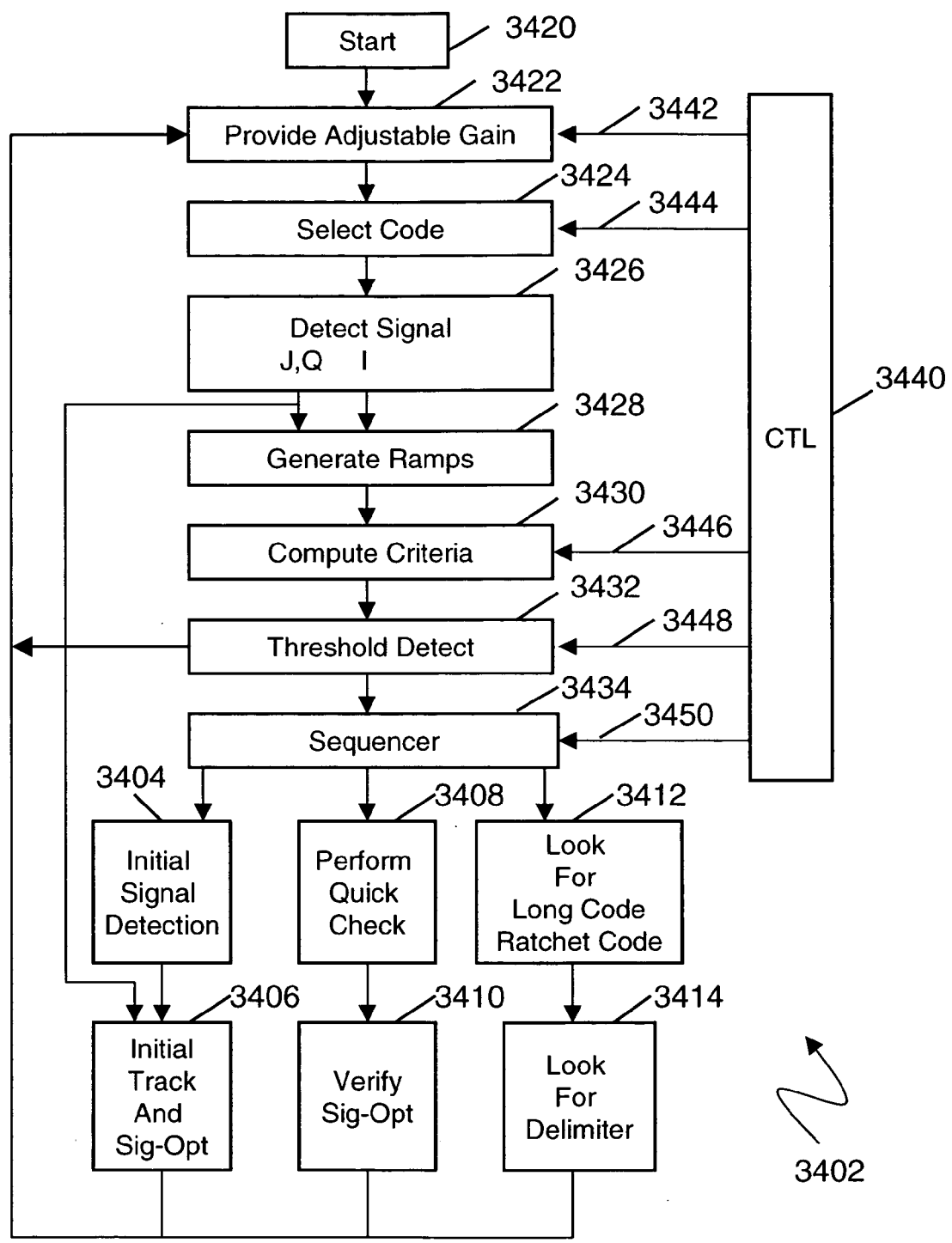
FIG. 34 is a functional flow diagram illustrating an exemplary multi-stage acquisition process in accordance with the present invention.

FIG. 34 is a functional flow diagram illustrating an exemplary multi-stage acquisition process in accordance with the present invention. A multi stage acquisition process may include one or more of the following stages:

Initial Detection—First detection of a possible signal.
Initial Tracking—Initial closed loop tacking of the signal
Sig-Opt—Signal Optimization, refinement of tracking loop lock point
Quick Check—Verification of the first detection.
Lock Check—verification of tracking loop lock
Long Code (Ratchet Code) Detection—Detection of long length code
Detect Delimiter—Detect end of acquisition header Although, in a preferred embodiment, all of the above listed stages are implemented, one or more stages may be eliminated to save some cost or complexity. Each stage may have a threshold process. Further, the threshold for each stage may be different and the optimum value may change differently for different signal conditions. Thus, it is desirable to modify the respective threshold value separately and independently for each stage of acquisition. The exemplary multistage acquisition process may be applied to packet acquisition wherein the packet has a special acquisition header providing a sequence of known coded signals tailored for each stage of acquisition.

Referring to FIG. 34, FIG. 34 illustrates a multistep acquisition system 3402 performing a number of stages of acquisition 3404-3414, each based on receiving and processing 3420-3434 a group of signal samples under the guidance of a controller 3440. The controller 3440 may change gain settings 3442, code patterns 3444, threshold criteria 3446, threshold values 3448, and monitors and directs the sequence 3450 of acquisition steps 3404-3414.

During the first stage of acquisition, initial signal detection 3404, a signal is received and amplified by an adjustable gain stage 3422. A code is selected 3424. The code may be different for different stages of detection. Initial detection 3404 may use a short code, shorter than the integration length used to generate ramps 3428, to allow faster initial detection 3404 of the signal. Acquisition on the short code leaves ambiguities that are resolved in later stages. Later stages may select a longer code 3424 to resolve the ambiguities.

The signal is then detected 3426 by a correlator or sampler. In one embodiment, the correlators are provided in pairs, I and J (or Q). The I correlator receives the direct signal which is fed to the summation 3428 (ramp building) process to detect data or build signal for thresholds. The J correlator is delayed (or advanced) by a time shift of ¼ cycle of the center frequency of the UWB signal. Alternatively, a Q correlator may be based on ¼ wave shifting of the signal. The J or Q correlator signal may be combined with the I signal to generate a magnitude signal for ramp building. Combining the I and J signal may be by square root of the sum of the squares, or by summation of absolute values. Typically the J or Q signal is also used as the tracking loop 3406 error signal and is filtered and fed to the timing system 610 to maintain tracking lock on the signal.

Once detected, the detected signal may be summed with other samples to generate ramps 3428. One or more samples may be used to generate a ramp. In first stage acquisition, a ramp may comprise several, for example 4, short code modulos. Ramps may be generated by a single correlator and a single ramp builder, or multiple correlators and a single ramp builder, or by multiple correlators and multiple ramp builders, as described earlier in this disclosure.

One or more ramps are used to generate threshold criteria 3430 that are then compared with a threshold 3432. The threshold criteria in one embodiment, may be the ramp value. In other embodiments, the threshold criteria may be a function of multiple ramp values as has been previously described in this disclosure.

During initial detection, if the threshold criteria are met, this means that there is a reasonable probability that the detection represents a desirable signal. Further steps 3408 are then initiated to verify the initial detection; however, it is desirable to close the tracking loop 3406 upon initial detection to better align the correlator with the signal timing and prevent the signal from drifting away due to frequency differences between the receiver time base and the signal. A Sig-Opt 3406 process may be performed to scan the neighborhood (signals within a small frame offset from the detected signal) to see if a higher peak is available for reception. If a higher peak is found, the acquisition process is redirected to the frame offset value associated with the higher peak and the process continues with the next stage of acquisition.

After initial detection 3404, there still exists a significant probability that the detection represents a noise spike. Thus, the system 3402 then performs a quick check 3408 operation to further validate the initial detection 3404. In one embodiment, a single initial detection ramp is produced and compared with a quick check threshold 3432. In an alternative embodiment, the quick check 3408 operation is a sequence of several, for example five, initial detections 3404 wherein for example, four out of five, of the initial detections 3404 must satisfy the quick check threshold 3432 to pass quick check 3408. In a further alternative, a longer integration 3428 may be used.

In any of the alternatives for quick check 3408, the threshold setting 3448 may be different from the threshold setting 3448 for initial detection 3404. If quick check 3408 is passed, there is a much higher probability that the detection is a signal and not a noise spike. After quick check 3408, a check lock 3410 process may be performed to verify that the lock point is at least as good as the original detection, i.e. that Sig-Opt did not lose the signal, if a signal were present. Alternatively, check lock may proceed in parallel with quick check because the tracking function may use different system resources (correlators and ramp builders) than the threshold generation function.

Once quick check 3408 is passed, (and check lock, if used), the system is configured to look for a long code 3412. (The long code is also referred to as the ratchet code in this disclosure.) When the long code portion of the header is received, reception of the long code 3412 will help resolve remaining timing ambiguities resulting from receiving the short code. To configure for receiving the long code 3412, a portion of the system correlator resources 3426 are reconfigured to utilize the long code. It is desirable that a portion of system resources 3426 remain configured to receive the short code to maintain tracking lock 3406 on the signal and maintain at least short code synchronization with the signal. In the case of multiple parallel correlators, some of the multiple parallel correlators may utilize the long code and one or two correlators may utilize the short code. While looking for long codes, the correlators utilizing the short code may be a small portion of the total system correlator resources and thus may be considered a background process. Accordingly, such signal summations are also termed back ramps in this disclosure. Alternatively, reception of the long code may be time division multiplexed with the short code as may be done by a single correlator or dual correlator receiver.

Since reception of the long code involves distinguishing among code offset values that are a function of the short code length, the thresholds may be tailored to distinguish different code offset ramps. Thus, the long code thresholds may be different from the short code thresholds.

The end of the long code portion of the header may be marked by a delimiter 3414. In one embodiment, the delimiter is a long code pattern modulated with the opposite polarity. Thus, the delimiter may be received by the correlators configured for the long code. The delimiter detection process 3414, however, may have a different threshold tailored to distinguishing between a positive and negative ramp polarity.

If the thresholds for each different stage are out of balance (proper relationship among one another), one stage may be responsible for too many lost packets. For example, if the first stage 3404 threshold is too high, good signals will be rejected. If the first stage 3404 threshold is too low, too many noise spikes will be passed to quick check 3408, slowing the acquisition process potentially to the point that the header, with the special lock code, is completed before lock is achieved. If quick check 3408 threshold is too high, good signals will be rejected as well. If quick check 3408 threshold is too low, lock may be attempted on noise, or noise may be searched in vain for a delimiter, slowing the acquisition process and missing packets. Thus, it is desirable to set each threshold optimally and separately.

In one embodiment, packet loss rate is used to adjust the thresholds. Thresholds may be established initially at a nominal level previously determined to work well under typical environments. As packets are received, the packet loss rate may be derived as previously described in this disclosure. One of the thresholds, for example the initial acquisition threshold, may then be varied. A sequence of packets is then received at the higher threshold and the new packet loss rate is noted. If the packet loss rate is improved, then the threshold may be moved again in the same direction. If the packet loss rate is decreased, the threshold may be moved back. The process continues until equilibrium is established. Once equilibrium is established with one threshold, a different threshold is selected for variation. When all thresholds are adjusted, the process may begin again.

It is typically desirable to limit the automatic variation of thresholds between limits previously determined during design and testing of the system because extreme conditions may momentarily drive a threshold into a degraded, but stable operating region.

In an alternate embodiment, each threshold may be selected for adjustment in turn after only one adjustment at a previously selected threshold. Thus, all thresholds may be adjusted toward equilibrium relatively concurrently.

In another embodiment, activity at an intermediate stage may be used to set an earlier threshold. For example, it is desirable to place the initial acquisition threshold at a low level to avoid missing good signals due to a noise spike (that subtracts from the signal). However, if the threshold is too low, there will be too many initial detections, each requiring a quick check operation, slowing the acquisition process. Thus the quick check false alarm rate may be used to adjust the initial detection threshold, e.g., if the quick check false alarm rate is too high, the initial detection threshold may be raised. Alternatively, the time required to scan one frame offset modulo may be used to adjust the initial detection threshold, e.g. if the time is too long, the initial detection threshold may be raised.

In an alternate embodiment, the thresholds may be set according to measured environmental characteristics, such as signal strength or multipath or interference. Signal strength may be indicated by the gain setting in the gain control loop together with ramp amplitude values. Multipath may be measured by scanning through a modulo of frame offsets and observing the peaks below the main peak. The thresholds may be set to reject peaks below the main peak, i.e., threshold criteria peaks are observed as signal space is scanned over a range of frame offset values and the threshold is set to receive the strongest signal and reject the next strongest signal. Interference may be measured by observing peak value of a sequence of samples or ramps that are not associated with a received packet. Thresholds may be set to reject interference peaks.

In a further embodiment, the multipath environment may be measured by scanning using a receiver to scan frame offset space as a transmitter transmits a known signal to be measured. The resulting scan is indicative of the various peak signal values related to the various multipath reflections in the path between the transmitter and receiver. Thus, the threshold may be set to receive the strongest signal and reject the next strongest reflection based on a prior scan of the multipath environment. The threshold value may also be set just below the peak value based on a measurement of the multipath envelope decay rate. Measurement of multipath signals is further explained in U.S. Pat. No. 6,700,538, titled "System and Method for Estimating Separation Distance Between Impulse Radios Using Impulse Signal Amplitude," which issued Mar. 2, 2004 to Richards.

In a further embodiment of a multistage acquisition system, where multiple transmitters are received in turn by the receiver, the gain and threshold values may be stored in memory, typically called context memory, and the gain and threshold values may be read from memory to prepare to receive each respective transmitter in turn.

IV. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

All cited patent documents and publications in the above description are incorporated herein by reference.

What is claimed is:

1. An ultra wideband receiver comprising:
   an ultra wideband antenna;
   an ultra wideband receiver coupled to the ultra wideband antenna for receiving an input signal, said ultra wideband receiver further comprising:
   a sampling stage for sampling the input signal and generating a sampled signal;
   a summation stage for summing a plurality of sampled signals and generating a sum signal;
   an evaluation stage for evaluating one or more sum signals to generate an evaluation result;
   a threshold comparator to compare the evaluation result with a threshold;
   wherein the threshold is varied based on a performance criterion, wherein the evaluation stage and threshold comparator utilize a plurality of ramps in accordance with one or more of the following relationships:

| Number | Threshold Equation |
| --- | --- |
| 0 | MaxR > C |
| 1 | N * MaxR / MA_meanV > C |
| 2 | MaxR / NextR > C |
| 3 | Logic AND of equation 1 and 2 |
| 4 | Logic OR of equation 1 and 2 |
| 5 | N * MaxR / MaxV > C |
| 6 | N * (MaxR / MA_meanV) * (MinV / MaxV) > C |
| 7 | N * (MaxR / MA_meanV) * [FORCE_ZERO(MinV − MA_MinV) / FORCE_ONE(MaxV − MA_MinV)] > C |
| 8 | N * (MaxR − NextR) / MA_meanV > C |
| 9 | N * [(MaxR − NextR) / MA_meanV] * (MinV / MaxV) > C. | wherein N represents the acquisition integration length, C is some programmable constant, and the performance criterion is described as the following:

| Quantity | Description |
| --- | --- |
| MaxR | $1^{st}$ largest acquisition ramp |
| NextR | $2^{nd}$ largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

2. The receiver of claim 1 wherein two or more of the relationships are combined by a logical AND.

3. The receiver of claim 1 wherein two or more of the relationships are combined by a logical OR.

4. The receiver of claim 1 wherein the selection of the one or more relationship is made in response to a criterion of the received signal.

5. The receiver of claim 4 wherein the criterion comprises a performance measure.

6. The receiver of claim 4 wherein the criterion comprises an application characteristic.

7. The receiver of claim 1 wherein the selection of the one or more relationship is made in response to the success or failure rates of the threshold decision.

8. The receiver of claim 1 wherein at least two of the plurality of ramps are generated serially.

9. The receiver of claim 8 wherein at least two of the plurality of ramps are generated in sequence.

10. The receiver of claim 1 wherein the plurality of ramps is generated in parallel.

11. An ultra wideband receiver comprising:
    an ultra wideband antenna;
    an ultra wideband receiver coupled to the uwb antenna for receiving an input signal, said ultra wideband receiver further comprising;
    a sampling stage for sampling the input signal and generating a sampled signal;
    a summation stage for summing a plurality of sampled signals and generating a sum signal;
    an evaluation stage for evaluating one or more sum signals to generate an evaluation result;
    a threshold comparator to compare the evaluation result with a threshold;
    wherein the threshold is varied based on a performance criterion, wherein said receiver receives a plurality of packets wherein the number of missed packets can be estimated; wherein said receiver adjusts at least one threshold based on said number of missed packets, wherein said plurality of packets have a known traffic rate over a time period; wherein said receiver estimates said number of missed packets by comparing the number of received packets with said known traffic rate over said time period
    wherein the performance criterion is described as the following:

| Quantity | Description |
| --- | --- |
| MaxR | $1^{st}$ largest acquisition ramp |
| NextR | $2^{nd}$ largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

12. The receiver of claim 11 wherein said known traffic rate is based on packet length, number of monitor packets, and inter packet delay.

13. An ultra wideb and receiver comprising:
    an ultra wideband antenna;
    an ultra wideband receiver coupled to the uwb antenna for receiving an input signal, said ultra wideband receiver further comprising:
    a sampling stage for sampling the input signal and generating a sampled signal;
    a summation stage for summing a plurality of sampled signals and generating a sum signal;

an evaluation stage for evaluating one or more sum signals to generate an evaluation result;

a threshold comparator to compare the evaluation result with a threshold;

wherein the threshold is varied based on a performance criterion, wherein said receiver receives a plurality of packets wherein the number of missed packets can be estimated; wherein said receiver adjusts at least one threshold based on said number of missed packets, wherein at least one packet of said plurality of packets includes packet count information and wherein said number of missed packets is estimated by comparing said packet count information with the number of received packets wherein the performance criterion is described as the following:

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

14. The receiver of claim 13 wherein the packet count information is a packet sequence number.

15. A method for receiving an ultra wideband signal, said method comprising:

sampling said ultra wideband signal to generate a sampled signal;

summing a plurality of sampled signals to generate a sum signal;

generating an evaluation criteria based on at least one said sum signal;

comparing said evaluation criteria with a predetermined threshold value;

proceeding with further processing when the threshold is met;

generating a performance criterion relating to the threshold value;

adjusting the threshold value based on the performance criteria; wherein the receiving includes a quick check process and the threshold value relates to receiving quick check signals wherein the performance criterion is described as the following:

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

16. A method for receiving an ultra wideband signal, said method comprising:

sampling said ultra wideband signal to generate a sampled signal;

summing a plurality of sampled signals to generate a sum signal;

generating an evaluation criteria based on at least one said sum signal;

comparing said evaluation criteria with a predetermined threshold value;

proceeding with further processing when the threshold is met;

generating a performance criterion relating to the threshold value;

adjusting the threshold value based on the performance criteria; wherein the receiving includes a delimiter receiving process and the threshold value relates to receiving delimiter signals.

wherein the performance criterion is described as the following:

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

17. A method for receiving an ultra wideband signal, said method comprising:

sampling said ultra wideband signal to generate a sampled signal;

summing a plurality of sampled signals to generate a sum signal;

generating an evaluation criteria based on at least one said sum signal;

comparing said evaluation criteria with a predetermined threshold value;

proceeding with further processing when the threshold is met;

generating a performance criterion relating to the threshold value;

adjusting the threshold value based on the performance criteria; wherein the receiver includes a memory, wherein the ultrawideband signal is from a particular transmitter among a plurality of transmitters, said method further including the steps of;

associating at least one threshold value with said particular transmitter;

storing said at least one threshold value in memory;

restoring from memory said at least one threshold value for comparing with signals relating to said particular transmitter wherein the performance criterion is described as the following:

| Quantity | Description |
|---|---|
| MaxR | 1st largest acquisition ramp |
| NextR | 2nd largest acquisition ramp |
| MaxV | Maximum correlator variance |

-continued

| Quantity | Description |
| --- | --- |
| MinV | Minimum correlator variance |
| MeanV | Mean correlator variance |
| MA__MeanV | Moving (historical) average of the mean correlator varience |
| MA__MinV | Moving (historical) average of the minimum correlator varience |
| Logic__1 | Constant value 1 |
| Logic__0 | Constant value 0. |

18. A method for receiving an ultra wideband signal, said method comprising:
sampling said ultra wideband signal to generate a sampled signal;
summing a plurality of sampled signals to generate a sum signal;
generating an evaluation criteria based on at least one said sum signal;
comparing said evaluation criteria with a predetermined threshold value;
proceeding with further processing when the threshold is met;
generating a performance criterion relating to the threshold value;
adjusting the threshold value based on the performance criteria; further including the step of determining at least one threshold value based on optimization information received from a remote unit
wherein the performance criterion is described as the following:

| Quantity | Description |
| --- | --- |
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA__MeanV | Moving (historical) average of the mean correlator varience |
| MA__MinV | Moving (historical) average of the minimum correlator varience |
| Logic__1 | Constant value 1 |
| Logic__0 | Constant value 0. |

19. A method for receiving an ultra wideband signal, said method comprising:
sampling said ultra wideband signal to generate a sampled signal;
summing a plurality of sampled signals to generate a sum signal;
generating an evaluation criteria based on at least one said sum signal;
comparing said evaluation criteria with a predetermined threshold value;
proceeding with further processing when the threshold is met;
generating a performance criterion relating to the threshold value;
adjusting the threshold value based on the performance criteria; wherein threshold criteria peaks are observed as signal space is scanned over a range of frame offset values and the threshold is set to recieve the strongest signal and reject the next strongest signal
wherein the performance criterion is described as the following:

| Quantity | Description |
| --- | --- |
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA__MeanV | Moving (historical) average of the mean correlator varience |
| MA__MinV | Moving (historical) average of the minimum correlator varience |
| Logic__1 | Constant value 1 |
| Logic__0 | Constant value 0. |

20. A method for receiving an ultra wideband signal, said method comprising:
sampling said ultra wideband signal to generate a sampled signal;
summing a plurality of sampled signals to generate a sum signal;
generating an evaluation criteria based on at least one said sum signal;
comparing said evaluation criteria with a predetermined threshold value;
proceeding with further processing when the threshold is met;
generating a performance criterion relating to the threshold value;
adjusting the threshold value based on the performance criteria; wherein the threshold is set to receive the strongest signal and reject the next strongest reflection based on a prior scan of the multipath environment
wherein the performance criterion is described as the following:

| Quantity | Description |
| --- | --- |
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA__MeanV | Moving (historical) average of the mean correlator varience |
| MA__MinV | Moving (historical) average of the minimum correlator varience |
| Logic__1 | Constant value 1 |
| Logic__0 | Constant value 0. |

21. A method for receiving an ultra wideband signal, said method comprising:
sampling said ultra wideband signal to generate a sampled signal;
summing a plurality of sampled signals to generate a sum signal;
generating an evaluation criteria based on at least one said sum signal;
comparing said evaluation criteria with a predetermined threshold value;
proceeding with further processing when the threshold is met;
generating a performance criterion relating to the threshold value;
adjusting the threshold value based on the performance criteria; wherein the performance criterion is based on a packet loss rate, wherein the packet loss rate is derived, at least in part, from packet size, or monitor packet rate, or inter packet delay
wherein the performance criterion is described as the following:

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

22. A method for receiving an ultra wideband signal, said method comprising:
sampling said ultra wideband signal to generate a sampled signal;
summing a plurality of sampled signals to generate a sum signal;
generating an evaluation criteria based on at least one said sum signal;
comparing said evaluation criteria with a predetermined threshold value;
proceeding with further processing when the threshold is met;
generating a performance criterion relating to the threshold value;
adjusting the threshold value based on the performance criteria; further including an initial detection stage and a quick check stage wherein the quick check false alarm rate is used to adjust the initial detection threshold
wherein the performance criterion is described as the following:

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

23. A method for receiving an ultra wideband signal, said method comprising:
sampling said ultra wideband signal to generate a sampled signal;
summing a plurality of sampled signals to generate a sum signal;
generating an evaluation criteria based on at least one said sum signal;
comparing said evaluation criteria with a predetermined threshold value;
proceeding with further processing when the threshold is met;
generating a performance criterion relating to the threshold value;
adjusting the threshold value based on the performance criteria; further including a quick check stage and wherein the receiver scans a frame offset modulo; wherein the quick check threshold is adjusted based on the time required to scan the frame offset modulo
wherein the performance criterion is described as the following:

| Quantity | Description |
|---|---|
| MaxR | 1st largest acquisition ramp |
| NextR | 2nd largest acquisition ramp |
| MaxV | Maximum correlator variance |
| MinV | Minimum correlator variance |
| MeanV | Mean correlator variance |
| MA_MeanV | Moving (historical) average of the mean correlator varience |
| MA_MinV | Moving (historical) average of the minimum correlator varience |
| Logic_1 | Constant value 1 |
| Logic_0 | Constant value 0. |

* * * * *